United States Patent
Byrne et al.

(10) Patent No.: US 12,435,342 B2
(45) Date of Patent: *Oct. 7, 2025

(54) METHODS OF PACKAGING MULTIPLE ADENO-ASSOCIATED VIRUS VECTORS

(71) Applicant: University of Florida Research Foundation, Incorporated, Gainesville, FL (US)

(72) Inventors: Barry John Byrne, Gainesville, FL (US); Phillip A. Doerfler, Gainesville, FL (US); Nathalie Clement, Gainesville, FL (US)

(73) Assignee: University of Florida Research Foundation, Incorporated, Gainesville, FL (US)

(*) Notice: Subject to any disclaimer, the term of this patent is extended or adjusted under 35 U.S.C. 154(b) by 324 days.

This patent is subject to a terminal disclaimer.

(21) Appl. No.: 18/059,269

(22) Filed: Nov. 28, 2022

(65) Prior Publication Data

US 2023/0313230 A1 Oct. 5, 2023

Related U.S. Application Data

(63) Continuation of application No. 16/989,857, filed on Aug. 10, 2020, now Pat. No. 11,535,867, which is a continuation of application No. 15/320,707, filed as application No. PCT/US2015/036841 on Jun. 20, 2015, now Pat. No. 10,781,459.

(60) Provisional application No. 62/015,031, filed on Jun. 20, 2014.

(51) Int. Cl.
C07H 21/02 (2006.01)
C12N 7/00 (2006.01)
C12N 15/86 (2006.01)
C12Q 1/70 (2006.01)

(52) U.S. Cl.
CPC ............ *C12N 15/86* (2013.01); *C12N 7/00* (2013.01); *C12Q 1/701* (2013.01); C12N 2750/14143 (2013.01); C12N 2750/14152 (2013.01); C12Q 2600/158 (2013.01)

(58) Field of Classification Search
None
See application file for complete search history.

(56) References Cited

U.S. PATENT DOCUMENTS

| | | |
|---|---|---|
| 10,781,459 B2 | 9/2020 | Byrne et al. |
| 11,535,867 B2 | 12/2022 | Byrne et al. |
| 2004/0121444 A1 | 6/2004 | Zolotukhin et al. |
| 2004/0209245 A1 | 10/2004 | Snyder et al. |
| 2014/0087444 A1 | 3/2014 | Bennett et al. |
| 2014/0336245 A1 | 11/2014 | Mingozzi et al. |
| 2017/0218395 A1 | 8/2017 | Byrne et al. |

OTHER PUBLICATIONS

International Search Report and Written Opinion mailed Sep. 30, 2015 for Application No. PCT/US2015/036841.

(Continued)

*Primary Examiner* — M Franco G Salvoza
(74) *Attorney, Agent, or Firm* — Wolf, Greenfield & Sacks, P.C.

(57) ABSTRACT

Provided herein are methods related to co-packaging of multiple rAAV particles. e.g., by introducing multiple nucleic acid vectors encoding proteins or polypeptides or RNAs of interest into a single cell preparation.

19 Claims, 4 Drawing Sheets

Specification includes a Sequence Listing.

(56) References Cited

OTHER PUBLICATIONS

International Preliminary Report on Patentability mailed Dec. 29, 2016 for Application No. PCT/US2015/036841.
Clement et al., Large-scale adeno-associated viral vector production using a herpesvirus-based system enables manufacturing for clinical studies. Hum Gene Ther. Aug. 2009;20(8):796-806. doi: 10.1089/hum.2009.094.
Sharma et al., Transduction efficiency of AAV 2/6, 2/8 and 2/9 vectors for delivering genes in human corneal fibroblasts. Brain Res Bull. Feb. 15, 2010;81(2-3):273-8. doi: 10.1016/j.brainresbull.2009.07.005. Epub Jul. 16, 2009.
Shin et al., Recombinant adeno-associated viral vector production and purification. Methods Mol Biol. 2012;798:267-84. doi: 10.1007/978-1-61779-343-1_15.
Zeltner et al., Near-perfect infectivity of wild-type AAV as benchmark for infectivity of recombinant AAV vectors. Gene Ther. Jul. 2010;17(7):872-9. doi: 10.1038/gt.2010.27. Epub Mar. 25, 2010.

SEQUENCE LISTING

```
Sequence total quantity: 17
SEQ ID NO: 1              moltype = DNA   length = 3161
FEATURE                   Location/Qualifiers
misc_feature              1..3161
                          note = Synthetic Polynucleotide
source                    1..3161
                          mol_type = other DNA
                          organism = synthetic construct
SEQUENCE: 1
aggaacccct agtgatggag ttggccactc cctctctgcg cgctcgctcg ctcactgagg   60
ccgcccgggc aaagcccggg cgtcgggcga cctttggtcg cccggcctca gtgagcgagc  120
gagcgcgcag agagggagtg gccaaccccc cccccccccc ccctgcagcc ctgcattaat  180
gaatcggcca acgcgcgggg agaggcggtt tgcgtattgg gcgctcttcc gcttcctcgc  240
tcactgactc gctgcgctcg gtcgttcggc tgcggcgagc ggtatcagct cactcaaagg  300
cggtaatacg gttatccaca gaatcagggg ataacgcagg aaagaacatg tgagcaaaag  360
gccagcaaaa ggccaggaac cgtaaaaagg ccgcgttgct ggcgtttttc cataggctcc  420
gcccccctga cgagcatcac aaaaatcgac gctcaagtca gaggtggcga acccgacag   480
gactataaag ataccaggcg tttccccctg gaagctccct cgtgcgctct cctgttccga  540
ccctgccgct taccggatac ctgtccgcct ttctcccttc gggaagcgtg gcgctttctc  600
aatgctcacg ctgtaggtat ctcagttcgg tgtaggtcgt tcgctccaag ctgggctgtg  660
tgcacgaacc ccccgttcag cccgaccgct gcgccttatc cggtaactat cgtcttgagt  720
ccaacccggt aagacacgac ttatcgccac tggcagcagc cactggtaac aggattagca  780
gagcgaggta tgtaggcggt gctacagagt tcttgaagtg gtggcctaac tacggctaca  840
ctagaaggac agtatttggt atctgcgctc tgctgaagcc agttaccttc ggaaaaagag  900
ttggtagctc ttgatccggc aaacaaacca ccgctggtag cggtggtttt tttgtttgca  960
agcagcagat tacgcgcaga aaaaaaggat ctcaagaaga tcctttgatc ttttctacgg 1020
ggtctgacgc tcagtggaac gaaaactcac gttaagggat tttggtcatg agattatcaa 1080
aaaggatctt cacctagatc cttttaaatt aaaaatgaag ttttaaatca atctaaagta 1140
tatatgagta aacttggtct gacagttacc aatgcttaat cagtgaggca cctatctcag 1200
cgatctgtct atttcgttca tccatagttg cctgactccc cgtcgtgtag ataactacga 1260
tacgggaggg cttaccatct ggccccagtg ctgcaatgat accgcgagac ccacgctcac 1320
cggctccaga tttatcagca ataaaccagc cagccggaag gccgagcgc agaagtggtc  1380
ctgcaacttt atccgcctcc atccagtcta ttaattgttg ccgggaagct agagtaagta 1440
gttcgccagt taatagtttg cgcaacgttg ttgccattgc tacaggcatc gtggtgtcac 1500
gctcgtcgtt tggtatggct tcattcagct ccggttccca acgatcaagg cgagttacat 1560
gatcccccat gttgtgcaaa aaagcggtta gctccttcgg tcctccgatc gttgtcagaa 1620
gtaagttggc cgcagtgtta tcactcatgg ttatggcagc actgcataat tctcttactg 1680
tcatgccatc cgtaagatgc ttttctgtga ctggtgagta ctcaaccaag tcattctgag 1740
aatagtgtat gcggcgaccg agttgctctt gcccggcgtc aatacgggat aataccgcgc 1800
cacatagcag aactttaaaa gtgctcatca ttggaaaacg ttcttcgggg cgaaaactct 1860
caaggatctt accgctgttg agatccagtt cgatgtaacc cactcgtgca cccaactgat 1920
cttcagcatc ttttactttc accagcgttt ctgggtgagc aaaaacagga aggcaaatg  1980
ccgcaaaaaa gggaataagg gcgacacgga aatgttgaat actcatactc ttcctttttc 2040
aatattattg aagcatttat cagggttatt gtctcatgag cggatacata tttgaatgta 2100
tttagaaaaa taaacaaata ggggttccgc gcacatttcc ccgaaaagtg ccacctgacg 2160
tctaagaaac cattattatc atgacattaa cctataaaaa taggcgtatc acgaggccct 2220
ttcgtctcgc gcgtttcggt gatgacggtg aaaacctctg acacatgcag ctcccggaga 2280
cggtcacagc ttgtctgtaa gcggatgccg ggagcagaca gccccgtaca ggcgcgtcag 2340
cgggtgttgg cgggtgtcgg ggctggctta actatgcggc atcagagcag attgtactga 2400
gagtgcacca tatgcggtgt gaaataccgc acagatgcgt aaggagaaaa taccgcatca 2460
ggaaattgta aacgttaata ttttgttaaa attcgcgtta aattttttgtt aaatcagctc 2520
attttttaac caataggccg aaatcggcaa aatcccttat aaatcaaaag aatagaccga 2580
gatagggttg agtgttgttc cagtttggaa caagagtcca ctattaaaga acgtggactc 2640
caacgtcaaa gggcgaaaaa ccgtctatca gggcgatggc ccactacgtg aaccatcacc 2700
ctaatcaagt tttttgggt cgaggtgccg taaagcacta aatcggaacc ctaaagggag  2760
cccccgattt agagcttgac ggggaaagcc ggcgaacgtg gcgagaaagg aagggaagaa 2820
agcgaaagga gcgggcgcta gggcgctggc aagtgtagcg gtcacgctgc gcgtaaccac 2880
cacacccgcc gcgcttaatg cgccgctaca gggcgcgtcg cgccattcgc cattcaggct 2940
acgcaactgt tgggaagggc gatcggtgcg ggcctcttcg ctattacgcc aggctgcagg 3000
gggggggggg gggggttgg ccactccctc tctgcgcgct cgctcgctca ctgaggccgg   3060
gcgaccaaag gtcgcccgac gcccgggctt tgcccgggcg gcctcagtga gcgagcgagc 3120
gcgcagagag ggagtggcca actccatcac taggggttcc t                    3161

SEQ ID NO: 2              moltype = DNA   length = 7200
FEATURE                   Location/Qualifiers
misc_feature              1..7200
                          note = Synthetic Polynucleotide
source                    1..7200
                          mol_type = other DNA
```

```
                    organism = synthetic construct
SEQUENCE: 2
gggggggggg ggggggggtt ggccactccc tctctgcgcg ctcgctcgct cactgaggcc   60
gggcgaccaa aggtcgcccg acgcccggge tttgcccggg cggcctcagt gagcgagcga  120
gcgcgcagag agggagtggc caactccatc actagggggtt cctagatctg aattcggtac  180
cctagttatt aatagtaatc aattacgggg tcattagttc atagcccata tatggagttc  240
cgcgttacat aacttacggt aaatggcccg cctggctgac cgcccaacga ccccccgccca  300
ttgacgtcaa taatgacgta tgttcccata gtaacgccaa tagggacttt ccattgacgt  360
caatgggtgg actatttacg gtaaactgcc cacttggcag tacatcaagt gtatcatatg  420
ccaagtacgc cccctattga cgtcaatgac ggtaaatggc ccgcctggca ttatgcccag  480
tacatgacct tatgggactt tcctacttgg cagtacatct acgtattagt catcgctatt  540
accatggtcg aggtgagccc cacgttctgc ttcactctcc ccatctcccc cccctcccca  600
cccccaattt tgtatttatt tattttttaa ttattttgtg cagcgatggg ggcggggggg  660
gggggggggc gcgcgccagg cggggcgggg cggggcgagg gcgggggcgg ggcgaggcgg  720
agaggtgcgg cggcagccaa tcagagcggc gcgctccgaa agtttccttt tatggcgagg  780
cggcggcggc ggcggcccta taaaaagcga agcgcgcggc gggcgggagt cgctgcgacg  840
ctgccttcgc cccgtgcccc gctccgccgc cgcctcgcgc cgcccgcccc ggctctgact  900
gaccgcgtta ctcccacagg tgagcgggcg ggacggcccc tctcctccgg gctgtaatta  960
gcgcttggtt taatgacggc ttgtttcttt tctgtggctg cgtgaaagcc ttgagggggct 1020
ccgggagggc cctttgtgcg gggggagcg gctcggggg tgcgtgcgtg tgtgtgtgcg 1080
tggggagcgc cgcgtgcggc ccgcgctgcc cggcggctgt gagcgctgcg ggcgcggcgc 1140
ggggctttgt gcgctccgca gtgtgcgcga ggggagcgcg gccgggcgcg gtgccccgcg 1200
gtgcggggggg ggctgcgagg ggaacaaagg ctgcgtgcgg ggtgtgtgcg tgggggggtg 1260
agcaggggt gtgggcgcgg cggtcgggct gtaaccccccc cctgcacccc cctccccgag 1320
ttgctgagca cggcccggct tcgggtgcgg ggctccgtac ggggcgtggc gcggggctcg 1380
ccgtgccggg cgggggtgg cggcaggtgg gggtgcggg cgggggcggg ccgcctcggg 1440
ccggggaggg ctcggggag gggcgcggcg gcccccggaa cgccggcggc tgtcgaggcg 1500
cggcgagccg cagccattgc cttttatggt aatcgtgcga gagggcgcag ggacttcctt 1560
tgtcccaaat ctgtgcggag ccgaaatctg ggaggcgccg ccgcacccccc tctagcgggc 1620
gcggggcgaa gcggtgcggc gccggcagga aggaaatggg cgggaggcgc cttcgtgcgt 1680
cgccgcgccg ccgtcccctt ctccctctcc agcctcgggg ctgtccgcgg gggacggct 1740
gccttcgggg gggacgggc agggcggggt tcgcttctg gcgtgtgacc ggcggctcta 1800
gagcctctgc taaccatgtt catgccttct tcttttttcct acagctcctg ggcaacgtgc 1860
tggttattgt gctgtctcat cattttggca aagaattcct cgaagatcta ggcctgcagg 1920
cggccgccgc caccatgagc aagggcgagg aactgttcac tggcgtggtc ccaattctgc 1980
tggaactgga tggcgatgtg aatgggcaca aattttctgt cagcgagag ggtgaaggtg 2040
atgccacata cggaaagctc accctgaaat tcatctgcac cactggaaag ctccctgtgc 2100
catggccaac actggtcact accctgacct atggcgtgca gtgcttttcc agatacccag 2160
accatatgaa gcagcatgac tttttcaaga gcgccatgcc cgagggctat gtgcaggaga 2220
gaaccatctt tttcaaagat gacgggaact acaagacccg cgctgaagtc aagttcgaag 2280
gtgacaccct ggtgaataga atcgagctga agggcattga ctttaaggag gatggaaaca 2340
ttctcggcca caagctggaa tacaactata actcccacaa tgtgtacatc atggccgaca 2400
agcaaaagaa tggcatcaag gtcaacttca agatcagaca caacattgag gatggatccg 2460
tgcagctggc cgaccattat caacagaaca ctccaatcgg cgacggccct gtgctcctcc 2520
cagacaacca ttacctgtcc acccagtctg ccctgtctaa agatcccaac gaaaagagag 2580
accacatggt cctgctggag tttgtgaccg ctgctgggat cacacatggc atggacgagc 2640
tgtacaagtg agcggccgcg gggatccaga catgataaga tacattgatg agtttggaca 2700
aaccacaact agaatgcagt gaaaaaaatg ctttatttgt gaaatttgtg atgctattgc 2760
tttatttgta accattataa gctgcaataa acaagttaac aacaacaatt gcattcattt 2820
tatgtttcag gttcagggg aggtgtggga ggttttttag tcgacctcga gcagtgtggt 2880
tttgcaagag gaagcaaaaa gcctctccac ccaggcctgg aatgtttcca cccaagtga 2940
aggcagtgtg gttttgcaag aggaagcaaa aagcctctcc acccaggcct ggaatgtttc 3000
cacccaatgt cgagcaaccc cgcccagcgt cttgtcattg gcgaattcga acacgcagat 3060
gcagtcgggg cggcgcggtc ccaggtccac ttcgcatatt aaggtgacgc gtgtggcctc 3120
gaacaccgag cgaccctgca gccaatatgg gatcggccat tgaacaagat ggattgcacg 3180
caggttctcc ggccgcttgg gtggagaggc tattcggcta tgactgggca caacagacaa 3240
tcggctgctc tgatgccgcc gtgttccggc tgtcagcgca ggggcgcccg gttcttttttg 3300
tcaagaccga cctgtccggt gccctgaatg aactgcagga cgaggcagcg cggctatcgt 3360
ggctggccac gacgggcgtt ccttgcgcag ctgtgctcga cgttgtcact gaagcgggaa 3420
gggactggct gctattgggc gaagtgccgg ggcaggatct cctgtcatct caccttgctc 3480
ctgccgagaa agtatccatc atggctgatg caatgcggcg gctgcatacg cttgatccgg 3540
ctacctgccc attcgaccac caagcgaaac atcgcatcga gcgagcacgt actcggatgg 3600
aagccggtct tgtcgatcag gatgatctgg acgaagagca tcaggggctc gcgccagccg 3660
aactgttcgc caggctcaag gcgcgcatgc ccgacggcga ggatctcgtc gtgacccatg 3720
gcgatgcctg cttgccgaat atcatggtgg aaaatggccg cttttctgga ttcatcgact 3780
gtggccggct gggtgtggcg gaccgctatc aggacatagc gttggctacc cgtgatattg 3840
ctgaagagct tggcggcgaa tgggctgacc gcttcctcgt gctttacggt atcgccgctc 3900
ccgattcgca gcgcatcgcc ttctatcgcc ttcttgacga gttcttctga gggatccgt 3960
cgactagagc tcgctgatca gcctcgactg tgccttctag ttgccagcca tctgttgttt 4020
gcccctcccc cgtgccttcc ttgaccctgg aaggtgccac tcccactgtc ctttcctaat 4080
aaaatgagga aattgcatcg cattgtctga gtaggtgtca ttctattctg gggggtgggg 4140
tggggcagga cagcaagggg gaggattggg aagacaatag caggcatgct ggggagagat 4200
ctaggaaccc ctagtgatgg agttggccac tccctctctg cgcgctcgct cgctcactga 4260
ggccgcccgg gcaaagcccg ggcgtcgggc gacctttggt cgcccggcct cagtgagcga 4320
gcgagcgcgc agagagggag tggccaaccc ccccccccccc ccctgcag ccctgcatta 4380
atgaatcggc caacgcgcgg ggagaggcgg tttgcgtatt gggcgctctt ccgcttcctc 4440
gctcactgac tcgctgcgct cggtcgttcg gctgcggcga gcggtatcag ctcactcaaa 4500
ggcggtaata cggttatcca cagaatcagg ggataacgca ggaaagaaca tgtgagcaaa 4560
aggccagcaa aaggccagga accgtaaaaa ggccgcgttg ctggcgtttt tccataggct 4620
```

-continued

```
ccgcccccct gacgagcatc acaaaaatcg acgctcaagt cagaggtggc gaaaccgac    4680
aggactataa agataccagg cgtttccccc tggaagctcc ctcgtgcgct ctcctgttcc   4740
gaccctgccg cttaccggat acctgtccgc ctttctccct tcgggaagcg tggcgctttc   4800
tcaatgctca cgctgtaggt atctcagttc ggtgtaggtc gttcgctcca agctgggctg   4860
tgtgcacgaa cccccgttc agcccgaccg ctgcgcctta tccggtaact atcgtcttga    4920
gtccaacccg gtaagacacg acttatcgcc actggcagca gccactggta acaggattag   4980
cagagcgagg tatgtaggcg gtgctacaga gttcttgaag tggtggccta actacggcta   5040
cactagaagg acagtatttg gtatctgcgc tctgctgaag ccagttacct tcggaaaaag   5100
agttggtagc tcttgatccg gcaaacaaac caccgctggt agcggtggtt ttttttgttg    5160
caagcagcag attacgcgca gaaaaaaagg atctcaagaa gatcctttga tcttttctat   5220
gggtctgac gctcagtgga acgaaaactc acgttaaggg attttggtca tgagattatc    5280
aaaaaggatc ttcacctaga tccttttaaa ttaaaaatga gttttaaat caatctaaag    5340
tatatatgag taaacttggt ctgacagtta ccaatgctta atcagtgagg cacctatctc   5400
agcgatctgt ctatttcgtt catccatagt tgcctgactc cccgtcgtgt agataactac   5460
gatacgggag ggcttaccat ctggccccag tgctgcaatg ataccgcgag acccacgctc   5520
accggctcca gatttatcag caataaacca gccagccgga agggccgagc gcagaagtgg   5580
tcctgcaact ttatccgcct ccatccagtc tattaattgt tgccgggaag ctagagtaag   5640
tagttcgcca gttaatagtt tgcgcaacgt tgttgccatt gctacaggca tcgtggtgtc   5700
acgctcgtcg tttggtatgg cttcattcag ctccggttcc caacgatcaa ggcgagttac   5760
atgatccccc atgttgtgca aaaaagcggt tagctccttc ggtcctccga tcgttgtcag   5820
aagtaagttg gccgcagtgt tatcactcat ggttatggca gcactgcata attctcttac   5880
tgtcatgcca tccgtaagat gcttttctgt gactggtgag tactcaacca agtcattctg   5940
agaatagtgt atgcggcgac cgagttgctc ttgcccggcg tcaatacggg ataataccgc   6000
gccacatagc agaactttaa aagtgctcat cattggaaaa cgttcttcgg ggcgaaaact   6060
ctcaaggatc ttaccgctgt tgagatccag ttcgatgtaa cccactcgtg cacccaactg   6120
atcttcagca tcttttactt tcaccagcgt ttctgggtga gcaaaaacag gaaggcaaaa   6180
tgccgcaaaa aagggaataa gggcgacacg gaaatgttga atactcatac tcttcctttt   6240
tcaatattat tgaagcattt atcagggtta ttgtctcatg agcggataca tatttgaatg   6300
tatttagaaa aataaacaaa tagggggttcc gcgcacattt ccccgaaaag tgccacctga   6360
cgtctaagaa accattatta tcatgacatt aacctataaa aataggcgta tcacgaggcc   6420
ctttcgtctc gcgcgtttcg gtgatgacgg tgaaaacctc tgacacatgc agctcccgga   6480
gacggtcaca gcttgtctgt aagcggatgc cgggagcaga caagcccgtc agggcgcgtc   6540
agcgggtgtt ggcgggtgtc ggggctggct taactatgcg gcatcagagc agattgtact   6600
gagagtgcac catatgcggt gtgaaatacc gcacagatgc gtaaggagaa aataccgcat   6660
caggaaattg taaacgttaa tattttgtta aaattcgcgt taaattttg ttaaatcagc    6720
tcattttta accataggc cgaaatcggc aaaatccctt ataaatcaaa agaatagacc     6780
gagatagggt tgagtgttgt tccagtttgg aacaagagtc cactattaaa gaacgtggac   6840
tccaacgtca aagggcgaaa aaccgtctat cagggcgatg gcccactacg tgaaccatca   6900
ccctaatcaa gttttttggg gtcgaggtgc cgtaaagcac ccctaaaggg                6960
agccccgat ttagagcttg acggggaaag ccgcgaacg tggcgagaaa ggaagggaag     7020
aaagcgaaag gagcgggcgc tagggcgctg gcaagtgtag cggtcacgct gcgcgtaacc   7080
accacacccg ccgcgcttaa tgcgccgcta cagggcgcgt cgcgccattc gccattcagg    7140
ctacgcaact gttgggaagg gcgatcggtg cgggcctctt cgctattacg ccaggctgca   7200
```

```
SEQ ID NO: 3              moltype = DNA   length = 28
FEATURE                   Location/Qualifiers
misc_feature              1..28
                          note = Synthetic Polynucleotide
source                    1..28
                          mol_type = other DNA
                          organism = synthetic construct
SEQUENCE: 3
gagtggtacc accgccggcg taagaata                                       28

SEQ ID NO: 4              moltype = DNA   length = 33
FEATURE                   Location/Qualifiers
misc_feature              1..33
                          note = Synthetic Polynucleotide
source                    1..33
                          mol_type = other DNA
                          organism = synthetic construct
SEQUENCE: 4
cctgatgtgg tagcacccgc cggcgtaaga ata                                 33

SEQ ID NO: 5              moltype = DNA   length = 712
FEATURE                   Location/Qualifiers
misc_feature              1..712
                          note = Synthetic Polynucleotide
source                    1..712
                          mol_type = other DNA
                          organism = synthetic construct
SEQUENCE: 5
gatcttaccc cctgcccccc acagctcctc tcctgtgcct tgtttcccag ccatgcgttc     60
tcctctataa atacccgctc tggtatttgg ggttggcagc tgttgctgcc agggagatgg    120
ttgggttgac atgcggctcc tgacaaaaca caaaccctg gtgtgtgtgg gcgtgggtgg     180
tgtgagtagg gggatgaatc agggaggggg cggggaccc aggggcagg agccacacaa      240
agtctgtgcg ggggtgggag cgcacatagc aattggaaac tgaaagctta tcagacccct    300
tctggaaatc agcccactgt ttataaactt gaggcccacc cctcgagata accagggctg    360
aaagaggccc gcctggggc tggagacatg cttgctgcct gccctggcga aggattgca     420
```

```
ggcttgcccg tcacaggacc cccgctggct gactcagggg cgcaggcctc ttgcggggga    480
gctggcctcc ccgccccac ggccacgggc cgcccttttcc tggcaggaca gcgggatctt    540
gcagctgtca ggggagggga ggcggggggct gatgtcagga gggatacaaa tagtgccgac    600
ggctgggggc cctgtctccc ctcgccgcat ccactctccg gccggccgcc tgtccgccgc    660
ctcctccgtg cgcccgccag cctcgcccgc gccgtcaccg tgaggcactg gg            712

SEQ ID NO: 6          moltype = DNA  length = 410
FEATURE               Location/Qualifiers
misc_feature          1..410
                      note = Synthetic Polynucleotide
source                1..410
                      mol_type = other DNA
                      organism = synthetic construct
SEQUENCE: 6
ccctaaaatg ggcaaacatt gcaagcagca aacagcaaac acacagccct ccctgcctgc     60
tgaccttgga gctggggcag aggtcagaga cctctctggg gactgtccca ggtcagtggt    120
ggtgcctgaa gctgaggaga cagggccctg tcctcgtccg tatttaagca gtggatccag    180
aggggcaacg gggaggctg ctggtgaata ttaaccaagg ccctccagt tatcggagga     240
gcaaacaggg gctaagtcca ctggctggga tctgagtcgc ccgcctacgc tgcccggacg    300
cttttgcctgg gcagtgtaca gcttccactg cacttaccga aaggagtcat tgtagggccc    360
tgtctcctca gcttcaggca ccaccactga cctgggacag tgaatccgga               410

SEQ ID NO: 7          moltype = DNA  length = 7390
FEATURE               Location/Qualifiers
misc_feature          1..7390
                      note = Synthetic Polynucleotide
source                1..7390
                      mol_type = other DNA
                      organism = synthetic construct
SEQUENCE: 7
tcgaggacaa ccttagtgaa ggaattcgcg agtggtgggc tttgaaacct ggagcccctc     60
aacccaaggc aaatcaacaa catcaagaca acgtcgagg tcttgtgctt ccgggttaca    120
aataccttgg acccgcaac ggactcgaca aggggggagcc ggtcaacgca gcagacgcgg    180
cggccctcga gcacgacaag gcctacgacc agcagctgca aggccggagc aacccgtacc    240
tcaagtacaa ccacgccgac gccgagttcc aggagcggct caaagaagat acgtcttttg    300
ggggcaacct cgggcgagca gtcttccagg ccaaaaagag gcttcttgaa cctcttggtc    360
tggttgagga agcggctaag acggctcctg gaaagaagag gcctgtagag cagtctcctc    420
aggaaccgga ctcctccgcg ggtattggca aatcgggtgc acagcccgct aaaaagagac    480
tcaatttcgg tcagactggc gacacagagt cagtcccaga ccctcaacca atcggagaac    540
ctcccgcagc cccctcaggt gtgggatctc ttacaatggc ttcaggtggt ggcgcaccag    600
tggcagacaa taacgaaggt gccgatggag tgggtagttc ctcgggaaat tggcattgcg    660
attcccaatg gctgggggac agagtcatca ccaccagcac ccgaacctgg gccctgccca    720
cctacaacaa tcacctctac aagcaaatct ccaacagcac atctggagga tcttcaaatg    780
acaacgccta cttcggctac agcacccccct gggggtattt tgacttcaac agattccact    840
gccacttctc accacgtgac tggcagcgac tcatcaacaa caactgggga ttccggccta    900
agcgactcaa cttcaagctc ttcaacattc aggtcaaaga ggttacggac aacaatggag    960
tcaagaccat cgccaataac cttaccagca cggtccagat cttcacggac tcagactatc   1020
agctcccgta cgtgctcggg tcggctcacg agggctgcct cccgccgttc ccagcggacg   1080
ttttcatgat tcctcagtac gggtatctga cgctaataga tggaagccag gccgtgggtc   1140
gttcgtcctt ttactgcctg gaatatttcc cgtcgcaaat gctaagaacg ggtaacaact   1200
tccagttcag ctacgagttt gagaacgtac ctttccatag cagctacgct cacgccagaa   1260
gcctggaccg actaatgaat ccactcatcg accaatactt gtactatctc tcaaagacta   1320
ttaacggttc tggacagaat caacaaaacgc taaaattcag tgtggccgga cccagcaaca   1380
tggctgtcca gggaagaaac tacatacctg acccagcta ccgacaacaa cgtgtctcaa   1440
ccactgtgac tcaaaacaac aacagcgaat ttgcttggcc tggagcttct tcttgggctc   1500
tcaatgggacg taatagcttg atgaatcctg gacctgctat ggccagccac aaagaaggag   1560
aggaccgttt ctttccttg tctggatctt aatttttgg caaacaagga actgaagag     1620
acaacgtgga tgcggacaaa gtcatgataa ccaacgaaga agaaattaaa actactaacc   1680
cggtagcaac ggagtcctat ggacaagtgg ccacaaacca ccagagtgc caagcacagg   1740
cgcagaccgg ctgggttcaa aaccaaggaa tacttccggg tatggtttgg caggacagag   1800
atgtgtacct gcaaggaccc atttgggcca aaattcctca cacggacggc aactttcacc   1860
cttctccgct gatgggaggg tttggaatga agcacccgcc tcctcagatc ctcatcaaaa   1920
acacacctgt acctgcggat cctccaacgg ccttcaacaa ggacaagctg aactctttca   1980
tcacccagta ttctactggc caagtcagcg tggagatcga gtgggagctg cagaaggaaa   2040
acagcaagcg ctggaacccc gagatccagt acacttccaa ctattacaag tctaataatg   2100
ttgaatttgc tgtttaatact gaaggtgtat atagtgaacc ccgccccatt ggcaccagat   2160
acctgactcg taatctgtaa ttgcttgtta atcaataaac cgtttaattc gtttcagttg   2220
aactttggtc tctgcgaagg gcgaattcgt ttaaacctgc aggactagag tcctgtatta   2280
gaggtcacgt gagtgtttttg cgacattttg tggtcacgt gggtatttaa             2340
gcccgagtga gcacgcaggg tctccattttg aagcgggag gtttgaacgc gcagccgcca   2400
agccgaattc tgcagatatc catcacactg cggccgctc gactagagcg gccgccaccg   2460
cggtggagct ccagctttttg ttcccttttag tgagggttaa ttgcgcgctt ggcgtaatca   2520
tggtcatagc tgttttcctgt gtgaaattgt tatccgctca caatccaca caacatacga   2580
gccggaagca taaagtgtaa agcctggggt gcctaatgag tgagctaact cacattaatt   2640
gcgttgcgct cactgcccgc tttccagtcg gaaacctgt cgtgccagct gcattaatga   2700
atcggccaac gcgcggggag aggcggtttg cgtattgggc gctcttccgc ttcctcgctc   2760
actgactcgc tgcgctcggt cgttcggctg cggcgagcgg tatcagctca ctcaaaggcg   2820
gtaatacggt tatccacaga atcaggggat aacgcaggaa agaacatgtg agcaaaaggc   2880
cagcaaaagg ccaggaaccg taaaaaggcc gcgttgctgg cgtttttcca taggctccgc   2940
```

```
cccccctgacg agcatcacaa aaatcgacgc tcaagtcaga ggtggcgaaa cccgacagga 3000
ctataaagat accaggcgtt tcccctggaa agctccctcg tgcgctctcc tgttccgacc 3060
ctgccgctta ccggatacct gtccgccttt ctcccttcgg gaagcgtggc gctttctcat 3120
agctcacgct gtaggtatct cagttcggtg taggtcgttc gctccaagct gggctgtgtg 3180
cacgaacccc ccgttcagcc cgaccgctgc gccttatccg gtaactatcg tcttgagtcc 3240
aacccggtaa gacacgactt atcgccactg gcagcagcca ctggtaacag gattagcaga 3300
gcgaggtatg taggcggtgc tacagagttc ttgaagtggt ggcctaacta cggctacact 3360
agaaggacag tatttggtat ctgcgctctg ctgaagccag ttaccttcgg aaaaagagtt 3420
ggtagctctt gatccggcaa acaaaccacc gctggtagcg gtggtttttt tgtttgcaag 3480
cagcagatta cgcgcagaaa aaaaggatct caagaagatc ctttgatctt ttctacgggg 3540
tctgacgctc agtggaacga aaactcacgt taagggattt tggtcatgag attatcaaaa 3600
aggatcttca cctagatcct tttaaattaa aaatgaagtt ttaaatcaat ctaaagtata 3660
tatgagtaaa cttggtctga cagttaccaa tgcttaatca gtgaggcacc tatctcagcg 3720
atctgtctat ttcgttcatc catagttgcc tgactccccg tcgtgtagat aactacgata 3780
cgggagggct taccatctgg ccccagtgct gcaatgatac cgcgagaccc acgctcaccg 3840
gctccagatt tatcagcaat aaaccagcca gccggaaggg ccgagcgcag aagtggtcct 3900
gcaactttat ccgcctccat ccagtctatt aattgttgcc gggaagctag agtaagtagt 3960
tcgccagtta atagtttgcg caacgttgtt gccattgcta caggcatcgt ggtgtcacgc 4020
tcgtcgtttg gtatggcttc attcagctcc ggttcccaac gatcaaggcg agttacatga 4080
tcccccatgt tgtgcaaaaa agcggttagc tccttcggtc ctccgatcgt tgtcagaagt 4140
aagttggccg cagtgttatc actcatggtt atggcagcac tgcataattc tcttactgtc 4200
atgccatccg taagatgctt tctgtgactg gtgagtacca accaagtca ttctgagaat 4260
agtgtatgcg gcgaccgagt tgctcttgcc cggcgtcaat acgggataat accgcgccac 4320
atagcagaac tttaaaagtg ctcatcattg gaaaacgttc tcggggcga aaactctcaa 4380
ggatcttacc gctgttgaga tccagttcga tgtaacccac tcgtgcaccc aactgatctt 4440
cagcatcttt tactttcacc agcgtttctg ggtgagcaaa aacaggaagg caaaatgccg 4500
caaaaaaggg aataagggcg acacggaaat gttgaatact catactcttc ctttttcaat 4560
attattgaag catttatcag ggttattgtc tcatgagcgg atacatattt gaatgtattt 4620
agaaaaataa acaaataggg gttccgcgca catttccccg aaaagtgcca cctaaattgt 4680
aagcgttaat attttgttaa aattcgcgtt aaattttttgt taaatcagct cattttttaa 4740
ccaataggcc gaaatcggca aaatccctta taaatcaaaa gaatagaccg atatagggtt 4800
gagtgttgtt ccagtttgga acaagagtcc actattaaag aacgtggact ccaacgtcaa 4860
agggcgaaaa accgtctatc agggcgatgg cccactacgt gaaccatcac cctaatcaag 4920
ttttttgggg tcgaggtgcc gtaaagcact aaatcggaac cctaaaggga gcccccgatt 4980
tagagcttga cggggaaagc cggcgaacgt ggcgagaaag gaagggaaga aagcgaaagg 5040
agcgggcgct agggcgctgg caagtgtagc ggtcacgctg cgcgtaacca ccacacccgc 5100
cgcgcttaat gcgccgctac agggcgcgtc ccattcgcca ttcaggctgc gcaactgttg 5160
ggaagggcga tcggtgcggg cctcttcgct attacgccag ctggcgaaag ggggatgtgc 5220
tgcaaggcga ttaagttggg taacgccagg gttttcccag tcacgacgtt gtaaaacgac 5280
ggccagtgag cgcgcgtaat acgactcact atagggcgaa ttgggtaccg gccccccct 5340
cgatcgaggt cgacggtatc ggggagctc ggatccacta gtaacggccg ccagtgtgct 5400
ggattcggct ttatttaagc ccgagtgagc acgcagggtc tccattttga agcgggaggt 5460
ttgaacgcga agccgccatg ccgggggtttt acgagattgt gattaaggtc ccagcgacc 5520
ttgacgggca tctgcccggc atttctgaca gctttgtgaa ctgggtggcc gagaaggaat 5580
gggagttgcc gccagattct gacatggatc tgaatctgat tgagcaggca ccctgaccg 5640
tggccgagaa gctgcagcgc gacttctgac ggaatggcg ccgtgtgagt aaggcccgg 5700
aggccctttt cttttgtgcaa tttgagaagg gagagagcta cttccacatg cacgtgctcg 5760
tggaaaccac cggggtgaaa tccatggttt tgggacgttt cctgagtcag attcgcgaaa 5820
aactgattca gagaatttac cgcgggatcg agccgacttt gccaaactgg ttcgcggtca 5880
caaagaccag aaatggcgcc ggaggcggga acaaggtggg gatgagtgc tacatcccca 5940
attacttgct ccccaaaacc cagcctgagc tccagtgggc gtggactaat atggaacagt 6000
atttaagcgc ctgtttgaat ctcacggagc gtaaacggtt ggtggcgcag catctgacgc 6060
acgtgtcgca gacgcaggag cagaacaaag agaatcagaa tcccaattct gatgcgccgg 6120
tgatcagatc aaaaacttca gccaggtaca tggagctggt cgggtggctc gtggacaagg 6180
ggattacctc ggagaagcag tggatccagg aggaccagg ctcatacatc tccttcaatg 6240
cggcctccaa ctcgcggtcc caaatcaagg ctgccttgca caatgcggga agattatga 6300
gcctgactaa aaccgccccc gactacctgg tgggccagca gcccgtggag gacatttcca 6360
gcaatcggat ttataaaatt ttggaactaa cgggtacga tccccaatat gcggcttccg 6420
tctttctggg atgggccacg aaaaagttcg gcaagaggaa caccatctgg ctgtttgggc 6480
ctgcaactac cggggaagacc aacatcgcgg aggccatage ccacactgtg cccttctacg 6540
ggtgcgtaaa ctgaccaat gagaactttc ccttcaacga ctgtgtcgac aagatggtga 6600
tctggtggga ggagggaag atgaccgcca aggtcgtgga gtcggccaaa gccattctcg 6660
gaggaagcaa ggtgcgcgtg gaccagaaat gcaagtcctc ggcccagata gacccgactc 6720
cegtgatcgt cacctccaac gaccaacatgt gcgccgtgat tgacgggaac tcaacgacct 6780
tcgaacacca gcagccgttg caagaccgga tgttcaaatt tgaactcacc cgccgtctgg 6840
atcatgactt tgggaaggtc accaagcagg aagtcaaaga cttttttccgg tgggcaaagg 6900
atcacgtggt tgaggtggag catgaattct acgtcaaaaa gggtggagcc aagaaaagac 6960
ccgcccccag tgacgcagat ataagtgagc ccaaacgggt gcgcgagtca gttgcgcagc 7020
catcgacgtc agacgcggaa gcttcgatca actacggaa caggtaccaa aacaaatgtt 7080
ctcgtcacgt gggcatgaat ctgatgctgt ttccctgcag acaatgcgag agactgaatc 7140
agaattcaaa tatctgcttc actcacggtg tcaaagactg tttagagtgc tttcccgtgt 7200
cagaatctca acccgtttct gtcgtcaaaa aggcgtatca gaaactgtgc tacattcatc 7260
acatcatggg aaaggtgcca gacgcttgca ctgcttgcga cctggtcaat gtggacttgg 7320
atgactgtgt ttctgaacaa taaatgactt aaaccaggta tggctgccga tggttatctt 7380
ccagattggc                                                         7390

SEQ ID NO: 8            moltype = DNA  length = 18930
FEATURE                 Location/Qualifiers
misc_feature            1..18930
```

```
                   note = Synthetic Polynucleotide
source             1..18930
                   mol_type = other DNA
                   organism = synthetic construct
SEQUENCE: 8
tcttccgctt cctcgctcac tgactcgctg cgctcggtcg ttcggctgcg gcgagcggta   60
tcagctcact caaaggcggt aatacggtta tccacagaat cagggggataa cgcaggaaag  120
aacatgtgag caaaaggcca gcaaaaggcc aggaaccgta aaaaggccgc gttgctggcg  180
tttttccata ggctccgccc ccctgacgag catcacaaaa atcgacgctc aagtcagagg  240
tggcgaaacc cgacaggact ataaagatac caggcgtttc ccctggaag ctccctcgtg   300
cgctctcctg ttccgaccct gccgcttacc ggatacctgt ccgcctttct cccttcggga  360
agcgtggcgc tttctcatag ctcacgctgt aggtatctca gttcggtgta ggtcgttcgc  420
tccaagctgg gctgtgtgca cgaaccccc gttcagcccg accgctgcgc cttatccggt   480
aactatcgtc ttgagtccaa cccggtaaga cacgacttat cgccactggc agcagccact  540
ggtaacagga ttagcagagc gaggtatgta ggcggtgcta cagagttctt gaagtggtgg  600
cctaactacg gctacactag aagaacagta tttggtatct gcgctctgct gaagccagtt  660
accttcggaa aaagagttgg tagctcttga tccggcaaac aaaccaccgc tggtagcggt  720
ggtttttttg tttgcaagca gcagattacg cgcagaaaaa aaggatctca agaagatcct  780
ttgatctttt ctacgggtc tgacgctcag tggaacgaaa actcacgtta agggattttg   840
gtcatgagat tatcaaaaag gatcttcacc tagatccttt taaattaaaa atgaagtttt  900
aaatcaatct aaagtatata tgagtaaact tggtctgaca gttaccaatg cttaatcagt  960
gaggcaccta tctcagcgat ctgtctattt cgttcatcca tagttgcctg actccccgtc 1020
gtgtagataa ctacgatacg ggagggctta ccatctggcc ccagtgctgc aatgataccg 1080
cgagacccac gctcaccggc tccagattta tcagcaataa accagccagc cggaagggcc 1140
gagcgcagaa gtggtcctgc aactttatcc gcctccatcc agtctattaa ttgttgccgg 1200
gaagctagag taagtagttc gccagttaat agtttgcgca acgttgttgc cattgctaca 1260
ggcatcgtgg tgtcacgctc gtcgtttggt atggcttcat tcagctccgg ttcccaacga 1320
tcaaggcgag ttacatgatc ccccatgttg tgcaaaaaag cggttagctc cttcggtcct 1380
ccgatcgttg tcagaagtaa gttggccgca gtgttatcac tcatggttat ggcagcactg 1440
cataattctc ttactgtcat gccatccgta agatgctttt ctgtgactgg tgagtactca 1500
accaagtcat tctgagaata gtgtatgcgg cgaccgagtt gctcttgccc ggcgtcaata 1560
cgggataata ccgcgccaca tagcagaact ttaaaagtgc tcatcattgg aaaacgttct 1620
tcggggcgaa aactctcaag gatcttaccg ctgttgagat ccagttcgat gtaacccact 1680
cgtgcaccca actgatcttc agcatctttt actttcacca gcgtttctgg gtgagcaaaa 1740
acaggaaggc aaaatgccgc aaaaaaggga ataagggcga cacggaaatg ttgaatactc 1800
atactcttcc ttttttcaata ttattgaagc atttatcagg gttattgtct catgagcgga 1860
tacatatttg aatgtattta gaaaaataaa caaatagggg ttccgcgcac atttccccga 1920
aaagtgccac ctgacgtcta agaaaccatt attatcatga cattaaccta taaaaatagg 1980
cgtatcacga ggcccttcg tctcgcgcgt ttcggtgatg acggtgaaaa cctctgacac 2040
atgcagctcc cggagacggt cacagcttgt ctgtaagcgg atgccggag cagacaagcc  2100
cgtcagggcg cgtcagcggg tgttggcggg tgtcggggct ggcttaacta tgcggcatca 2160
gagcagattg tactgagagt gcaccataaa attgtaaacg ttaatatttt gttaaaattc 2220
gcgttaaatt tttgttaaat cagctcattt tttaaccaat aaggccaaatc 2280
ccttataaat caaaagaata gcccgagata gggttgagtg ttgttccagt ttggaacaag 2340
agtccactat taaagaacgt ggactccaac gtcaaagggc gaaaaaccgt ctatcagggc 2400
gatgccac tacgtgaacc atcacccaaa tcaagttttt tggggtcgag gtgccgtaaa   2460
gcactaaatc ggaaccctaa agggagcccc cgatttagag cttgacgggg aaagccggcg 2520
aacgtggcga gaaaggaagg gaagaaagcg aaaggagcgg gcgctagggg gctggcaagt 2580
gtagcggtca cgctgcgcgt aaccaccaca cccgccgcgc ttaatgcgcc gctacagggc 2640
gcgtactatg gttgctttga cgtatgcggt gtgaaatacc gcacagatgc gtaaggagaa 2700
aataccgcat caggcgccat tcgccattca ggctgcgcaa ctgttgggaa gggcgatcgg 2760
tgcgggcctc ttcgctatta cgccagctgg cgaaagggg atgtgctgca aggcgattaa 2820
gttgggtaac gccagggttt tcccagtcac gacgttgtaa aacgacggcc agtgccaagc 2880
ttaaggtgca cggcccacgt ggccactagt acttctcgac agaagcacca tgtccttggg 2940
tccggctgc tgaatgcgca ggcggtcggc catgcccag gcttcgtttt gacatcggcg  3000
caggtctttg tagtagtctt gcatgagcct ttctaccgac acttcttctt ctccttcctc 3060
ttgtcctgca tctcttgcat ctatcgctgc ggcggcggcg gagtttggcc gtaggtggcg 3120
ccctcttcct cccatgcgtg tgaccccgaa gccctcatc ggctgaagca gggctaggtc  3180
ggcgacaacg cgctcggcta atatggcgcg ctgcacctgc gtgagggtag actgaagtc  3240
atccatgtcc acaaagcggt ggtatgcgcc cgtgttgatg gtgtaagtgc agttggccat 3300
aacgaccag ttaacggtct ggtgaccccg ctgcgagagc tcggtgtacc tgagacgcga  3360
gtaagccctc gagtcaaata cgtagtcgtt gcaagtccgc accaggtact ggtatcccac 3420
caaaaagtgc ggcggcggct ggcggtagag gggcagcgt agggtggccg gggctccggg  3480
ggcgagatct tccaacataa ggcgatgata tccgtgtgat tacctgaca tccaggtgat  3540
gccggcggcg gtggtggagg cgcggtggaaa gtcgggacg cggttccaga tgttgcgcag  3600
cggcaaaaag tgctccatgg tcgggacgct ctggccggtc aggcgcgcgc aatcgttgac 3660
gctctaccgt gcaaaaggag agcctgtaag cgggcactct tccgtggtct ggtggataaa 3720
ttcgcaaggg tatcatggcg gacgaccggg gttcgagcc cgtatccggc cgtccgcgt  3780
gatccatgcg gttaccgccc gcgtgtcgaa cccaggtgtg gactcgaga caacggggga  3840
gtgctccttt tggcttcctt ccaggcgcgg cggctgctgc gctagctttt ttggccactg 3900
gccgcgcgca gcgtaagcgg ttaggctgga aagcgaaagc attaagtggc tcgctccctg 3960
tagccggagg gttatttttcc aagggttgag tcgcgggacc cccggttcga gtctcggacc 4020
ggccggactg cggcgaacgg gggttttgcct ccccgtcatg caagacccg cttgcaaatt  4080
cctccggaaa cagggacgag ccccttttttt gcttttccca gatgcatccg gtgctgcggc 4140
agatgcgccc cctcctcag cagcggcaag agcaagacaa gcggcagaca tgcagggcac 4200
cctcccctcc tcctaccgcg tcaggagggg cgacatccgc ggttgacgcg gcagcagatg  4260
gtgattacga accccgcgg cgccgggccc ggcactacct ggacttggag gagggcgagg 4320
gcctggcgcg gctaggagcg ccctctcctg agcggtaccc aagggtgcag ctgaagcgtg 4380
atacgcgtga ggcgtacgtg ccgcggcaga acctgttgtc gaccgcgag ggagaggagc  4440
```

```
ccgaggagat gcgggatcga aagttccacg cagggcgcga gctgcggcat ggcctgaatc   4500
gcgagcggtt gctgcgcgag gaggactttg agcccgacgc gcgaaccggg attagtcccg   4560
cgcgcgcaca cgtggcggcc gccgacctgg taaccgcata cgagcagacg gtgaaccagg   4620
agattaactt tcaaaaaagc tttaacaacc acgtgcgtac gcttgtggcg cgcgaggagg   4680
tggctatagg actgatgcat ctgtgggact ttgtaagcgc gctgagcaa aacccaaata    4740
gcaagccgct catggcgcag ctgttcctta tagtgcagca cagcagggac aacgaggcat   4800
tcagggatgc gctgctaaac atagtagagc ccgagggccg ctggctgctc gatttgataa   4860
acatcctgca gagcatagtg gtgcaggagc gcagcttgag cctggctgac aaggtggccg   4920
ccatcaacta ttccatgctt agcctgggca agttttacgc ccgcaagata taccataccc   4980
cttacgttcc catagacaag gaggtaaaga tcgagggggtt ctacatgcgc atggcgctga   5040
aggtgcttac cttgagcgac gacctgggcg tttatcgcaa cgagcgcatc cacaaggccg   5100
tgagcgtgag ccggcggcgc gagctcagcg accgcgagct gatgcacagc ctgcaaaggg   5160
ccctggctgg cacgggcagc ggcgatagag aggccgagtc ctactttgac gcgggcgctg   5220
acctgcgctg ggccccaagc cgacgcgccc tggaggcagc tggggccgga cctgggctgg   5280
cggtggcacc cgcgcgcgct ggcaacgtcg gcggcgtgga ggaatatgcc gaggacgatg   5340
agtacgagcc agaggacggc gagtactaag cggtgatgtt tctgatcaga tgatgcaaga   5400
cgcaacggac ccggcggtgc gggcggcgct gcagagccag ccgtccggcc ttaactccac   5460
ggacgactgg cgccaggtca tggaccgcat catgtcgctg actgcgcgca atcctgacgc   5520
gttccggcag cagccgcagg ccaaccggct ctccgcaatt ctggaagcgg tggtcccggc   5580
gcgcgcaaac cccacgcacg agaaggtgct ggcgatcgta aacgcgctgg ccgaaaacag   5640
ggccatccgg cccgacgagg ccggcctggt ctacgacgcg ctgcttcagc gcgtggctcg   5700
ttacaacagc ggcaacgtgc agaccaacct ggaccggctg ggggggatg tgcgcgaggc    5760
cgtggcgcag cgtgagcgcg cgcagcagca gggcaacctg ggctccatgg ttgcactaaa   5820
cgccttcctg agtacacagc ccgccaacgt gccgcgggga caggaggact acaccaactt   5880
tgtgagcgca ctgcggctaa tggtgactga gacaccgcaa agtgaggtgt accagtctgg   5940
gccagactat tttttccaga ccagtagaca aggcctgcac ccgtaaaccc tgagccagcc   6000
tttcaaaaac ttgcaggggc tgtgggggt gcgggctccc acaggcgacc gcgcgaccgt    6060
gtctagcttg ctgacgccca actcgcgcct gttgctgctg ctaatagcgc ccttcacgga   6120
cagtggcagc gtgtcccggg acacatacct aggtcacttg ctgacactgt accgcgaggc   6180
cataggtcag gcgcatgtgg acgagcatac ttttccaggag attacaagtg tcagccgcgc   6240
gctggggcag gaggacacgg gcagcctgga ggcaaccta aactacctgc tgaccaaccg    6300
gcggcagaag atcccctcgt tgcacagttt cgcacccttt ggcgcatccc attctccagt   6360
aactttatgt ccatgggcgc actcacagac ctgggccaaa accttctcta cgccaactcc   6420
gcccacgcgc tagacatgac ttttgaggtg gatccccatg acgagcccac ccttctttat   6480
gttttgtttg aagtctttga cgtggtccgt gtgcaccgac cgcaccgcgg cgtcatcgaa   6540
accgtgtacc tgcgcacgcc cttctcggcc ggcaacgcca caacataaag agcaagcaa    6600
catcaacaac agctgccgcc atgggctcca gtgagcagga actgaaagcc attgtcaaag   6660
atcttggttg tgggccatat ttttttggca cctatgacaa gcgctttcca ggctttgttt   6720
ctccacacaa gctcgcctgc gccatagtca atacggccgg tcgcagact ggggcgtac    6780
actggatggc ctttgcctgg aacccgcact caaaaacatg ctacctcttt gagcccttg    6840
gcttttctga ccagcgactc aagcaggttt accagtttga gtacgagtca ctcctgcgcc   6900
gtagcgccat tgcttcttcc cccgaccgct gtataacgct ggaaaagtcc acccaaagcg   6960
tacagggggcc caactcggcc gcctgtggac tattctgctg catgttttctc cacgcctttg   7020
ccaactggcc ccaaactccc atggatcaca cccccaccat gaaccttatt accggggtac   7080
ccaactccat gctcaacagt ccccaggtac agcccaccct gcgtcgcaac caggaacagc   7140
tctacagctt cctggagcgc cactcgccct acttccgcag ccacagtgcg cagattagga   7200
gcgccacttc ttttttgtcac ttgaaaaaca tgtaaaaata atgtactaga gacactttca   7260
ataaaggcaa atgcttttat ttgtacactc tcgggtgatt atttaccccc acccttgccg   7320
tctgcgccgt ttaaaaatca aagggggttct gccgcgcatc gctatgcgcc actggcaggg   7380
acacgttgcg atactggtgt ttagtgctcc acttaaactc aggcacaacc atccgcggca   7440
gctcggtgaa gttttcactc cacaggctgc gcaccatcac caacgcgttt agcaggtcgg   7500
gcgccgatat cttgaagtcg cagttggggc ctccgccctg cgcgcgcgag ttgcgataca   7560
cagggttgca gcactggaac actatcagcg ccgggtggtg cacgctggcc agcacgctct   7620
tgtcggagat cagatccgcg tccaggtcct ccgcgttgct cagggcgaac ggagtcaact   7680
ttggtagctg ccttcccaaa aagggcgcgt gcccaggctt tgagttgcac tcgcaccgta   7740
gtggcatcaa aaggtgaccg tgcccggtct gggcgttagg atacagcgcc tgcataaaag   7800
ccttgatctg cttaaaagcc acctgagcct ttgcgccttc agagaagaac atgccgcaag   7860
acttgccgga aaactgattg gccggacagg ccgcgtcgtg cacgcagcac cttgcgtcgg   7920
tgttggagat ctgcaccaca tttcggcccc accggttcct cacgatcttg gccttgctag   7980
actgcctcctt cagcgcgcgc tgcccgtttt cgctcgtcac atccatttca atcacgtgtg   8040
ccttatttat cataatgctt ccgtgtagac acttaagctc gccttcgatc tcagcgcagc   8100
ggtgcagcca caacgcgcag cccgtgggct cgtgatgctt gtaggtcacc tctgcaaacg   8160
actgcaggta cgcctgcagg aatcgcccca tcatcgtcac aaaggtcttg ttgctggtga   8220
aggtcagctg caacccgcgg tgctcctcgt cagccaggtc cttgcatacg gccgccaggc   8280
cttcacttg gtcaggcagt agtttgaagt tcgcctttag atcgttatcc acgtggtact    8340
tgtccatcag cgcgcgcgca gcctccatgc ccttctccca cgcagacacg atcggcacac   8400
tcagcggggtt catcaccgta atttcacttt ccgcttcgct gggctcttcc tcttcctctt   8460
gcgtccgcat accacgcgcc actgggtcgt cttcattcag ccgcgcgcact gtgcgcttac   8520
ctcctttgcc atgcttgatt agcaccgtg ggttgctgaa acccaccatt tgtagcgcca    8580
catcttctct ttcttcctcg ctgtccacga ttacctctgg tgatggcggg cgctcgggct   8640
tgggagaagg gcgcttcttt ttcttcttgg gcgcaatggc caaatccgcc gccgaggtcg   8700
atggccgcgg gctgggtgtg gcggcacca gcgcgtcttg tgatgagtct tcctcgtcct    8760
cggactcgat acgccgcctc atccgcttt tgggggcgc ccggggaggc ggcggcgacg     8820
gggacgggga cgacgtcgt tccatggtgg ggggacgtcg gcgccaccg cgtccgcgcc     8880
cggggggtggt ttcgcgctgc tcctcttccc gactggccat ttccttctcc tataggcaga   8940
aaaagatcat ggagtcagtc gagaagaagg acagcctaac cgcccctct gagttcgcca     9000
ccaccgcctc caccgatgcc gccaacgcgc ctaccacctt ccccgtcgag gcaccccgc     9060
ttgaggagga ggaagtgatt atcgagcagg acccaggttt tgtaagcgaa gacgacgagg   9120
accgctcagt accaacagag gataaaaagc aagaccagga caacgcagag gcaaacgagg   9180
```

```
aacaagtcgg gcgggggac gaaaggcatg gcgactacct agatgtggga gacgacgtgc   9240
tgttgaagca tctgcagcgc cagtgcgcca ttatctgcga cgcgttgcaa gagcgcagcg   9300
atgtgcccct cgccatagcg gatgtcagcc ttgcctacga acgccaccta ttctcaccgc   9360
gcgtaccccc caaacgccaa gaaacggca catgcgagcc caacccgcgc ctcaacttct    9420
accccgtatt tgccgtgcca gaggtgcttg ccacctatca catctttttc caaaactgca   9480
agataccccct atcctgccgt gccaaccgca gccgagcgga caagcagctg gccttgcgc   9540
agggcgctgt catacctgat atcgcctcgc tcaacgaagt gccaaaaatc tttgagggtc   9600
ttggacgcga cgagaagcgc gcggcaaacg ctctgcaaca ggaaaacagc gaaaatgaaa   9660
gtcactctgg agtgttggtg gaactcgagg gtgacaacgc gcgcctagcc gtactaaaac   9720
gcagcatcga ggtcacccac tttgcctacc cggcacttaa cctacccccc aaggtcatga   9780
gcacagtcat gagtgagctg atcgtgcgcc gtgcgcagcc cctggagagg gatgcaaatt   9840
tgcaagaaca aacagaggag ggcctacccg cagttggcga cgagcagcta gcgcgctggc   9900
ttcaaacgcg cgagcctgcc gacttggagg agcgacgcaa actaatgatg gccgcagtgc   9960
tcgttaccgt ggagctgag tgcatgcagga ggttctttgc tgaccggag atgcagcgca   10020
agctagagga aacattgcac tacaccttc gacagggcta cgtacgccag gcctgcaaga   10080
tctccaacgt ggagctctgc aacctggtct cctaccttgg aatttgcac gaaaaccgcc    10140
ttgggcaaaa cgtgcttcat tccacgctca agggcgaggc gcgccgcgac tacgtccgcg   10200
actgcgttta cttatttcta tgctacacct ggcagacgc catgggcgtt tggcagcagt    10260
gcttggagga gtgcaacctc aaggagctgc agaaactgct aaagcaaaac ttgaaggacc   10320
tatgacggc cttcaacgag cgctccgtgg ccgcgcaccc tggcggacatc attttccccg    10380
aacgcctgct taaaaccctg caacagggtc tgccagactt caccagtcaa agcatgttgc   10440
agaactttag gaacttatc ctagagcgct caggaatcct gcccgccacc tgctgtgcac    10500
ttcctagcga ctttgtgccc attaagtacc gcgaatgccc tccgccgctt tggggccact   10560
gctaccttct gcagctagcc aactaccttg cctaccactc tgacataatg gaagacgtga   10620
gcggtgacgg tctactggag tgtcactgtc gctgcaacct atgcacccg caccgctccc    10680
tggttttgcaa ttcgcagctg cttaacgaaa gtcaaattat cggtaccttt gagctgcagt   10740
gtccctcgcc tgacgaaaag tccgcggctc cggggttgaa actcactccg gggctgtgga   10800
cgtcggctta ccttcgcaaa tttgtacctg aggactacca cgcccacgag attaggttct   10860
acgaagacca atcccgcccg ccaaatgcgg agcttaccgc ctgcgtcatt acccaggggcc   10920
acattcttgg ccaattgcaa gccatcaaca aagcccgcca agagttcg ctacgaaagg     10980
gacgggggt ttacttggac ccccagtccg gcgaggagct caacccaatc ccccgccgc    11040
cgcagcccta tcagcagcag ccgcgggccc ttgcttccca ggatggcacc caaaagaag    11100
ctgcagctgc cgccgccacc cacggacgag gaggaatact gggacagtca ggcagaggag   11160
gttttggacg aggaggagga ggacatgatg gaagactggg agagcctaga cgaggaagct   11220
tccgaggtcg aagaggtgtc agacgaaaca ccgtcaccct cggtcgcatt cccctcgcg    11280
gcgcccagga aatcggcaac cggttccagc atggctacaa cctccgctcc tcaggcgccg   11340
ccggcactgc ccgttcgccg acccaaccgt agatgggaca ccactggaac cagggccggt   11400
aagtccaagc agccgccgcc gttagcccaa gagcaacaac agcgcaagg ctaccgctca    11460
tggcgcgggc acaagaacgc catagttgct tgcttgcaag actgtggggg caacatctcc   11520
ttcgcccgcc gctttcttct ctaccatcac ggcgtggcct tccccgtaa catcctgcat    11580
tactaccgtc atctctacag cccatactgc accggcggca gcggcagcgg cagcaacagc   11640
agcggccaca cagaagcaaa ggcgaccgga tagcaagact ctgacaaagc ccagaaaatc   11700
cacgcggcg gcagcagcag gaggaggagc gctgcgtctg gcgcccaacg aacccgtatc    11760
gaccccgcgag cttagaaaca ggattttttc cactctgtat gctatatttc aacagagcag   11820
gggcaagaa caagagctga aaataaaaaa caggtctctg cgatccctca cccgcagctg    11880
cctgtatcac aaaagcgaag atcagcttcg gcgcacgctg gaagacgcgg aggctctctt   11940
cagtaaatac tgcgcgctga ctcttaagga ctagtttcgc gcccttttctc aaatttaagc   12000
gcgaaaacta cgtcatctcc agcggccaca cccggcgcca gcacctgtcg tcagcgccat    12060
tatgagcaag gaaattccca cgccctacat gtggagttac cagccacaaa tgggacttgc   12120
ggctggagct gcccaagact actcaacccg aataaaactac atgagcgcgg accccacat    12180
gatatcccgg gtcaacggaa tccgcgccca ccgaaaccga attctcttgg aacaggcggc   12240
tattaccacc acacctcgta ataaccttaa tccccgtagt tggcccgctg ccctggtgta    12300
ccaggaaagt cccgctccca ccactgtggt acttccaga gacgccagg ccgaagttca     12360
gatgactaac tcaggggcgc agcttgcggg cggcttcgt cacagggtgc ggtcgcccgg    12420
gcagggtata actcacctga caatcagagg gcgaggtatt cagctcaacg acgagtcggt   12480
gagctcctcg cttggtctcc gtccggacgg gacattcag atcggcggcg ccggccgtcc    12540
ttcattcacg cctcgtcagg caatcctaac tctgcagacc tcgtcctctg agccgcgctc    12600
tggaggcatt ggaactctgc aatttattga ggagtttgtg ccatcggtct actttaaccc    12660
cttctcggga cctcccgcc actatccgga tcaatttatt cctaactttg acgcggtaa     12720
ggactcggcg gacggctacg actgaatgtt aagtgagag gcagagcaac tgcgcctgaa     12780
acacctggtc cactgtcgcc gccacaagtc ttttgcccgc gactccggtg agttttgcta   12840
ctttgaattg cccgaggatc atatcgaggg cccggcgcac ggcgtccggc ttaccgccca   12900
gggagagctt gcccgtagcc tgattcggga gtttacccag cgcccctgc tagttgagcg    12960
ggacagggga ccctgtgttc tcactgtgat ttgcaactgt cctaaccttg gattacatca   13020
agatcctcta gttaattaac tagagtaccc ggggatctta ttccctttaa ctaataaaaa    13080
aaaataataa agcatcactt acttaaaatc agttagcaaa tttctgtcca gtttattcag    13140
cagcacctcc ttgccctcct cccagctctg gtattgcagc ttcctcctgg ctgcaaactt    13200
tctccacaat ctaaatgaa tgtcagtttc ctcctgttcc tgtccatccg cacccactat    13260
cttcatgttg ttgcagatga agcgcgcaag accgtcgta gataccttca accccgtgta   13320
tccatatgac acggaaaccg gtcctccaac tgtgcctttt cttactcctc cctttgtatc    13380
ccccaatggg tttcaagaga gtccccctgg ggtactctct ttgcgccctat ccgaaccctct   13440
agttacctcc aatggcatgc ttgcgctcaa aatgggcaac ggcctctctc tggacgaggc    13500
cggcaacctt acctccaaa atgtaaccac tgtgagccca cctctcaaaa aaccaagtc     13560
aaacataaac ctggaaatat ctgcaccct cagttaca tcagaagccc taactgtga      13620
tgccgccgca cctctaatgg tcgcgggcaa cacactcacc atgcaatcac aggcccgct    13680
aaccgtgcac gactccaaac ttagcattgc cacccaagga ccccctcacag tgtcagaagg   13740
aaagctagcc ctgcaaacat caggcccct caccaccacc gatagcagta cccttactat    13800
cactgcctca cccctctaa ctactgccac tggtagcttg ggcattgact tgaaagagcc    13860
catttataca caaaatggaa aactaggact aaagtacggg gctcctttgc atgtaacaga    13920
```

```
cgacctaaac actttgaccg tagcaactgg tccaggtgtg actattaata atacttcctt   13980
gcaaactaaa gttactggag ccttgggttt tgattcacaa ggcaatatgc aacttaatgt   14040
agcaggagga ctaaggattg attctcaaaa cagacgcctt atacttgatg ttagttatcc   14100
gtttgatgct caaaccaac  taaatctaag actaggacag ggccctcttt ttataaactc   14160
agcccacaac ttgatatta  actacaacaa aggcctttac ttgtttacag cttcaaacaa   14220
ttccaaaaag cttgaggtta acctaagcac tgccaagggg ttgatgtttg acgctacagc   14280
catagccatt aatgcaggag atgggcttga atttggttca cctaatgcac caaacacaaa   14340
tcccctcaaa acaaaaattg gccatggcct agaatttgat tcaaacaagg ctatggttcc   14400
taaactagga actggcctta gttttgacag cacaggtgcg attacagtag gaaacaaaaa   14460
taatgataag ctaactttgt ggaccacacc agctccatct cctaactgta gactaaatgc   14520
agagaaagat gctaaactca ctttggtctt aacaaaatgt ggcagtcaaa tacttgctac   14580
agtttcagtt ttggctgtta aaggcagttt ggctccaata tctggaacag ttcaaagtgc   14640
tcatcttatt ataagatttg acgaaaatgg agtgctacta aacaattcct tcctggaccc   14700
agaatattgg aactttagaa atggagatct tactgaaggc acagcctata caaacgctgt   14760
tggatttatg cctaacctat cagcttatcc aaaatctcac ggtaaaactg ccaaaagtaa   14820
cattgtcagt caagtttact aaacggaga  caaaactaaa cctgtaacac taaccattac   14880
actaaacggt acacaggaaa caggagacac aactccaagt gcatactcta tgtcattttc   14940
atgggactgg tctggcacac actacattaa tgaaatattt gccacatcct cttacacttt   15000
ttcatacatt gcccaagaat aaagaatcgt ttgtgttatg tttcaacgtg tttatttttc   15060
aattgcagaa aatttcaagt cattttcat  tcagtagtat agccccacca ccacatagct   15120
tatacagatc accgtaccttt aatcaaactc acagaaccct agtattcaac ctgccacctc   15180
cctcccaaca cacagagtac acagtccttt ctccccggct ggccttaaaa agcatcatat   15240
catgggtaac agacatattc ttaggtgtta tattccacac ggtttcctgt cgagccaaac   15300
gctcatcagt gatattaata aactcccggg gcagctcact taagttcatg tcgctgtcca   15360
gctgctgagc cacaggctgc tgtccaactt gcggttgctt aacgggcggc gaaggagaag   15420
tccacgccta catggggta  gagtcataat cgtgcatcag gatagggcgg tggtgctgca   15480
gcagcgcgcg aataaactgc tgccgccgcc gctccgtcct gcaggaatac aacatgcag   15540
tggtctcctc agcgatgatt cgcaccgccc gcagcataag gcgcctttgtc ctccgggcac   15600
agcagcgcac cctgatctca cttaaatcag cacagtaact gcagcacagc accacaatat   15660
tgttcaaaat cccacagtgc aaggcgctgt atccaaagct catggcgggg accacagaac   15720
ccacgtggcc atcataccac aagcgcaggt agattaagtg gcgaccctc  ataaacacgc   15780
tggacataaa cattacctct tttggcatgt tgtaattcac cacctcccgg taccatataa   15840
acctctgatt aaacatggcg ccatccacca ccatcctaaa ccagctggcc aaaacctgcc   15900
cgccggctat acactgcagg gaaccgggac tggaacaagt acagtggaga gcccaggact   15960
cgtaaccatg gatcatcatg ctcgtcatga tatcatgtt  ggcacaacac aggcacacgt   16020
gcatacactt cctcaggatt acaagctcct cccgcgttag aaccatatcc cagggaacaa   16080
cccattcctg aatcagcgta aatcccacac tgcaggaag  acctcgcacg taactcacgt   16140
tgtgcattgt caaagtgtta cattcgggca gcagcggatg atcctccagt atggtagcgc   16200
gggtttctgt ctcaaaagga ggtagacgat ccctactgta cggagtgcgc cgagacaacc   16260
gagatcgtgt tggtcgtagt gtcatgccaa atggaacgcc ggacgtagtc atatttcctg   16320
aagcaaaacc aggtgcgggc gtgacaaaca gatctgcgtc tccggtctcg ccgcttagat   16380
cgctctgtgt agtagttgta gtatatccac tctctcaaag catccaggcg cccctggct   16440
tcgggttcta tgtaaactcc ttcatgcgcc gctgccctga taacatccac caccgcagaa   16500
taagccacac ccagccaacc tacacattcg ttctgcgagt cacacacggg aggagcggga   16560
agagctggaa gaaccatgtt ttttttttta ttccaaaaga ttatcaaaaa cctcaaaatg   16620
aagatctatt aagtgaacgc gctcccctcc ggtggcgtgg tcaaactcta cagccaaaga   16680
acagataggg gcatttgtaa gatgttgcac aatggcttcc aaaaggcaaa cggccctcac   16740
gtccaagtgg acgtaaaggc taaacccttc agggtgaatc tcctctataa acattccagc   16800
accttcaacc atgccaaat  aattctcatc tcgccacctt ctcaatatat ctctaagcaa   16860
atcccgaata ttaagtccgg ccattgtaaa aatctgctcc agagcgccct ccaccttcag   16920
cctcaagcag cgaatcatga ttgcaaaaat tcaggttcct cacagacctg tataagattc   16980
aaaagcggaa cattaacaaa aataccgcga tccgtaggt  cccttcgcag ggccagctga   17040
acataatcgt gcaggtctgc acggaccagc gcggccactt ccccgccagg aaccttgaca   17100
aaagaaccca cactgattat gacacgcata ctcggagcta tgctaaccag cgtagccccg   17160
atgtaagctt tgttgcatgg gcggcgatat aaaatgcaag gtgctgctca aaaaatcagg   17220
caaagcctcg cgcaaaaaag aaagcacatc gtagtcatgc tcatgcagat aaaggcaggt   17280
aagctccgga accaccacag aaaaagacac cattttctc tcaaacatgt ctgcgggttt   17340
ctgcataaac acaaaataaa ataacaaaaa acatttaaa  cattagaagc ctgtcttaca   17400
acaggaaaaa caacccttat aagcataaga cggactacgg ccatgccggc gtgaccgtaa   17460
aaaaactggt caccgtgatt aaaaagcacc accgacagct cctcggtcat gtccggagtc   17520
ataatgtaag actcggtaaa cacatcaggt tgattcatcg gtcagtgcta aaaagcgacc   17580
gaaatagccc gggggaatac ataccgcag  gcgtagagac aacattacag cccccatagg   17640
aggtataaca aaattaatag gagagaaaaa cacataaaca cctgaaaaac cctcctgcct   17700
aggcaaaata gcaccctccc gctccagaac aacatacagc gcttcacagc ggcagcctaa   17760
cagtcagcct taccagtaaa aagaaaacc  tattaaaaaa acaccactcg cacggcacc   17820
agctcaatca gtcacagtgt aaaaaaggc  caagtcagaa gcgagtatat ataggactaa   17880
aaaatgacgt aacggttaaa gtccacaaaa aacacccaga aaaccgcacg cgaacctacg   17940
cccagaaacg aaagccaaaa aacccacaac ttcctcaaac cgtcacttcc gttttcccac   18000
gttacgtaac ttcccatttt aagaaaacta caattcccaa cacatacaag ttactccgcc   18060
ctaaaaccta cgtcacccgc cccgttccca cgccccgcgc cacgtcacaa actccaccc   18120
ctcattatca tattggcttc aatccaaaat aaggtatatt attgatgatt tattttggat   18180
tgaagccaat atgataatga gggggtggag tttgtgacgt ggcgcgggc  gtgggaacgg   18240
ggcgggtgac gtagtagtgt ggcggaagtg tgatgttgca agtgtggcgg aacacatgta   18300
agcgacggat gtggcaaaag tgacgttttt ggtgtgccgc ggatccgac  gacgggtgtg   18360
gtcgccatga tcgcgtagtc gatagtggct ccaagtagcg aagcgagcag gactgggcgg   18420
cggcaaaagc ggtcggacag tgctccgaga acgggtgcgc atagaaattg catcaacgca   18480
tatagcgcta gcagcacgcc atagtgactg gcgatgctgt cggaatggac gatatcccgc   18540
aagaggcccg gcagtaccgg cataaccaag cctatgcctc agcatccagg ggtgacggtg   18600
ccgaggatga cgatgagcgc attgttagat ttcatacacg gtgcctgact gcgttagcaa   18660
```

```
tttaactgtg ataaactacc gcattaaagc ttatcgaatt cgtaatcatg gtcatagctg  18720
ttcctgtgt gaaattgtta tccgctcaca attccacaca acatacgagc cggaagcata   18780
aagtgtaaag cctggggtgc ctaatgagtg agctaactca cattaattgc gttgcgctca   18840
ctgcccgctt tccagtcggg aaacctgtcg tgccagctgc attaatgaat cggccaacgc   18900
gcggggagag gcggtttgcg tattgggcgc                                    18930
```

```
SEQ ID NO: 9              moltype = DNA   length = 21
FEATURE                   Location/Qualifiers
misc_feature              1..21
                          note = Synthetic Polynucleotide
source                    1..21
                          mol_type = other DNA
                          organism = synthetic construct
SEQUENCE: 9
tcccatagta acgccaatag g                                              21

SEQ ID NO: 10             moltype = DNA   length = 23
FEATURE                   Location/Qualifiers
misc_feature              1..23
                          note = Synthetic Polynucleotide
source                    1..23
                          mol_type = other DNA
                          organism = synthetic construct
SEQUENCE: 10
cttggcatat gatacacttg atg                                            23

SEQ ID NO: 11             moltype = DNA   length = 24
FEATURE                   Location/Qualifiers
misc_feature              1..24
                          note = Synthetic Polynucleotide
source                    1..24
                          mol_type = other DNA
                          organism = synthetic construct
SEQUENCE: 11
atggaaacat tctcggccac aagc                                           24

SEQ ID NO: 12             moltype = DNA   length = 23
FEATURE                   Location/Qualifiers
misc_feature              1..23
                          note = Synthetic Polynucleotide
source                    1..23
                          mol_type = other DNA
                          organism = synthetic construct
SEQUENCE: 12
tcgccgattg gagtgttctg ttg                                            23

SEQ ID NO: 13             moltype = DNA   length = 20
FEATURE                   Location/Qualifiers
misc_feature              1..20
                          note = Synthetic Polynucleotide
source                    1..20
                          mol_type = other DNA
                          organism = synthetic construct
SEQUENCE: 13
ggacggcgag ttcatctaca                                                20

SEQ ID NO: 14             moltype = DNA   length = 20
FEATURE                   Location/Qualifiers
misc_feature              1..20
                          note = Synthetic Polynucleotide
source                    1..20
                          mol_type = other DNA
                          organism = synthetic construct
SEQUENCE: 14
ttgacctcag cgtcgtagtg                                                20

SEQ ID NO: 15             moltype = DNA   length = 20
FEATURE                   Location/Qualifiers
misc_feature              1..20
                          note = Synthetic Polynucleotide
source                    1..20
                          mol_type = other DNA
                          organism = synthetic construct
SEQUENCE: 15
ggctgatgtc aggagggata                                                20

SEQ ID NO: 16             moltype = DNA   length = 20
FEATURE                   Location/Qualifiers
misc_feature              1..20
```

```
                        note = Synthetic Polynucleotide
source                  1..20
                        mol_type = other DNA
                        organism = synthetic construct
SEQUENCE: 16
gggacagtga atccggaaag                                           20

SEQ ID NO: 17           moltype = DNA  length = 20
FEATURE                 Location/Qualifiers
misc_feature            1..20
                        note = Synthetic Polynucleotide
source                  1..20
                        mol_type = other DNA
                        organism = synthetic construct
SEQUENCE: 17
aagtcgtgca gcaggatatg                                           20
```

METHODS OF PACKAGING MULTIPLE ADENO-ASSOCIATED VIRUS VECTORS

CROSS-REFERENCE TO RELATED APPLICATIONS

This application is a continuation of U.S. patent application Ser. No. 16/989,857, filed Aug. 10, 2020, which is a continuation of U.S. patent application Ser. No. 15/320,707, filed Dec. 20, 2016, which is a national stage filing under 35 U.S.C. § 371 of International Application No. PCT/US2015/036841, filed Jun. 20, 2015, which claims the benefit under 35 U.S.C. § 119(e) of U.S. provisional application No. 62/015,031, filed Jun. 20, 2014, each of which is incorporated by reference herein in its entirety.

FEDERALLY SPONSORED RESEARCH OR DEVELOPMENT

This invention was made with government support under P01 HL059412 awarded by the National Institutes of Health National Heart, Lung, and Blood Institute and the National Institutes of Health. The government has certain rights in the invention.

REFERENCE TO AN ELECTRONIC SEQUENCE LISTING

The contents of the electronic sequence listing (U120270022US03-SEQ-EPG.xml; Size: 60,399 bytes; and Date of Creation: Nov. 21, 2022) is herein incorporated by reference in its entirety.

BACKGROUND OF THE INVENTION

Recombinant adeno-associated virus (rAAV) particles are a promising method for therapeutic gene delivery to treat a multitude of diseases. In some cases, use of multiple rAAV particles, as a mixed population, is desirable. For example, it may be that the transgene is too large to be effectively packaged into a single rAAV particle, such that two rAAV particles must be used to package the entire transgene. Alternatively, multiple transgenes may be required for effective treatment, for instance if multiple proteins are involved in disease progression. Further, it may be desirable to use multiple promoters to target different tissues. For these reasons, mixed populations of rAAV particles may be appropriate for certain types of gene therapy. Unfortunately, hurdles still exist for rapidly and cost-effectively producing mixed populations of rAAV particles.

SUMMARY OF THE INVENTION

Aspects of the disclosure are based, in part, on the development of an efficient and inexpensive method of co-packaging of multiple plasmids containing different expression cassettes using a single transfection step to produce preparations of recombinant adeno-associated virus (rAAV) particles containing a desired ratio of the different expression cassette plasmids. It was found that two plasmids, either encoding different transgenes or encoding the same transgenes but under the control of different promoters, could be transfected simultaneously into cells at several ratios. It was surprisingly found that the transduced cells produced a mixed population of rAAV particles having a ratio that was approximately the same as the input ratio of the two plasmids at the transfection step. This study showed that mixed rAAV particle preparations containing rAAV particles encapsidating different nucleic acid molecules could be prepared using a single step for introducing the plasmids into producer cells.

Accordingly, aspects of the disclosure relate to methods of co-packaging rAAV particles.

Some aspects of the disclosure relate to methods of producing a recombinant adeno-associated virus rAAV particle preparation having a target ratio of at least a first rAAV particle to a second rAAV particle (e.g., a target ratio of a first rAAV particle to a second rAAV particle, or a target ratio of a first rAAV particle to a second rAAV particle to a third rAAV particle, or a target ratio of a first rAAV particle to a second rAAV particle to a third rAAV particle to a fourth rAAV particle, etc.), the method comprising
(a) contacting a cell preparation with
(i) at least two (e.g., two, three, four, five, or more) nucleic acid vectors described herein (e.g., each containing a construct comprising a heterologous nucleic acid region encoding a protein or polypeptide or an RNA and nucleic acid regions comprising an inverted terminal repeat (ITR) flanking each side of the heterologous nucleic acid region);
wherein the cell preparation is contacted under conditions sufficient for producing at least two (e.g., two, three, four, five, or more) rAAV particles comprising the constructs of the at least two (e.g., two, three, four, five, or more) nucleic acid vectors; and
(b) isolating the at least two (e.g., two, three, four, five, or more) rAAV particles from the cell preparation, thereby producing a rAAV preparation having a target ratio of the at least two (e.g., two, three, four, five, or more) rAAV particles.

In some embodiments, a method of producing a recombinant adeno-associated virus (rAAV) particle preparation having a target ratio of a first rAAV particle to a second rAAV particle is provided, the method comprising:
(a) contacting a cell preparation with:
(i) a first nucleic acid vector containing a first construct comprising a heterologous nucleic acid region encoding a first protein or polypeptide and nucleic acid regions comprising an inverted terminal repeat (ITR) flanking each side of the heterologous nucleic acid region;
(ii) a second nucleic acid vector containing a second construct comprising a heterologous nucleic acid region encoding a second protein or polypeptide and nucleic acid regions comprising an inverted terminal repeat (ITR) flanking each side of the heterologous nucleic acid region,
wherein the cell preparation is contacted under conditions sufficient for producing a first rAAV particle comprising the first construct and a second rAAV particle comprising the second construct; and
(b) isolating the first rAAV particle and the second rAAV particle from the cell preparation, thereby producing a rAAV preparation having a target ratio of the first rAAV particle to the second rAAV particle.

In some embodiments, the cell preparation is contacted simultaneously with the first nucleic acid vector and the second nucleic acid vector. In some embodiments, the first nucleic acid vector and the second nucleic acid vector are present in an initial ratio of the first nucleic acid vector to the second nucleic acid vector when contacted with the cell preparation. In some embodiments, the target ratio of the first rAAV particle and the second rAAV particle is compared to the initial ratio of the first nucleic acid vector to the second nucleic acid vector. In some embodiments, the target ratio of the first rAAV particle to the second rAAV particle is within 10% of the initial ratio of the first nucleic acid vector to the second nucleic acid vector. In some embodiments, the initial ratio is 1:1, 1:9 or 9:1 of the first nucleic acid vector to the second nucleic acid vector. In some embodiments, the target ratio of the first rAAV particle to the second rAAV particle is measured after isolating the first rAAV particle and the second rAAV particle from the cell preparation. In some embodiments, the target ratio of the first rAAV particle to the second rAAV particle is measured by measuring a level of DNA from the first rAAV particle and a level of DNA from the second rAAV particle. In some embodiments, the level of DNA is measured using PCR, sequencing or flow cytometry. In some embodiments, the level of DNA is measured using PCR and the PCR is quantitative PCR.

In some embodiments of any one of the methods described herein, step (a) comprises transfecting the cell preparation with the first nucleic acid vector and the second nucleic acid vector. In some embodiments, the first nucleic acid vector and the second nucleic acid vector are a first plasmid and a second plasmid. In some embodiments, the method further comprises contacting the cell preparation with at least one helper plasmid. In some embodiments, the at least one helper plasmid is a first helper plasmid comprising a rep gene and a cap gene and a second helper plasmid comprising a E1a gene, a E1b gene, a E4 gene, a E2a gene, and a VA gene.

In some embodiments of any one of the methods described herein, step (a) comprises infecting the cell preparation with the first nucleic acid vector and the second nucleic acid vector. In some embodiments, the first nucleic acid vector is contained within a first herpes simplex virus type 1 (HSV) particle and the second nucleic acid vector is contained within a second HSV particle. In some embodiments, the first nucleic acid vector is contained within a first baculovirus particle and the second nucleic acid vector is contained within a second baculovirus particle.

In some embodiments of any one of the methods described herein, step (a) comprises incubating the cell preparation for at least 60 hours after contacting the cell preparation with the first nucleic acid vector and the second nucleic acid vector.

In some embodiments of any one of the methods described herein, step (b) comprises lysing the cell preparation and extracting the first rAAV particle and the second rAAV particle. In some embodiments, the first rAAV particle and the second rAAV particle are extracted simultaneously.

In some embodiments, two or more vectors are provided in a ratio of interest (e.g., a specified ratio or range of ratios) to produce different rAAVs in the cell preparation, and a preparation of the different rAAV particles is prepared from the cell preparation. In some embodiments, the different rAAV particles are isolated together (e.g., using an isolation procedure that isolates a mixture of the different rAAV particles).

In some embodiments, a preparation of two rAAV particles described herein can be used to deliver different genes, different gene fragments (e.g., different regions of the same gene or different genes), with or without promoters, and/or with or without other regulatory nucleic acid sequences to a cell (e.g., in vitro or in a subject). In some embodiments, the genes or gene fragments are human genes. In some embodiments, a protein or polypeptide encoded by a nucleic acid described herein is a full length protein or polypeptide. In some embodiments, a protein or polypeptide encoded by a nucleic acid described herein is a fragment of a full length protein or polypeptide (e.g., a functional fragment). In some embodiments, the nucleic acids (e.g., genes or gene fragments) are recombinant nucleic acids (e.g., recombinant genes). In some embodiments, the genes or gene fragments are used for gene rescue. In some embodiments, the genes or gene fragments are used to provide one or more RNAs or proteins to a cell or a subject. In some embodiments, the one or more RNAs or proteins are therapeutic RNAs or proteins (e.g., they encode a naturally occurring or recombinant enzyme, cytokine, receptor, kinase, regulatory protein, ligand, antibody, or other RNA or protein that is useful to assist in the treatment of a disease or condition). In some embodiments, a preparation of rAAV particles are delivered to a subject (e.g., a human subject) for example via injection or other delivery route. In some embodiments, the subject is a subject having a disease or condition that can be treated with the one or more nucleic acids that are delivered using the rAAV particles. In some embodiments, a preparation of rAAV particles are contacted to a preparation of cells in vitro. In some embodiments, the cells are cells from a subject (e.g., isolated from a human subject) and the cells are administered (e.g., re-administered to the human subject) after being modified by the nucleic acids in the rAAV particles (e.g., after genome editing or after receiving one or more constructs that express an RNA or protein of interest such as a therapeutic RNA or protein).

In some embodiments of any one of the methods described herein, the first rAAV particle and the second rAAV particle are each rAAV 2/9 pseudotyped particles. In some embodiments of any one of the methods described herein, more than two rAAV particles are each rAAV 2/9 pseudotyped particles.

The details of one or more embodiments of the disclosure are set forth in the description below. Other features or advantages of the present disclosure will be apparent from the following drawings and detailed description of several embodiments, and also from the appending claims.

BRIEF DESCRIPTION OF THE DRAWINGS

The following drawings form part of the present specification and are included to further demonstrate certain aspects of the present disclosure, which can be better understood by reference to one or more of these drawings in combination with the detailed description of specific embodiments presented herein.

FIG. 5A) AAV9-LSP-coGAA and AAV9-DES-coGAA were co-packaged and purified at 1:9 (lanes 1, 4 and 7), 1:1 (lanes 2, 5 and 8) and 9:1 ratios (lanes 3, 6 and 9), respectively. AAV9-LSP-coGAA band is 288 bp and AAV9-DES-coGAA is 453 bp. DNA was amplified from each preparation and ran on 1.5% agarose gel.

DETAILED DESCRIPTION OF THE INVENTION

Figure 1:
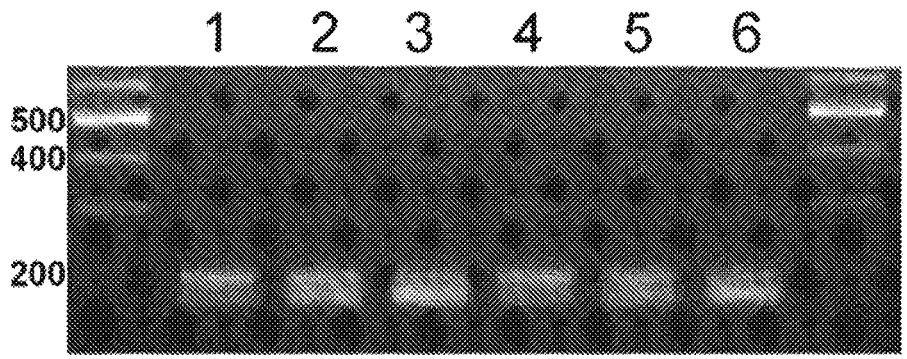
FIG. 1 is a photograph of a DNA gel showing differential packaging of expression cassettes combined prior to transfection. The vectors contained different transgenes which were used for delineation. DNA was amplified from each preparation and ran on 2% agarose gel. GFP band is 171 bp and mCherry is 191 bp. Lanes 1-3 contain DNA amplified from vectors in crude lysate (post-benzonase treatment); lanes 4-6 contain DNA amplified from vectors purified via iodixanol gradient originating from the crude lysates in lanes 1-3. Vector constructs were co-packaged in AAV9 at ratios of GFP to mCherry 1:9, 1:1 and 9:1, respectively. Gel is one representative image of three separate co-packaging experiments.

Limiting factors in large pre-clinical and clinical studies utilizing adeno-associated virus (AAV) particles for gene therapy are focused on the restrictive packaging capacity, the overall yields and the versatility of the production methods for single AAV vector production. Furthermore, applications where multiple vectors are needed to provide long expression cassettes, whether due to long cDNA sequences or the need of different regulatory elements, require that each vector be packaged and characterized separately, directly affecting labor and cost associated with such manufacturing strategies.

As described herein, a rapid and inexpensive method was devised for co-packaging multiple expression constructs encoding different proteins or encoded the same proteins with different promoters into multiple recombinant adeno-associated virus (rAAV) particles, to produce a mixed population of rAAV particles. It was surprisingly found that the input ratio of two plasmids containing two different expression constructs correlated well with the output ratio of rAAV particles containing the two different expression constructs, demonstrating that the method could be used to reliably predict output ratios of rAAV particles based on the initial ratio of plasmids. This study showed feasibility and reproducibility of a method that allows for two constructs, differing in either transgene or control elements, to be efficiently co-packaged and characterized simultaneously, reducing time and cost of manufacturing and release testing.

Accordingly, aspects of the disclosure relate to methods of producing a recombinant adeno-associated virus rAAV particle preparation having a target ratio of at least a first rAAV particle to a second rAAV particle (e.g., a target ratio of a first rAAV particle to a second rAAV particle, or a target ratio of a first rAAV particle to a second rAAV particle to a third rAAV particle, or a target ratio of a first rAAV particle to a second rAAV particle to a third rAAV particle to a fourth rAAV particle, etc.), the method comprising
  (a) contacting a cell preparation with
    (i) at least two (e.g., two, three, four, five, or more) nucleic acid vectors described herein (e.g., each containing a construct comprising a heterologous nucleic acid region encoding a protein or polypeptide or an RNA and nucleic acid regions comprising an inverted terminal repeat (ITR) flanking each side of the heterologous nucleic acid region);
  wherein the cell preparation is contacted under conditions sufficient for producing at least two (e.g., two, three, four, five, or more) rAAV particles comprising the constructs of the at least two (e.g., two, three, four, five, or more) nucleic acid vectors; and
  (b) isolating the at least two (e.g., two, three, four, five, or more) rAAV particles from the cell preparation, thereby producing a rAAV preparation having a target ratio of the at least two (e.g., two, three, four, five, or more) rAAV particles.

In some embodiments, the method comprises:
  (a) contacting a cell preparation with
    (i) a first nucleic acid vector described herein (e.g., containing a first construct comprising a heterologous nucleic acid region encoding a first protein or polypeptide and nucleic acid regions comprising an inverted terminal repeat (ITR) flanking each side of the heterologous nucleic acid region);
    (ii) a second nucleic acid vector described herein (e.g., containing a second construct comprising a heterologous nucleic acid region encoding a second protein or polypeptide and nucleic acid regions comprising an inverted terminal repeat (ITR) flanking each side of the heterologous nucleic acid region),
  wherein the cell preparation is contacted under conditions sufficient for producing a first rAAV particle comprising the first construct and a second rAAV particle comprising the second construct; and
  (b) isolating the first rAAV particle and the second rAAV particle from the cell preparation, thereby producing a rAAV preparation having a target ratio of the first rAAV particle to the second rAAV particle.

In some embodiments, the method comprises:
  (a) contacting a cell preparation with
    (i) a first nucleic acid vector described herein (e.g., containing a first construct comprising a heterologous nucleic acid region encoding a first protein or polypeptide or RNA and nucleic acid regions comprising an inverted terminal repeat (ITR) flanking each side of the heterologous nucleic acid region);
(ii) a second nucleic acid vector described herein (e.g., containing a second construct comprising a heterologous nucleic acid region encoding a second protein or polypeptide or RNA and nucleic acid regions comprising an inverted terminal repeat (ITR) flanking each side of the heterologous nucleic acid region),
(iii) a third nucleic acid vector described herein (e.g., containing a third construct comprising a heterologous nucleic acid region encoding a third protein or polypeptide or RNA and nucleic acid regions comprising an inverted terminal repeat (ITR) flanking each side of the heterologous nucleic acid region),
wherein the cell preparation is contacted under conditions sufficient for producing a first rAAV particle comprising the first construct, a second rAAV particle comprising the second construct, and a third rAAV particle comprising the third construct; and
(b) isolating the first rAAV particle, the second rAAV particle, and the third rAAV particle from the cell preparation, thereby producing a rAAV preparation having a target ratio of the first rAAV particle to the second rAAV particle to the third rAAV particle.

In some embodiments, the method comprises:
(a) contacting a cell preparation with
(i) a first nucleic acid vector described herein (e.g., containing a first construct comprising a heterologous nucleic acid region encoding a first protein or polypeptide or RNA and nucleic acid regions comprising an inverted terminal repeat (ITR) flanking each side of the heterologous nucleic acid region);
(ii) a second nucleic acid vector described herein (e.g., containing a second construct comprising a heterologous nucleic acid region encoding a second protein or polypeptide or RNA and nucleic acid regions comprising an inverted terminal repeat (ITR) flanking each side of the heterologous nucleic acid region),
(iii) a third nucleic acid vector described herein (e.g., containing a third construct comprising a heterologous nucleic acid region encoding a third protein or polypeptide or RNA and nucleic acid regions comprising an inverted terminal repeat (ITR) flanking each side of the heterologous nucleic acid region),
(iv) a fourth nucleic acid vector described herein (e.g., containing a fourth construct comprising a heterologous nucleic acid region encoding a fourth protein or polypeptide or RNA and nucleic acid regions comprising an inverted terminal repeat (ITR) flanking each side of the heterologous nucleic acid region),
wherein the cell preparation is contacted under conditions sufficient for producing a first rAAV particle comprising the first construct, a second rAAV particle comprising the second construct, a third rAAV particle comprising the third construct, and a fourth rAAV particle comprising the fourth construct; and
(b) isolating the first rAAV particle, the second rAAV particle, the third rAAV particle, and the fourth rAAV particle from the cell preparation, thereby producing a rAAV preparation having a target ratio of the first rAAV particle to the second rAAV particle to the third rAAV particle to the fourth rAAV particle.

Ratios

In some embodiments, the first nucleic acid vector and the second nucleic acid vector are present in an initial ratio of the first nucleic acid vector to the second nucleic acid vector when contacted with the cell preparation. In some embodiments, the initial ratio is determined by adding a known concentration of the first nucleic acid vector and a known concentration of the second nucleic acid vector to a composition and contacting the composition with the cell preparation. In some embodiments, the initial ratio is determined by measuring the concentration of the first nucleic acid vector and the second nucleic acid vector, e.g., when present together in a composition. The measuring may be done using any method known in the art, e.g., by PCR.

The initial ratio of the first nucleic acid vector to the second nucleic acid vector (and optionally third nucleic acid vector, fourth nucleic acid vector, etc.) may be any ratio that is suitable for obtaining a desired target ratio. The target ratio will depend upon the disease to be treated, the proteins or polypeptides to be delivered, the tissue(s) to be targeted, the promoter to be used, the size of nucleic acid vectors and other such considerations within the knowledge of the person skilled in the art. In some embodiments, if the sizes of the nucleic acid vectors are not approximately equal, the ratios may be adjusted to compensate for differences in packaging efficiency. For example, the molar ratios of the nucleic acid vectors may be adjusted to produce equimolar input ratios that result in appropriate ratios of output rAAV particles, as smaller vectors, e.g., of about 4.2-4.7 kb in size, are generally packaged more abundantly. In some embodiments, for instance, if one nucleic acid vector (e.g., pTR-X plasmid) is ¾ the size of the other nucleic acid vector (e.g., pTR-Y plasmid), then the amount of pTR-Y may be increased to compensate for the size difference between the two vectors. An exemplary calculation for determining molar ratio is shown below:

$$\frac{\text{Amount of } pTR - X(ng) \times \text{Size of } pTR - Y(bp)}{\text{Size of } pTR - X(bp)} \times \frac{1}{1} =$$

Amount of $pTR - Y$ to add for 1:1 molar ratio

Calculating and producing equimolar ratios of nucleic acid vectors, e.g., upon transfection, can be done using routine techniques. In some embodiments, the initial ratio (e.g., initial molar ratio) is 1:1, 1:2, 1:3, 1:4, 1:5, 1:6, 1:7, 1:8, 1:9, 1:10, 1:20, 1:30, 1:40, 1:50, 1:60, 1:70, 1:80, 1:90 or 1:100 (or any ratio in between 1:1 and 1:100) of the first nucleic acid vector to the second nucleic acid vector. In some embodiments, if more than two nucleic acid vectors (e.g., three or four nucleic acid vectors) are utilized, then the initial ratio is, for example, 1:1:1, 1:1:1:1, 1:2:2, 1:2:2:1, 1:2:2:2, 1:2:3, 1:2:3:4, 1:2:1, 1:2:1:2, 1:2:1:1 (or any ratio between 1:1:1 and 1:100:100 or between 1:1:1:1 and 1:100:100:100) of the more than two nucleic acid vectors. It should be appreciated the ratio of any two particular nucleic acid vectors can be different (e.g., 1:2 or 1:2:3 or 1:2:1:2). In some embodiments, the target ratio is 1:1, 1:2, 1:3, 1:4, 1:5, 1:6, 1:7, 1:8, 1:9, 1:10, 1:20, 1:30, 1:40, 1:50, 1:60, 1:70, 1:80, 1:90 or 1:100 (or any ratio in between 1:1 and 1:100) of the first rAAV particle to the second rAAV particle. In some embodiments, if more than two nucleic acid vectors (e.g., three or four nucleic acid vectors) are utilized, then the target ratio is, for example, 1:1:1, 1:1:1:1, 1:2:2, 1:2:2:1, 1:2:2:2, 1:2:3, 1:2:3:4, 1:2:1, 1:2:1:2, 1:2:1:1 (or any ratio between 1:1:1 and 1:100:100 or between 1:1:1:1 and 1:100:100:100) of the more than two rAAV particles (e.g., three or four rAAV particles). However, it should be appreciated that any initial ratio of interest between two or more vectors or constructs can be used.

In some embodiments, the target ratio is compared to the initial ratio. In some embodiments, the target ratio of the first rAAV particle to the second rAAV particle is compared to the initial ratio of the first nucleic acid vector to the second nucleic acid vector. The comparison may be done, e.g., with the assistance of software on a computer. In some embodiments, the target ratio is within a certain percentage of the initial ratio. In some embodiments, the target ratio is within 20%, 15%, 10%, 9%, 8%, 7%, 6%, 5%, 4%, 3%, 2%, or 1% of the initial ratio. In some embodiments, the target ratio of the first rAAV particle to the second rAAV particle is within a certain percentage of the initial ratio of the first nucleic acid vector to the second nucleic acid vector. In some embodiments, the target ratio of the first rAAV particle to the second rAAV particle is within 20%, 15%, 10%, 9%, 8%, 7%, 6%, 5%, 4%, 3%, 2%, or 1% of the initial ratio of the first nucleic acid vector to the second nucleic acid vector. The percentage may be determined, e.g., by comparing the amount of the first rAAV particle and the second rAAV particle in the rAAV preparation. In some embodiments, the target ratio is within 0-20%, 0-15%, 0-10%, 0-9%, 0-8%, 0-7%, 0-6%, 0-5%, 1-10%, 1-9%, 1-8%, 1-7%, 1-6%, 1-5%, 2-10%, 2-9%, 2-8%, 2-7%, 2-6%, 2-5%, 3-10%, 3-9%, 3-8%, 3-7%, 3-6%, or 3-5% of the initial ratio. In some embodiments, the target ratio of the first rAAV particle to the second rAAV particle is within 0-20%, 0-15%, 0-10%, 0-9%, 0-8%, 0-7%, 0-6%, 0-5%, 1-10%, 1-9%, 1-8%, 1-7%, 1-6%, 1-5%, 2-10%, 2-9%, 2-8%, 2-7%, 2-6%, 2-5%, 3-10%, 3-9%, 3-8%, 3-7%, 3-6%, or 3-5% of the initial ratio of the first nucleic acid vector to the second nucleic acid vector.

In some embodiments, the initial ratio and/or the target ratio are measured. The initial and/or target ratio may be measured using any method known in the art or described herein (see, e.g., Current Protocols in Molecular Biology, Wiley Intersciences), e.g., using a DNA-detection assay (e.g., PCR, sequencing, or probes), a protein detection assay (e.g., Western blot, silver stain, coomassie stain, immunohistochemistry, flow cytometry or immunofluorescence), or a virus infectivity assay (e.g., a green cell assay). A PCR assay may be any type of PCR known in the art including, but not limited to quantitative PCR. A sequencing assay may be any type of sequencing known in the art including, Sanger sequencing or massive parallel sequencing (e.g., Ion Torrent, pyrosequencing, sequencing by synthesis, and sequencing by ligation). In some embodiments, the target ratio of the first rAAV particle to the second rAAV particle is measured after isolating the first rAAV particle and the second rAAV particle from the cell preparation. In some embodiments, the target ratio of the first rAAV particle to the second rAAV particle is measured by measuring a level of DNA from the first rAAV particle and a level of DNA from the second rAAV particle.

Nucleic Acid Vectors and rAAV Particles

Aspects of the disclosure relate to nucleic acid vectors for co-packaging into rAAV (recombinant adeno-associated virus) particles. The produced rAAV particles have many uses, e.g., in methods and pharmaceutical compositions for treating a disease in a subject in need thereof (e.g., a subject having a disease involving reduced protein expression that may be treated with gene therapy), for infecting cells to screen rAAV particles for a desired phenotype (e.g., upregulation of a protein or polypeptide of interest in the cell), or for infecting animals to screen for pharmacokinetics and/or therapeutic efficacy of an rAAV.

In some embodiments, a first nucleic acid vector and a second nucleic acid vector are contemplated for use in a method described herein. In some embodiments, further nucleic acid vectors are contemplated for use in a method described herein (a first, second, third, fourth, and/or fifth nucleic acid vector, etc.). The terms "first", "second", "third", etc., are not meant to imply a specific order or importance unless explicitly indicated otherwise.

In some embodiments, each nucleic acid vector comprises a construct (e.g., an expression construct) comprising (a) one or more heterologous nucleic acid regions comprising a sequence encoding a protein or polypeptide of interest or encoding an RNA of interest (e.g., a microRNA or a small hairpin RNA (shRNA)) and (b) one or more regions comprising inverted terminal repeat (ITR) sequences (e.g., wild-type ITR sequences or engineered ITR sequences) flanking the one or more heterologous nucleic acid regions. In some embodiments, each nucleic acid vector is circular. In some embodiments, each nucleic acid vector is a plasmid (e.g., comprising an origin of replication (such as an E. coli ORI) and optionally a selectable marker (such as an Ampicillin or Kanamycin selectable marker)). In some embodiments, each nucleic acid vector is single-stranded. In some embodiments, each nucleic acid vector is double-stranded. In some embodiments, a double-stranded nucleic acid vector may be, for example, a self-complimentary vector that contains a region of the nucleic acid vector that is complementary to another region of the nucleic acid vector, initiating the formation of the double-strandedness of the nucleic acid vector. In some embodiments, the nucleic acid vector comprises a baculovirus or a HSV genomic sequence. In some embodiments the genomic sequence is modified to remove genes for replication of a baculovirus or HSV. Baculovirus and HSV nucleic acid vectors and genomic sequences are known in the art (see, e.g., Clement et al. Large-Scale Adeno-Associated Viral Vector Production Using a Herpesvirus-Based System Enables Manufacturing for Clinical Studies. Human Gene Therapy. 20:796-806; and Kotin. Large-scale recombinant adeno-associated virus production. Human Molecular Genetics, 2011, Vol. 20, Review Issue 1, R2-R6).

In some embodiments, as part of a method described herein, each construct contained within each nucleic acid vector is packaged within a viral capsid to produce one or more rAAV particles (e.g., a first rAAV particle comprising a first construct and a second rAAV particle comprising a second construct). Accordingly, in some embodiments, each rAAV particle comprises a viral capsid and a construct as described herein, which is encapsidated by the viral capsid.

In some embodiments, each construct comprises (1) one or more heterologous nucleic acid regions comprising a sequence encoding a protein or polypeptide of interest, (2) one or more nucleic acid regions comprising a sequence that facilitates expression of the heterologous nucleic acid region (e.g., a promoter and/or enhancer), and (3) one or more nucleic acid regions comprising a sequence that facilitates integration of the heterologous nucleic acid region (optionally with the one or more nucleic acid regions comprising a sequence that facilitates expression) into the genome of the subject. In some embodiments, viral sequences that facilitate integration comprise Inverted Terminal Repeat (ITR) sequences. In some embodiments, each construct comprises one or more heterologous nucleic acid regions comprising a sequence encoding a protein or polypeptide of interest or an RNA of interest operably linked to a promoter, wherein the one or more heterologous nucleic acid regions are flanked on each side (e.g., flanked on each the 5' and 3' side of the one or more heterologous nucleic acid regions) with a nucleic acid region comprising an ITR sequence. The ITR sequences can be derived from any AAV serotype (e.g., 1, 2, 3, 4, 5, 6, 7, 8, 9, or 10) or can be derived from more than one serotype. In some embodiments, the ITR sequences are derived from AAV2. ITR sequences and plasmids containing ITR sequences are known in the art and commercially available (see, e.g., products and services available from Vector Biolabs, Philadelphia, PA; Cellbiolabs, San Diego, CA; AGILENT TECHNOLOGIES®, Santa Clara, Ca; and ADDGENE®, Cambridge, MA; and Gene delivery to skeletal muscle results in sustained expression and systemic delivery of a therapeutic protein. Kessler P D, Podsakoff G M, Chen X, McQuiston S A, Colosi P C, Matelis L A, Kurtzman G J, Byrne B J. Proc Natl Acad Sci USA. 1996 Nov. 26; 93(24): 14082-7; and Curtis A. Machida. Methods in Molecular Medicine™. Viral Vectors for Gene TherapyMethods and Protocols. 10.1385/1-59259-304-6:201 © Humana Press Inc. 2003. Chapter 10. Targeted Integration by Adeno-Associated Virus. Matthew D. Weitzman, Samuel M. YoungJr., Toni Cathomen and Richard Jude Samulski; U.S. Pat. Nos. 5,139,941 and 5,962,313, all of which are incorporated herein by reference).

In some embodiments, each nucleic acid vector comprises a pTR-UF-11 plasmid backbone, which is a plasmid that contains AAV2 ITRs. This plasmid is commercially available from the American Type Culture Collection (ATCC® MBA-331™).

In some embodiments, the construct comprises one or more regions comprising a sequence that facilitates expression of the heterologous nucleic acid, e.g., expression control sequences operatively linked to the heterologous nucleic acid. Numerous such sequences are known in the art. Non-limiting examples of expression control sequences include promoters, insulators, silencers, response elements, introns, enhancers, initiation sites, termination signals, and poly (A) tails. Any combination of such control sequences is completed herein (e.g., a promoter and an enhancer).

To achieve appropriate expression levels of the protein or polypeptide of interest, any of a number of promoters suitable for use in the selected host cell may be employed. The promoter may be, for example, a constitutive promoter, tissue-specific promoter, inducible promoter, or a synthetic promoter. For example, constitutive promoters of different strengths can be used. A construct described herein may include one or more constitutive promoters, such as viral promoters or promoters from mammalian genes that are generally active in promoting transcription. Non-limiting examples of constitutive viral promoters include the Herpes Simplex virus (HSV), thymidine kinase (TK), Rous Sarcoma Virus (RSV), Simian Virus 40 (SV40), Mouse Mammary Tumor Virus (MMTV), Ad E1A and cytomegalovirus (CMV) promoters. Non-limiting examples of constitutive mammalian promoters include various housekeeping gene promoters, as exemplified by the β-actin promoter.

Inducible promoters and/or regulatory elements may also be contemplated for achieving appropriate expression levels of the protein or polypeptide of interest. Non-limiting examples of suitable inducible promoters include those from genes such as cytochrome P450 genes, heat shock protein genes, metallothionein genes, and hormone-inducible genes, such as the estrogen gene promoter. Another example of an inducible promoter is the tetVP16 promoter that is responsive to tetracycline.

Tissue-specific promoters and/or regulatory elements are also contemplated herein. Non-limiting examples of such promoters that may be used include (1) desmin (DES), creatine kinase, myogenin, alpha myosin heavy chain, human brain and natriuretic peptide, specific for muscle cells, and (2) liver specific promoter [LSP, (GENEART®, LIFE TECHNOLOGIES™)], albumin, alpha-1-antitrypsin, hepatitis B virus core protein promoters, specific for liver cells.

Synthetic promoters are also contemplated herein. A synthetic promoter may comprise, for example, regions of known promoters, regulatory elements, transcription factor binding sites, enhancer elements, repressor elements, and the like.

In some embodiments, a first construct described herein comprises a first promoter and a second construct described herein comprises a second promoter. In some embodiments, the first promoter and the second promoter are different (e.g., the first promoter is DES and the second promoter is LSP). In some embodiments, the first and second promoters are selected from DES, LSP, parathyroid hormone receptor; kidney-specific promoter (P1), Synapsin, minimal human glucose-6-phosphatase promoter, MTM1, CMV and chicken beta-actin. Exemplary first and second promoter pairs include (a) DES and LSP, (b) LSP and P1, (c) Synapsin and DES, (d) LSP and minimal human glucose-6-phosphatase promoter, and (e) MTM1 and LSP. Such promoters are known in the art and described herein (see, e.g., Synapsin (neuronal specific; commercially available at ADDGENE® ID #22907); P1 [parathyroid hormone receptor; kidney-specific promoter (McCuaig K A, Lee H S, Clarke J C, Assar H, Horsford J, White J H. Parathyroid hormone/parathyroid hormone related peptide receptor gene transcripts are expressed from tissue-specific and ubiquitous promoters. Nucleic Acids Res 1995; 23:1948-1955)]; minimal human glucose-6-phosphatase promoter (Lin B, Morris D W, Chou J Y. The role of HNF1alpha, HNF3gamma, and cyclic AMP in glucose-6-phosphatase gene activation. Biochemistry 1997; 36:14096-14106; Schmoll D, Wasner C, Hinds C J, Allan B B, Walther R, Burchell A. Identification of a cAMP response element within the glucose-6-phosphatase hydrolytic subunit gene promoter which is involved in the transcriptional regulation by cAMP and glucocorticoids in H4IIE hepatoma cells. Biochem J 1999; 338:457-463; Vander Kooi B T, Streeper R S, Svitek C A, Oeser J K, Powell D R, O'Brien R M. The three insulin response sequences in the glucose-6-phosphatase catalytic subunit gene promoter are functionally distinct. J Biol Chem 2003; 278:11782-11793); and Endogenous MTM1 promoter (commercially available at GENECOPOEIA™; Accession #NM_000252; Product ID: HPRM15185)). In some embodiments, the first promoter and the second promoter are the same (e.g., the first promoter is DES and the second promoter is DES). In some embodiments, the first and second promoter are both CMV promoters, both chicken beta-actin promoters, both LSPs, both P1 promoters, both Synapsin promoters, both minimal human glucose-6-phosphatase promoters, or both MTM1 promoters.

In some embodiments, each construct comprises one or more heterologous nucleic acid regions comprising a sequence encoding a protein or polypeptide of interest. In some embodiments, the first construct and the second construct (and optionally third, fourth, fifth constructs, etc.) each comprise a sequence encoding the same protein or polypeptide of interest (e.g., both the first and second constructs encode GAA). In some embodiments, the first construct and the second construct (and optionally third, fourth, fifth constructs, etc.) each comprise a sequence encoding different proteins or polypeptides of interest (e.g., the first construct encodes a first protein or polypeptide of interest and second construct encodes a second protein or polypeptide of interest, etc.). In some embodiments, the constructs each encode a fragment of dystrophin, e.g., three fragments within three constructs (see, e.g., Lostal et al., Full-Length Dystrophin Reconstitution with Adeno-Associated Viral Vectors. Hum. Gene Ther., 2014. PMID: 24580018). In some embodiments, the first construct encodes beta-hexosaminidase alpha and the second construct encodes beta-hexosaminidase-beta (see, e.g., Cachon-Gonzalez et al., Gene transfer corrects acute GM2 gangliosidosis-potential therapeutic contribution of perivascular enzyme flow. Mol. Ther., 2012. PMID: 22453766). In some embodiments, the constructs each encode a fragment of myosin 7A, e.g., two fragments within two constructs (see, e.g., Dyka et al., Dual AAV Vectors Result in Efficient In Vitro and In Vivo expression of an Oversized Gene, MYO7A. Hum Gene Ther., 2014. PMID: 24568220). In some embodiments, the first construct encodes Vascular endothelial growth factor-A (VEGF-A, VEGF) and the second construct encodes fibroblast growth factor 4 (FGF4) (see, e.g., Jazwa et al., Arteriogenic therapy based on simultaneous delivery of VEGF-A and FGF4 genes improves the recovery from acute limb ischemia. Vasc. Cell. 2013. PMID: 23816205). In some embodiments, the first construct encodes Vascular endothelial growth factor-A (VEGF-A, VEGF) and the second construct encodes Angiopoietin-1 (see, e.g., Arsic et al., Induction of functional neovascularization by combined VEGF and Angiopoietin-1 gene transfer using AAV vectors. Mol. Ther., 2003. PMID: 12727107). In some embodiments, the first construct encodes the heavy chain of factor VIII and the second construct encodes the light chain of factor VII (see, e.g., Mah et al., Dual vectors expressing murine factor VIII result in sustained correction of hemophilia A mice. Hum. Gene Ther., 2003. PMID: 12614565). In some embodiments of any of the constructs above, the promoter for each construct is a tissue-specific or a constitutive promoter. In some embodiments of any of the constructs above, the promoter for each construct is CMV or chicken beta-actin.

In some embodiments, each construct comprises one or more heterologous nucleic acid regions comprising a sequence encoding a protein or polypeptide of interest and a promoter. In some embodiments, the first construct and the construct each encode the same protein or polypeptide of interest but comprise different promoter regions (e.g., the first construct comprises GAA operably linked to a DES promoter and the second construct comprises GAA operably linked to a LSP). In some embodiments, the first construct and the second construct encode the different proteins or polypeptides of interest and comprise different promoter regions (e.g., the first construct comprises hexosaminidase A operably linked to a DES promoter and the second construct comprises hexosaminidase B operably linked to a CMV promoter).

In some embodiments, the first and second constructs do not include a promoter region. In some embodiments, the first and second constructs include different regions of a nucleic acid encoding a protein or polypeptide of interest (e.g., different regions each encoding only a portion of a protein or polypeptide of interest). In some embodiments, the different regions are overlapping regions of the same gene. In some embodiments, the different regions are non-overlapping regions of the same gene. In some embodiments, more than two different constructs (e.g., 3, 4, 5, 6, 7, 8, 9, 10 or more) are packaged together. In some embodiments, the more than two different constructs include more than two different (e.g., overlapping or non-overlapping) regions of a gene of interest. In some embodiments, a resulting AAV preparation can be used to deliver two or more regions of a gene to a cell, for example, to be used as templates for altering (e.g., for correcting one or more mutations associated with a disease or condition) a genomic sequence in the cell (e.g., as a form of gene therapy). In some embodiments, these two or more regions can act as rescue sequences in a procedure that also involves delivering one or more genome editing nucleases to the cell.

The protein or polypeptide of interest may be, e.g., a polypeptide or protein of interest provided in Table 1. The sequences of the polypeptide or protein of interest may be obtained, e.g., using the non-limiting National Center for Biotechnology Information (NCBI) Protein IDs or SEQ ID NOs from patent applications provided in Table 1.

TABLE 1

Non-limiting examples of proteins or polypeptides of interest and associated diseases, disorders, or phenotypes

| Protein or Polypeptide | Non-limiting Exemplary diseases, disorders, or phenotypes | Non-limiting NCBI Protein IDs or Patent SEQ ID NOs |
|---|---|---|
| acid alpha-glucosidase (GAA) | Pompe disease | NP_000143.2, NP_001073271.1, NP_001073272.1 |
| Methyl CpG binding protein 2 (MECP2) | Rett syndrome | NP_001104262.1, NP_004983.1 |
| Aromatic L-amino acid decarboxylase (AADC) | Parkinson's disease | NP_000781.1, NP_001076440.1, NP_001229815.1, NP_001229816.1, NP_001229817.1, NP_001229818.1, NP_001229819.1 |
| Glial cell-derived neurotrophic factor (GDNF) | Parkinson's disease | NP_000505.1, NP_001177397.1, NP_001177398.1, NP_001265027.1, NP_954701.1 |
| Cystic fibrosis transmembrane conductance regulator (CFTR) | Cystic fibrosis | NP_000483.3 |
| Tumor necrosis factor receptor fused to an antibody Fc (TNFR:Fc) | Arthritis, Rheumatoid arthritis | SEQ ID NO. 1 of WO2013025079 |
| HIV-1 gag-proΔrt (tgAAC09) | HIV infection | SEQ ID NOs. 1-5 of WO2006073496 |
| Sarcoglycan alpha, beta, gamma, delta, epsilon, or zeta (SGCA, SGCB, SGCG, SGCD, SGCE, or SGCZ) | Muscular dystrophy | SGCA NP_000014.1, NP_001129169.1 SGCB NP_000223.1 SGCG NP_000222.1 SGCD NP_000328.2, NP_001121681.1, NP_758447.1 SGCE NP_001092870.1, NP_001092871.1, NP_003910.1 SGCZ NP_631906.2 |

TABLE 1-continued

Non-limiting examples of proteins or polypeptides of interest and associated diseases, disorders, or phenotypes

| Protein or Polypeptide | Non-limiting Exemplary diseases, disorders, or phenotypes | Non-limiting NCBI Protein IDs or Patent SEQ ID NOs |
|---|---|---|
| Alpha-1-antitrypsin (AAT) | Hereditary emphysema or Alpha-1-antitrypsin Deficiency | NP_000286.3, NP_001002235.1, NP_001002236.1, NP_001121172.1, NP_001121173.1, NP_001121174.1, NP_001121175.1, NP_001121176.1, NP_001121177.1, NP_001121178.1, NP_001121179.1 |
| Glutamate decarboxylase 1 (GAD1) | Parkinson's disease | NP_000808.2, NP_038473.2 |
| Glutamate decarboxylase 2 (GAD2) | Parkinson's disease | NP_000809.1, NP_001127838.1 |
| Aspartoacylase (ASPA) | Canavan's disease | NP_000040.1, NP_001121557.1 |
| Nerve growth factor (NGF) | Alzheimer's disease | NP_002497.2 |
| Granulocyte-macrophage colonystimulating factory (GM-CSF) | Prostate cancer | NP_000749.2 |
| Cluster of Differentiation 86 (CD86 or B7-2) | Malignant melanoma | NP_001193853.1, NP_001193854.1, NP_008820.3, NP_787058.4, NP_795711.1 |
| Interleukin 12 (IL-12) | Malignant melanoma | NP_000873.2, NP_002178.2 |
| neuropeptide Y (NPY) | Parkinson's disease, epilepsy | NP_000896.1 |
| ATPase, Ca++ transporting, cardiac muscle, slow twitch 2 (SERCA2) | Chronic heart failure | NP_001672.1, NP_733765.1 |
| Dystrophin or Minidystrophin | Muscular dystrophy | NP_000100.2, NP_003997.1, NP_004000.1, NP_004001.1, NP_004002.2, NP_004003.1, NP_004004.1, NP_004005.1, NP_004006.1, NP_004007.1, NP_004008.1, NP_104009.1, NP_004010.1, NP_004011.2, NP_004012.1, NP_004013.1, NP_004014.1 |
| Ceroid lipofuscinosis neuronal 2 (CLN2) | Late infantile neuronal ceroidlipofuscinosis or Batten's disease | NP_000382.3 |
| Neurturin (NRTN) | Parkinson's disease | NP_004549.1 |
| N-acetylglucosaminidase, alpha (NAGLU) | Sanfilippo syndrome (MPSIIIB) | NP_000254.2 |
| Iduronidase, alpha-1 (IDUA) | MPSI-Hurler | NP_000194.2 |
| Iduronate 2-sulfatase (IDS) | MPSII-Hunter | NP_100193.1, NP_001160022.1, NP_006114.1 |
| Glucuronidase, beta (GUSB) | MPSVII-Sly | NP_000172.2, NP_001271219.1 |
| Hexosaminidase A, α polypeptide, also called beta-Hexosaminidase alpha (HEXA) | Tay-Sachs | NP_000511.2 |
| Hexosaminidase B, β polypeptide, also called beta-Hexosaminidase beta (HEXB) | Tay-Sachs | NP_000512.1, NP_001278933.1 |
| Retinal pigment epithelium-specific protein 65 kDa (RPE65) | Leber congenital amaurosis | NP_000320.1 |
| Factor IX (FIX) | Hemophilia B | NP_000124.1 |
| Adenine nucleotide translocator (ANT-1) | progressive external ophthalmoplegia | NP_001142.2 |
| ApaLI | mitochondrial heteroplasmy, myoclonic epilepsy with ragged red fibers (MERRF) or mitochondrial encephalomyopathy, lactic acidosis, and stroke-like episodes (MELAS) | YP_007161330.1 |
| NADH ubiquinone oxidoreductase subunit 4 (ND4) | Leber hereditary Optic | YP_003024035.1 |
| very long-acyl-CoA dehydrogenase (VLCAD) | very long-chain acyl-CoA dehydrogenase (VLCAD) deficiency | NP_000009.1, NP_001029031.1, NP_001257376.1, NP_001257377.1 |
| short-chain acyl-CoA dehydrogenase (SCAD) | short-chain acyl-CoA dehydrogenase (SCAD) deficiency | NP_000008.1 |
| medium-chain acyl-CoA dehydrogenase (MCAD) | medium-chain acyl-CoA dehydrogenase (MCAD) deficiency | NP_000007.1, NP_001120800.1, NP_001272971.1, NP_001272972.1, NP_001272973.1 |
| Myotubularin 1 (MTM1) | X-linked myotubular myopathy | NP_000243.1 |
| Myophosphorylase (PYGM) | McArdle disease (glycogen storage disease type V, myophosphorylase deficiency) | NP_001158188.1, NP_005600.1 |
| Lipoprotein lipase (LPL) | LPL deficiency | NP_000228.1 |
| sFLT01 (VEGF/PlGF (placental growth factor) binding domain of human VEGFR1/Flt-1 (hVEGFR1) fused to the Fc portion of human IgG(1) through a polyglycine linker) | Age-related macular degeneration | SEQ ID NO: 2, 8, 21, 23, or 25 of WO2009105669 |
| Glucocerebrosidase (GC) | Gaucher disease | NP_000148.2, NP_001005741.1, NP_001005742.1, NP_001165282.1, NP_001165283.1 |
| UDP glucuronosyltransferase 1 family, polypeptide A1 (UGT1Al) | Crigler-Najjar syndrome | NP_000454.1 |
| Glucose 6-phosphatase (G6Pase) | GSD-Ia | NP_000142.2, NP_001257326.1 |
| Ornithine carbamoyltransferase (OTC) | OTC deficiency | NP_000522.3 |
| Cystathionine-beta-synthase (CBS) | Homocystinuria | NP_000062.1, NP_001171479.1, NP_001171480.1 |
| Factor VIII (F8) | Haemophilia A | NP_000123.1, NP_063916.1 |

TABLE 1-continued

Non-limiting examples of proteins or polypeptides of interest and associated diseases, disorders, or phenotypes

| Protein or Polypeptide | Non-limiting Exemplary diseases, disorders, or phenotypes | Non-limiting NCBI Protein IDs or Patent SEQ ID NOs |
|---|---|---|
| Hemochromatosis (HFE) | Hemochromatosis | NP_000401.1, NP_620572.1, NP_620573.1, NP_620575.1, NP_620576.1, NP_620577.1, NP_620578.1, NP_620579.1, NP_620580.1 |
| Low density lipoprotein receptor (LDLR) | Phenylketonuria (PKU) | NP_000518.1, NP_001182727.1, NP_001182728.1, NP_001182729.1, NP_001182732.1 |
| Galactosidase, alpha (AGA) | Fabry disease | NP_000160.1 |
| Phenylalanine hydroxylase (PAH) | Hypercholesterolaemia or Phenylketonuria (PKU) | NP_000268.1 |
| Propionyl CoA carboxylase, alpha polypeptide (PCCA) | Propionic acidaemias | NP_000273.2, NP_001121164.1, NP_001171475.1 |
| myosin 7A (MYO7A) | Usher syndrome 1B | NP_000251.3, NP_001120651.2, NP_001120652.1 |
| Vascular endothelial growth factor-A (VEGF-A, VEGF) | Ischemia, Vascular defects, Heart failure | NP_001020537.2, NP_001020538.2, NP_001020539.2, NP_001020540.2, NP_001020541.2, NP_001028928.1, NP_001165093.1, NP_001165094.1, NP_001165095.1, NP_001165096.1, NP_001165097.1, NP_001165098.1, NP_001165099.1, NP_001165100.1, NP_001165101.1, NP_001191313.1, NP_001191314.1, NP_001273973.1, NP_003367.4 |
| Fibroblast growth factor 4 (FGF4) | Ischemia, Heart failure | NP_001998.1 |
| Angiopoietin-1 (ANGPT1) | Vascular defects, Heart failure | NP_001137.2, NP_001186788.1 |
| cystinosin, lysosomal cystine transporter (CTNS) | Cystinosis | NP_001026851.2, NP_004928.2 |
| Insulin-like growth factor (IGF-1) | amyotrophic lateral sclerosis | NP_000609.1, NP_001104753.1, NP_001104754.1, NP_001104755.1 |
| adenosine deaminase, RNA-specific, B1 (ADARB1) | amyotrophic lateral sclerosis | NP_001103.1, NP_001153702.1, NP_056648.1, NP_056649.1 |
| peripherin 2 (PRPH2) | retinitis pigmentosa | NP_000313.2 |
| c-mer proto-oncogene tyrosine kinase (MERTK) | retinitis pigmentosa | NP_006334.2 |

The polypeptides and proteins provided in Table 1 are known in the art for use in rAAV particles (see, e.g., Adeno-Associated Virus Vectors in Clinical Trials. Barrie J. Carter. Human Gene Therapy. May 2005, 16(5): 541-550. doi: 10.1089/hum.2005.16.541. Published in Volume: 16 Issue 5: May 25, 2005; Neuropharmacology. 2013 June; 69:82-8. doi: 10.1016/j.neuropharm.2012.03.004. Epub 2012 Mar. 17; Adeno-associated virus (AAV) gene therapy for neurological disease. Weinberg MS1, Samulski R J, McCown T J. Gene therapy for lysosomal storage disorders. Yew N S, Cheng S H. Pediatr Endocrinol Rev. 2013 November; 11 Suppl 1:99-109; Directed evolution of novel adeno-associated viruses for therapeutic gene delivery. Bartel M A, Weinstein J R, Schaffer D V. Gene Ther. 2012 June; 19 (6): 694-700. doi: 10.1038/gt.2012.20. Epub 2012 Mar. 8; Therapeutic in vivo gene transfer for genetic disease using AAV: progress and challenges. Mingozzi F, High K A. Nat Rev Genet. 2011 May; 12 (5): 341-55. doi: 10.1038/nrg2988). In some embodiments, the polypeptide or protein of interest is a human protein or polypeptide.

In some embodiments, each construct comprises one or more heterologous nucleic acid regions comprising a sequence encoding a RNA of interest (e.g., an shRNA or microRNA) and a promoter. Exemplary RNAs of interest and AAV vectors comprising such RNAs include, e.g., AAVsh2.4, AAVsh8.2, AAVsh30.1, AAV-shHD2, siRNAs Targeting TGFβ1, TGFβR2, and CTGF, scAAV2-IRE1alpha, XBP1 and ATF6. Such RNAs are known in the art (see, e.g., McBride et al., Artificial miRNAs mitigate shRNA-mediated toxicity in the brain: Implications for the therapeutic development of RNAi. PNAS, 2008. doi: 10.1073/pnas.0801775105; Franich et al., AAV Vector-mediated RNAi of Mutant Huntingtin Expression Is Neuroprotective in a Novel Genetic Rat Model of Huntington's Disease. Mol. Ther., 2008. doi: 10.1038/mt.2008.50; Sriram et al., Triple Combination of siRNAs Targeting TGFβ1, TGFβR2, and CTGF Enhances Reduction of Collagen I and Smooth Muscle Actin in Corneal Fibroblasts. IOVS., 2013. doi: 10.1167/iovs.13-12758; and Ruan et al., Development of an anti-angiogenic therapeutic model combining scAAV2-delivered siRNAs and noninvasive photoacoustic imaging of tumor vasculature development. Cancer Letters, 2013. DOI: 10.1016/j.canlet.2012.11.016). Other exemplary RNAs of interest include RNAs (e.g., microRNAs or shRNAs) that target Huntingtin (HTT, see, e.g., NM_002111.7), Ataxin-1 (ATXNI, see, e.g., NM_000332.3 or NM_001128164.1), TGFβ1 (TGFβ1, scc, e.g., NM_000660.5), TGFβR2 (TGFβR2, scc, e.g., NM_001024847.2 or NM_003242.5), connective tissue growth factor (CTGF, see, e.g., NM_001901.2), IRE1alpha (IRE1a, see, e.g., NM_001433.3), X-box binding protein 1 (XBP1, see, e.g., NM_001079539.1 or NM_005080.3) and activating transcription factor 6 (ATF6, see, e.g., NM_007348.3). Such RNAs of interest may be used to treat, e.g., Huntington's disease, cancer, hypervascularization, and spinocerebellar ataxia type 1.

In some embodiments, a nucleic acid vector or construct described herein may also contain marker or reporter genes, e.g., LacZ or a florescent protein.

In some embodiments, a nucleic acid vector or construct described herein can be used to deliver a genome editing nuclease to a cell (for example by delivering a nucleic acid encoding a genome editing nuclease), for example an engineered nuclease that can be useful to target genomic nucleic acid for cleavage (e.g., to create a double-stranded break at a known target position in the genome of a cell that receives the genome editing nuclease). In some embodiments, a genome editing nuclease is a zinc finger nuclease (ZFN), a transcription activator-like effector nuclease (TALEN), a meganuclease, an RNA-guided DNA endonuclease (e.g., a CRISPR Cas9 related nuclease), or a combination thereof. In some embodiments, a Cas9 related nuclease is a naturally occurring endonuclease. In some embodiments, a Cas9 related nuclease is a sequence variant or a fragment of a naturally occurring Cas9 endonuclease and/or a chimeric nuclease including a naturally occurring or variant Cas9 endonuclease (or a fragment of one or more thereof). In some embodiments, a nucleic acid encoding a Cas9 related nuclease is delivered along with a nucleic acid encoding a guide RNA. In some embodiments, a guide RNA is a synthetic RNA that includes a targeting segment that is complementary to a strand of a target region (e.g., a genomic target region of interest), and a nuclease interacting segment that interacts with (e.g., binds or guides) an RNA-guided nuclease. In some embodiments, a guide RNA includes a sequence that targets a gene to be edited to restore its function (e.g., for therapeutic purposes). In some embodiments, a guide RNA targets a dystrophin gene (e.g., a region of a dystrophin gene that contains a mutation associated with DMD).

In some embodiments, a genome editing nuclease (e.g., a Cas9 related nuclease and a guide RNA) are delivered along with a rescue nucleic acid (e.g., a rescue DNA or RNA molecule) that can be used as a template for genomic repair after cleavage by the genome editing nuclease. In some embodiments, the rescue nucleic acid has a sequence of a target nucleic acid that does not include a mutation associated with a disease. For example, in some embodiments, a rescue nucleic acid includes a portion of a DMD-associated nucleic acid (e.g., a region of a dystrophin gene) that does not contain a mutation associated with DMD (e.g., a wild-type DMD genomic sequence).

In some embodiments, two or more different rAAV particles are used to deliver a rescue nucleic acid and a nucleic acid encoding a genome editing nuclease. In some embodiments, two or more different rAAV particles are used to deliver a Cas9 related nuclease (e.g., a nucleic acid encoding a Cas9 related nuclease) and a guide RNA (e.g., a nucleic acid encoding a guide RNA). In some embodiments, the rescue nucleic acid provides a region of a DMD associated gene that does not contain a mutation associated with DMD, and the guide RNA includes a targeting portion that targets a Cas9 related nuclease to cleave genomic DNA in or near the region of the DMD associated gene corresponding to the rescue nucleic acid. In some embodiments, the different AAV vectors are delivered together (e.g., simultaneously) to a cell (for example a cell from a subject, e.g., a human subject) that is being targeted for genomic editing.

Accordingly, in some embodiments methods and compositions described herein can be used to package two or more different nucleic acid vectors (e.g., including a rescue nucleic acid, and/or a nucleic acid encoding a genomic editing nuclease, and/or a nucleic acid encoding a guide RNA) simultaneously into a rAAV in order to produce an rAAV preparation including different rAAV particles each containing one of the nucleic acid vectors. For example, methods and compositions described herein can be used to prepare and deliver combinations of these different vectors in different ratios of interest.

Nucleic acid vectors containing constructs (e.g., expression constructs) and methods of producing such nucleic acid vectors are also known in the art and commercially available (see, e.g., Zolotukhin et al. Production and purification of serotype 1, 2, and 5 recombinant adeno-associated viral vectors. Methods 28 (2002) 158-167; and U.S. Patent Publication Numbers US20070015238 and US20120322861, which are incorporated herein by reference; and plasmids and kits available from ATCC® and Cell Biolabs, Inc.).

Producing rAAV Particle Preparations

Other aspects of the disclosure relate to producing rAAV particle preparations, e.g., by contacting a cell preparation with a first nucleic acid vector comprising a first construct as described herein and a second nucleic acid vector comprising a second construct as described herein, permitting the cell preparation to produce a first rAAV particle comprising the first construct and a second rAAV particle comprising the second construct, and isolating the first rAAV particle and the second rAAV particle from the cell preparation. In some embodiments, further nucleic acid vectors (e.g., third, fourth, fifth, etc.) and further rAAV particles (third, fourth, fifth, etc.) are also contemplated herein.

In some embodiments, the cell preparation is a mammalian cell preparation or an insect cell preparation. In some embodiments, the mammalian cell preparation comprises 293 cells or baby hamster kidney cells (BHK) (available, e.g., from ATCC® CRL-1573™ (293 [HEK-293]) for 293 cells and ATCC® CCL-10™ (BHK-21 [C-13]) for BHK cells). In some embodiments, the insect cell preparation comprises Sf9 cells (available, e.g., from ATCC® CRL-1711™ (Sf9 cells)).

In some embodiments, the cell preparation, after contact with the first and second nucleic acid vector (and optionally third, fourth, fifth, etc. nucleic acid vectors), is maintained under conditions sufficient for producing a first rAAV particle comprising the first construct and a second rAAV particle comprising the second construct (and optionally third, fourth, fifth, etc. rAAV particles comprising third, fourth, fifth, etc. constructs). In some embodiments, the conditions sufficient for producing comprise incubating the cell preparation for an appropriate length of time, in an appropriate medium, and at an appropriate temperature. In some embodiments, the length of time is 12 to 72 hours, 24 to 72 hours, or 48 to 72 hours. In some embodiments, the length of time is at least 24 hours, at least 48 hours, at least 60 hours or at least 72 hours. In some embodiments, the temperature is 37 degrees Celsius. In some embodiments, the medium comprises nutrients for maintaining cell health and/or growth. In some embodiments, the medium comprises GIBCOR Dulbecco's modified Eagle's medium, GIBCO® 293 SFM II, GIBCO® FREESTYLE™ 293 Expression Medium (serum-free, protein-free medium), GIBCO® CD 293 Medium, EXPI293™ Expression Medium (serum-free, protein-free medium for HEK 293 cells), SF-900™ III SFM (serum-free, protein-free, insect cell culture medium), EXPRESS FIVE® SFM (serum-free, protein-free, insect cell culture medium), or SF-900™ II SFM (serum-free, protein free, insect cell culture medium) (available from LIFE TECHNOLOGIES™).

In some embodiments, the cell preparation is contacted simultaneously with the first nucleic acid vector and the second nucleic acid vector (and optionally third, fourth, fifth, etc. nucleic acid vectors). In some embodiments, the cell preparation is contacted with a composition comprising the first nucleic acid vector and the second nucleic acid vector (and optionally third, fourth, fifth, etc. nucleic acid vectors). In some embodiments, the composition comprises calcium chloride and/or hank's balanced saline solution. In some embodiments, the composition further comprises one or more helper plasmids as described herein.

In some embodiments, contacting a cell preparation with a first and second nucleic acid vector (and optionally third, fourth, fifth, etc. nucleic acid vectors) comprises transfecting the cell preparation with the first nucleic acid vector and the second nucleic acid vector (and optionally third, fourth, fifth, etc. nucleic acid vectors). In some embodiments, the transfection is calcium phosphate transfection. In some embodiments, the method further comprises contacting the cell preparation with at least one helper plasmid described herein. In some embodiments, the cell preparation is transfected simultaneously with the first nucleic acid vector and the second nucleic acid vector (e.g., as plasmids) and the at least one helper plasmid (e.g., one, two, or three helper plasmids). In some embodiments, the first nucleic acid vector and the second nucleic acid vector (e.g., as plasmids) and the at least one helper plasmid are comprised within a composition before contacting with the cell preparation. In some embodiments, the composition comprises calcium chloride and/or hank's balanced saline solution.

In some embodiments, the at least one helper plasmid is a first helper plasmid comprising a rep gene and a cap gene and a second helper plasmid comprising a E1a gene, a E1b gene, a E4 gene, a E2a gene, and a VA gene. In some embodiments, the rep gene is a rep gene derived from AAV2 and the cap gene is derived from AAV9. Helper plasmids, and methods of making such plasmids, are described herein and also known in the art and commercially available (see, e.g., pDM, PDG, pDP1rs, pDP2rs, pDP3rs, pDP4rs, pDP5rs, pDP6rs, pDG (R484E/R585E), and pDP8.ape plasmids from PLASMIDFACTORY®, Bielefeld, Germany; other products and services available from Vector Biolabs, Philadelphia, PA; Cellbiolabs, San Diego, CA; AGILENT TECHNOLOGIES®, Santa Clara, Ca; and ADDGENER, Cambridge, MA; Grimm et al. (1998), Novel Tools for Production and Purification of Recombinant Adenoassociated Virus Vectors, Human Gene Therapy, Vol. 9, 2745-2760; Kern, A. et al. (2003), Identification of a Heparin-Binding Motif on Adeno-Associated Virus Type 2 Capsids, Journal of Virology, Vol. 77, 11072-11081; Grimm et al. (2003), Helper Virus-Free, Optically Controllable, and Two-Plasmid-Based Production of Adeno-associated Virus Vectors of Serotypes 1 to 6, Molecular Therapy, Vol. 7, 839-850; Kronenberg et al. (2005), A Conformational Change in the Adeno-Associated Virus Type 2 Capsid Leads to the Exposure of Hidden VP1 N Termini, Journal of Virology, Vol. 79, 5296-5303; and Moullier, P. and Snyder, R. O. (2008), International efforts for recombinant adenoassociated viral vector reference standards, Molecular Therapy, Vol. 16, 1185-1188).

An exemplary, non-limiting transfection method is described in Example 1. Another exemplary, non-limiting, transfection method is described next. One or more helper plasmids are produced or obtained, which comprise rep and cap genes for the desired AAV serotype or pseudotype (e.g., rep2/cap9) and the adenoviral VA, E2A (DBP), and E4 genes under the transcriptional control of their native promoters. 293 cells are transfected via CaPO$_4$-mediated transfection with the helper plasmids and a first and second nucleic acid vector described herein (e.g., as plasmids).

In some embodiments, contacting a cell preparation with a first and second nucleic acid vector (and optionally third, fourth, fifth, etc. nucleic acid vectors) comprises infecting the cell preparation with the first nucleic acid vector and the second nucleic acid vector (and optionally third, fourth, fifth, etc. nucleic acid vectors). The cell preparation may be infected using any method known in the art, e.g., herpes simplex virus type 1 (HSV) infection or baculovirus infection (see, e.g., Clement et al. Large-Scale Adeno-Associated Viral Vector Production Using a Herpesvirus-Based System Enables Manufacturing for Clinical Studies. Human Gene Therapy. 20:796-806; and Kotin. Large-scale recombinant adeno-associated virus production. Human Molecular Genetics, 2011, Vol. 20, Review Issue 1, R2-R6).

In some embodiments, the first nucleic acid vector is contained within a first herpes simplex virus type 1 (HSV) particle and the second nucleic acid vector is contained within a second HSV particle (and optionally third, fourth, fifth, etc. nucleic acid vectors are contained within a third, fourth, fifth, etc. HSV particle). In some embodiments, the first HSV particle and the second HSV particle are contacted with the cell preparation (e.g., comprising 293 cells or BHK cells). In some embodiments, further HSV particles comprising one or more helper nucleic acids (e.g., comprising rep genes, cap genes, a E1a gene, a E1b gene, a E4 gene, a E2a gene, and/or a VA gene) are contacted with the cell preparation. In some embodiments, the one or more helper nucleic acids are stably integrated into the cell preparation such that the further HSV particles are optional.

In some embodiments, the first nucleic acid vector is contained within a first baculovirus particle and the second nucleic acid vector is contained within a second baculovirus particle (and optionally third, fourth, fifth, etc. nucleic acid vectors are contained within a third, fourth, fifth, etc. baculovirus particle). In some embodiments, the first baculovirus particle and the second baculovirus particle are contacted with the cell preparation (e.g., comprising Sf9 cells). In some embodiments, further baculovirus particles comprising one or more helper nucleic acids (e.g., comprising rep genes, cap genes, a E1a gene, a E1b gene, a E4 gene, a E2a gene, and/or a VA gene) are contacted with the cell preparation. In some embodiments, the one or more helper nucleic acids are stably integrated into the cell preparation such that the further baculovirus particles are optional.

An exemplary, non-limiting, infection method is described next. Sf9-based producer stable cell lines are infected with a first recombinant baculovirus comprising the first nucleic acid vector and the second recombinant baculovirus comprising the second nucleic acid vector.

In some embodiments, when the cell preparation is contacted with the first and second nucleic acid vector via infection, the initial ratio of the first nucleic acid vector to the second nucleic acid vector is the ratio of the multiplicity of infection of the first nucleic acid vector to the multiplicity of infection of the second nucleic acid vector. Multiplicity of infection or MOI is a term known in the art and refers to the ratio of infectious agents (e.g., HSV or baculovirus) to infection targets (e.g., cells).

The first and second rAAV particle, once produced by the cell preparation using any method described herein, may be isolated using any method known in the art or described herein. In some embodiments, isolation comprises lysing the cell preparation and extracting the first rAAV particle and the second rAAV particle. The first rAAV particle and the second rAAV particle may be extracted from the cell preparation simultaneously (e.g., a population of rAAV particles that comprises both the first rAAV particle and the second rAAV particle is extracted from the cell preparation such as using a purification method described herein) or separately. In some embodiments, extraction comprises purification, e.g., by iodixanol step gradient, CsCl gradient, chromatography, or polyethylene glycol (PEG) precipitation.

The first and second rAAV particle (and optionally third, fourth, fifth, etc. rAAV particles) produced by a method described herein may be of any AAV serotype, including any derivative or pseudotype (e.g., 1, 2, 3, 4, 5, 6, 7, 8, 9, or 10, or pseudotypes/derivatives thereof). In some embodiments, the first and second rAAV particle (and optionally third, fourth, fifth, etc. rAAV particles) are of the same serotype. In some embodiments, the first and second rAAV particle (and optionally third, fourth, fifth, etc. rAAV particles) are of the different serotypes. Non-limiting examples of derivatives and pseudotypes include rAAV2/1, rAAV2/5, rAAV2/8, rAAV2/9, AAV2-AAV3 hybrid, AAVrh. 10, AAVhu.14, AAV3a/3b, AAVrh32.33, AAV-HSC15, AAV-HSC17, AAVhu.37, AAVrh.8, CHt-P6, AAV2.5, AAV6.2, AAV218, AAV-HSC15/17, AAVM41, AAV9.45, AAV6 (Y445F/Y731F), AAV2.5T, AAV-HAE1/2, AAV clone 32/83, AAVShH10, AAV2 (Y→F), AAV8 (Y733F), AAV2.15, AAV2.4, AAVM41, and AAVr3.45. Such AAV serotypes and derivatives/pseudotypes, and methods of producing such derivatives/pseudotypes are known in the art (see, e.g., Mol Ther. 2012 April; 20 (4): 699-708. doi: 10.1038/mt.2011.287. Epub 2012 Jan. 24. The AAV vector toolkit: poised at the clinical crossroads. Asokan A1, Schaffer D V, Samulski R J.). In some embodiments, the first and second rAAV particle (and optionally third, fourth, fifth, etc. rAAV particles) are pseudotyped rAAV particles. In some embodiments, the pseudotyped rAAV particle comprises (a) a nucleic acid vector comprising AAV2 ITRs and (b) a capsid comprised of capsid proteins derived from AAVx (e.g., AAV1, AAV3, AAV4, AAV5, AAV6, AAV7, AAV8, AAV9, or AAV10). Exemplary rAAV pseudotyped particles include, but are not limited to rAAV2/1, rAAV2/5, rAAV2/8, and rAAV2/9 particles. Methods for producing and using pseudotyped rAAV particles are known in the art (see, e.g., Duan et al., J. Virol., 75:7662-7671, 2001; Halbert et al., J. Virol., 74:1524-1532, 2000; Zolotukhin et al., Methods, 28:158-167, 2002; and Auricchio et al., Hum. Molec. Genet., 10:3075-3081, 2001).

Without further elaboration, it is believed that one skilled in the art can, based on the above description, utilize the present disclosure to its fullest extent. The following specific embodiments are, therefore, to be construed as merely illustrative, and not limitative of the remainder of the disclosure in any way whatsoever. All publications cited herein are incorporated by reference for the purposes or subject matter referenced herein.

EXAMPLES

Example 1. Exemplary rAAV Co-Production Protocol

Introduction

To date adeno-associated virus (AAV) has been used in over 100 gene therapy clinical trials. The widespread tropism, sustained gene expression and excellent safety data that exist for AAV are only a few of the reasons it has reached such popularity. As a non-pathogenic shuttle for therapeutic genes capable of delivering its payload to many cell types, the basic biological processes governing the behavior of the many AAV serotypes has been an extensive area of research for many years (Zincarelli et al., 2008; Asokan et al., 2012; Gurda et al., 2012; Aschauer et al., 2013; Asokan and Samulski 2013; Rayaprolu et al., 2013). With its success in correcting the pathology associated with diseases such as seen in the multitude of metabolic myopathies and hematological disorders, AAV is quickly becoming the gene therapy vector of choice for initiating large animal studies and clinical trials (Markusic and Herzog 2012; Mah et al., 2013).

However, among its drawbacks are host immune responses against the capsid and/or transgene (Boutin et al., 2010; Rogers et al., 2011; Faust et al., 2013; Mingozzi and High 2013), appropriate transduction of the target tissue (Zincarelli et al., 2008; Pulicherla et al., 2011; Aschauer et al., 2013), size limitation, with an optimal packaging size of ~4.7 kb (Dong et al., 1996), and the challenges to produce high titer vectors in a cost and time effective manner (Clément et al., 2009; Doria et al., 2013). Implementation towards large-scale manufacturing of AAV using infection-based systems (herpes simplex virus type 1 and baculovirus systems) rather than transfection will certainly become useful to address the large quantities of virus needed for FDA required extensive pre-clinical studies, as well as clinical studies. Yet transfection remains the current standard of vector production in most laboratories and manufacturing cores. Furthermore, some indications may require the use of two or more vector constructs. To palliate the inability of AAV genomes to carry long therapeutic cDNA, the packaging capacity may be expanded by splitting the genome and rely on what has been referred to as the fragment AAV reassembly model (Rabinowitz et al., 2002; Hirsch et al., 2013). Gene expression using fragmented vectors relies on the host recombination machinery to splice together one expression cassette containing a splice donor site to another encoding a compatible splice acceptor region (Ghosh et al., 2011). Encouraging results using this strategy have been reported for Duchenne's muscular dystrophy (Lai et al., 2005; Zhang and Duan 2012; Zhang et al., 2013; Koo et al., 2014) and Usher 1 (Lopes et al., 2013; Dyka et al., 2014).

However there are many other instances where the simultaneous delivery of more than one AAV vector may be required. Such as for indications where two or more subunits are needed (e.g., hexosaminidase A and B for Tay-Sachs disease) or indications where the expression of the therapeutic gene needs to be elevated in specific tissues; which could be mediated by the use of different promoters upstream of the same therapeutic transgene (Pacak et al., 2009; Palfi et al., 2012; Fagoe et al., 2013). For instance, targeting gene expression to the liver for the purposes of immune tolerance induction while providing an additional vector to correct systemic pathology would allow for the simultaneous treatment of many congenital metabolic myopathies wherein immune responses have proven deleterious to the efficacy of gene therapy.

Clinical applications using two or more AAV constructs would be time and cost prohibitive if each construct was produced separately. To facilitate the use and production of multiple vectors, a novel production method was investigated that exploited the stoichiometric properties of AAV in that only one expression plasmid is packaged per encapsidated virus. A method was developed that allowed for the production of multiple vectors in a single transfection step. Combining reporter expression cassettes to be packaged at a known input ratio, it was shown through quantitative PCR (qPCR) and in vitro infectivity assays that the output vector preparation closely recapitulated the input ratios. Additionally, it was shown that therapeutic constructs containing unique promoter elements could be co-packaged and were able to be differentially titrated. These results indicate that, at minimum, two vectors containing either separate transgenes or regulatory elements can be co-packaged and subsequently characterized independently.

Methods

Construction of rAAV Vector Plasmids

Recombinant vectors containing GFP (pTRUF11) and mCherry (pTRUF11-mCherry) were assembled using the pTR-UF backbone previously described (Zolotukhin et al., 1996). The sequences of PTR-UF and PTR-UF11 are provided below.

pTR-UF:

(SEQ ID NO: 1)
5'-AGGAACCCCTAGTGATGGAGTTGGCCACTCCCTCTCTGCGCGCTCG

CTCGCTCACTGAGGCCGCCCGGGCAAAGCCCGGGCGTCGGGCGACCTTT

GGTCGCCCGGCCTCAGTGAGCGAGCGAGCGCGCAGAGAGGGAGTGGCCA

ACCCCCCCCCCCCCCCCCTGCAGCCCTGCATTAATGAATCGGCCAACG

CGCGGGGAGAGGCGGTTTGCGTATTGGGCGCTCTTCCGCTTCCTCGCTC

ACTGACTCGCTGCGCTCGGTCGTTCGGCTGCGGCGAGCGGTATCAGCTC

ACTCAAAGGCGGTAATACGGTTATCCACAGAATCAGGGGATAACGCAGG

AAAGAACATGTGAGCAAAAGGCCAGCAAAAGGCCAGGAACCGTAAAAAG

GCCGCGTTGCTGGCGTTTTTCCATAGGCTCCGCCCCCCTGACGAGCATC

ACAAAAATCGACGCTCAAGTCAGAGGTGGCGAAACCCGACAGGACTATA

AAGATACCAGGCGTTTCCCCCTGGAAGCTCCCTCGTGCGCTCTCCTGTT

CCGACCCTGCCGCTTACCGGATACCTGTCCGCCTTTCTCCCTTCGGGAA

GCGTGGCGCTTTCTCAATGCTCACGCTGTAGGTATCTCAGTTCGGTGTA

GGTCGTTCGCTCCAAGCTGGGCTGTGTGCACGAACCCCCCGTTCAGCCC

GACCGCTGCGCCTTATCCGGTAACTATCGTCTTGAGTCCAACCCGGTAA

GACACGACTTATCGCCACTGGCAGCAGCCACTGGTAACAGGATTAGCAG

AGCGAGGTATGTAGGCGGTGCTACAGAGTTCTTGAAGTGGTGGCCTAAC

TACGGCTACACTAGAAGGACAGTATTTGGTATCTGCGCTCTGCTGAAGC

CAGTTACCTTCGGAAAAAGAGTTGGTAGCTCTTGATCCGGCAAACAAAC

CACCGCTGGTAGCGGTGGTTTTTTTGTTTGCAAGCAGCAGATTACGCGC

AGAAAAAAAGGATCTCAAGAAGATCCTTTGATCTTTTCTACGGGGTCTG

ACGCTCAGTGGAACGAAAACTCACGTTAAGGGATTTTGGTCATCAGATT

ATCAAAAAGGATCTTCACCTAGATCCTTTTAAATTAAAAATGAAGTTTT

AAATCAATCTAAAGTATATATGAGTAAACTTGGTCTGACAGTTACCAAT

GCTTAATCAGTGAGGCACCTATCTCAGCGATCTGTCTATTTCGTTCATC

CATAGTTGCCTGACTCCCCGTCGTGTAGATAACTACGATACGGGAGGGC

TTACCATCTGGCCCCAGTGCTGCAATGATACCGCGAGACCCACGCTCAC

CGGCTCCAGATTTATCAGCAATAAACCAGCCAGCCGGAAGGGCCGAGCG

CAGAAGTGGTCCTGCAACTTTATCCGCCTCCATCCAGTCTATTAATTGT

TGCCGGGAAGCTAGAGTAAGTAGTTCGCCAGTTAATAGTTTGCGCAACG

TTGTTGCCATTGCTACAGGCATCGTGGTGTCACGCTCGTCGTTTGGTAT

GGCTTCATTCAGCTCCGGTTCCCAACGATCAAGGCGAGTTACATGATCC

CCCATGTTGTGCAAAAAAGCGGTTAGCTCCTTCGGTCCTCCGATCGTTG

TCAGAAGTAAGTTGGCCGCAGTGTTATCACTCATGGTTATGGCAGCACT

GCATAATTCTCTTACTGTCATGCCATCCGTAAGATGCTTTTCTGTGACT

GGTGAGTACTCAACCAAGTCATTCTGAGAATAGTGTATGCGGCGACCGA

GTTGCTCTTGCCCGGCGTCAATACGGGATAATACCGCGCCACATAGCAG

AACTTTAAAAGTGCTCATCATTGGAAAACGTTCTTCGGGGCGAAAACTC

TCAAGGATCTTACCGCTGTTGAGATCCAGTTCGATGTAACCCACTCGTG

CACCCAACTGATCTTCAGCATCTTTTACTTTCACCAGCGTTTCTGGGTG

AGCAAAAACAGGAAGGCAAAATGCCGCAAAAAAGGGAATAAGGGCGACA

CGGAAATGTTGAATACTCATACTCTTCCTTTTTCAATATTATTGAAGCA

TTTATCAGGGTTATTGTCTCATGAGCGGATACATATTTGAATGTATTTA

GAAAAATAAACAAATAGGGGTTCCGCGCACATTTCCCCGAAAAGTGCCA

CCTGACGTCTAAGAAACCATTATTATCATGACATTAACCTATAAAAATA

GGCGTATCACGAGGCCCTTTCGTCTCGCGCGTTTCGGTGATGACGGTGA

AAACCTCTGACACATGCAGCTCCCGGAGACGGTCACAGCTTGTCTGTAA

GCGGATGCCGGGAGCAGACAAGCCCGTCAGGGCGCGTCAGCGGGTGTTG

GCGGGTGTCGGGGCTGGCTTAACTATGCGGCATCAGAGCAGATTGTACT

GAGAGTGCACCATATGCGGTGTGAAATACCGCACAGATGCGTAAGGAGA

AAATACCGCATCAGGAAATTGTAAACGTTAATATTTTGTTAAAATTCGC

GTTAAATTTTTGTTAAATCAGCTCATTTTTTAACCAATAGGCCGAAATC

GGCAAAATCCCTTATAAATCAAAAGAATAGACCGAGATAGGGTTGAGTG

TTGTTCCAGTTTGGAACAAGAGTCCACTATTAAAGAACGTGGACTCCAA

CGTCAAAGGGCGAAAAACCGTCTATCAGGGCGATGGCCCACTACGTGAA

CCATCACCCTAATCAAGTTTTTTGGGGTCGAGGTGCCGTAAAGCACTAA

ATCGGAACCCTAAAGGGAGCCCCCGATTTAGAGCTTGACGGGGAAAGCC

GGCGAACGTGGCGAGAAAGGAAGGGAAGAAAGCGAAAGGAGCGGGCGCT

AGGGCGCTGGCAAGTGTAGCGGTCACGCTGCGCGTAACCACCACACCCG

CCGCGCTTAATGCGCCGCTACAGGGCGCGTCGCGCCATTCGCCATTCAG

GCTACGCAACTGTTGGGAAGGGCGATCGGTGCGGGCCTCTTCGCTATTA

CGCCAGGCTGCAGGGGGGGGGGGGGGGGGGTTGGCCACTCCCTCTCTGC

GCGCTCGCTCGCTCACTGAGGCCGGGCGACCAAAGGTCGCCCGACGCCC

GGGCTTTGCCCGGGCGGCCTCAGTGAGCGAGCGAGCGCGCAGAGAGGGA

GTGGCCAACTCCATCACTAGGGGTTCCT pTR-UF11:

(SEQ ID NO: 2)
5'-GGGGGGGGGGGGGGGGGGTTGGCCACTCCCTCTCTGCGCGCTCGCT

CGCTCACTGAGGCCGGGCGACCAAAGGTCGCCCGACGCCCGGGCTTTGC

CCGGGCGGCCTCAGTGAGCGAGCGAGCGCGCAGAGAGGGAGTGGCCAAC

TCCATCACTAGGGGTTCCTAGATCTGAATTCGGTACCCTAGTTATTAAT

AGTAATCAATTACGGGGTCATTAGTTCATAGCCCATATATGGAGTTCCG

CGTTACATAACTTACGGTAAATGGCCCGCCTGGCTGACCGCCCAACGAC

CCCCGCCCATTGACGTCAATAATGACGTATGTTCCCATAGTAACGCCAA

TAGGGACTTTCCATTGACGTCAATGGGTGGACTATTTACGGTAAACTGC

CCACTTGGCAGTACATCAAGTGTATCATATGCCAAGTACGCCCCCTATT

GACGTCAATGACGGTAAATGGCCCGCCTGGCATTATGCCCAGTACATGA

CCTTATGGGACTTTCCTACTTGGCAGTACATCTACGTATTAGTCATCGC

TATTACCATGGTCGAGGTGAGCCCCACGTTCTGCTTCACTCTCCCCATC

TCCCCCCCCTCCCCACCCCCAATTTTGTATTTATTTATTTTTTAATTAT

TTTGTGCAGCGATGGGGGCGGGGGGGGGGGGGGGCGCGCGCCAGGCGG

-continued

GGGGGGGGGGGCGAGGGGCGGGGGGGGCGAGGCGGAGAGGTGCGGCG
GCAGCCAATCAGAGCGGCGCGCTCCGAAAGTTTCCTTTTATGGCGAGGC
GGCGGCGGCGGCGGCCCTATAAAAAGCGAAGCGCGCGGCGGGCGGGAGT
CGCTGCGACGCTGCCTTCGCCCCGTGCCCCGCTCCGCCGCCGCCTCGCG
CCGCCCGCCCCGGCTCTGACTGACCGCGTTACTCCCACAGGTGAGCGGG
CGGGACGGCCCTTCTCCTCCGGGCTGTAATTAGCGCTTGGTTTAATGAC
GGCTTGTTTCTTTTCTGTGGCTGCGTGAAAGCCTTGAGGGGCTCCGGGA
GGGCCCTTTGTGCGGGGGGGAGCGGCTCGGGGGGTGCGTGCGTGTGTGT
GTGCGTGGGGAGCGCCGCGTGCGGCCCGCGCTGCCCGGCGGCTGTGAGC
GCTGCGGGCGCGGCGCGGGGCTTTGTGCGCTCCGCAGTGTGCGCGAGGG
GAGCGCGGCCGGGGCGGTGCCCCGCGGTGCGGGGGGGCTGCGAGGGG
AACAAAGGCTGCGTGCGGGGTGTGTGCGTGGGGGGTGAGCAGGGGGTG
TGGGCGCGGCGGTCGGGCTGTAACCCCCCCTGCACCCCCCTCCCCGAG
TTGCTGAGCACGGCCCGGCTTCGGGTGCGGGCTCCGTACGGGGCGTGG
CGCGGGGCTCGCCGTGCCGGGCGGGGGTGGCGGCAGGTGGGGGTGCCG
GGCGGGGCGGGGCCGCCTCGGGCCGGGGAGGGCTCGGGGGAGGGGCGCG
GCGGCCCCGGAGCGCCGGCGGCTGTCGAGGCGCGGCGAGCCGCAGCCA
TTGCCTTTTATGGTAATCGTGCGAGAGGGCGCAGGGACTTCCTTTGTCC
CAAATCTGTGCGGAGCCGAAATCTGGGAGGCGCCGCCGCACCCCCTCTA
GCGGGCGCGGGGCGAAGCGGTGCGGCGCCGGCAGGAAGGAAATGGGCGG
GGAGGGCCTTCGTGCGTCGCCGCGCCGCCGTCCCCTTCTCCCTCTCCAG
CCTCGGGGCTGTCCGCGGGGGACGCCTGCCTTCGGGGGGACGGGGCA
GGGCGGGGTTCGGCTTCTGGCGTGTGACCGGCGGCTCTAGAGCCTCTGC
TAACCATGTTCATGCCTTCTTCTTTTTCCTACAGCTCCTGGGCAACGTG
CTGGTTATTGTGCTGTCTCATCATTTTGGCAAAGAATTCCTCGAAGATC
TAGGCCTGCAGGCGGCCGCCGCCACCATGAGCAAGGGCGAGGAACTGTT
CACTGGCGTGGTCCCAATTCTCGTGGAACTGGATGGCGATGTGAATGGG
CACAAATTTTCTGTCAGCGGAGAGGGTGAAGGTGATGCCACATACGGAA
AGCTCACCCTGAAATTCATCTGCACCACTGGAAAGCTCCCTGTGCCATG
GCCAACACTGGTCACTACCCTGACCTATGGCGTGCAGTGCTTTTCCAGA
TACCCAGACCATATGAAGCAGCATGACTTTTTCAAGAGCGCCATGCCCG
AGGGCTATGTGCAGGAGAGAACCATCTTTTTCAAAGATGACGGGAACTA
CAAGACCCGCGCTGAAGTCAAGTTCGAAGGTGACACCCTGGTGAATAGA
ATCGAGCTGAAGGGCATTGACTTTAAGGAGGATGGAAACATTCTCGGCC
ACAAGCTGGAATACAACTATAACTCCCACAATGTGTACATCATGGCCGA
CAAGCAAAAGAATGGCATCAAGGTCAACTTCAAGATCAGACACAACATT
GAGGATGGATCCGTGCAGCTGGCCGACCATTATCAACAGAACACTCCAA
TCGGCGACGGCCCTGTGCTCCTCCCAGACAACCATTACCTGTCCACCCA
GTCTGCCCTGTCTAAAGATCCCAACGAAAAGAGAGACCACATGGTCCTG
CTGGAGTTTGTGACCGCTGCTGGGATCACACATGGCATGGACGAGCTGT
ACAAGTGAGCGGCCGCGGGGATCCAGACATGATAAGATACATTGATGAG

TTTGGACAAACCACAACTAGAATGCAGTGAAAAAAATGCTTTATTTGTG
AAATTTGTGATGCTATTGCTTTATTTGTAACCATTATAAGCTGCAATAA
ACAAGTTAACAACAACAATTGCATTCATTTTATGTTTCAGGTTCAGGGG
GAGGTGTGGGAGGTTTTTTAGTCGACCTCGAGCAGTGTGGTTTTGCAAG
AGGAAGCAAAAAGCCTCTCCACCCAGGCCTGGAATGTTTCCACCCAAGT
CGAAGGCAGTGTGGTTTTGCAAGAGGAAGCAAAAAGCCTCTCCACCCAG
GCCTGGAATGTTTCCACCCAATGTCGAGCAACCCCGCCCAGCGTCTTGT
CATTGGCGAATTCGAACACGCAGATGCAGTCGGGGCGGCGCGGTCCCAG
GTCCACTTCGCATATTAAGGTGACGCGTGTGGCCTCGAACACCGAGCGA
CCCTGCAGCCAATATGGGATCGGCCATTGAACAAGATGGATTGCACGCA
GGTTCTCCGGCCGCTTGGGTGGAGAGGCTATTCGGCTATGACTGGGCAC
AACAGACAATCGGCTGCTCTGATGCCGCCGTGTTCCGGCTGTCAGCGCA
GGGGCGCCCGGTTCTTTTTGTCAAGACCGACCTGTCCGGTGCCCTGAAT
GAACTGCAGGACGAGGCAGCGCGGCTATCGTGGCTGGCCACGACGGGCG
TTCCTTGCGCAGCTGTGCTCGACGTTGTCACTGAAGCGGGAAGGGACTG
GCTGCTATTGGGCGAAGTGCCGGGGCAGGATCTCCTGTCATCTCACCTT
GCTCCTGCCGAGAAAGTATCCATCATGGCTGATGCAATGCGGCGGCTGC
ATACGCTTGATCCGGCTACCTGCCCATTCGACCACCAAGCGAAACATCG
CATCGAGCGAGCACGTACTCGGATCGAAGCCGGTCTTGTCGATCAGGAT
GATCTGGACGAAGAGCATCAGGGGCTCGCGCCAGCCGAACTGTTCGCCA
GGCTCAAGGCGCGCATGCCCGACGGCGAGGATCTCGTCGTGACCCATGG
CGATGCCTGCTTGCCGAATATCATGGTGGAAAATGGCCGCTTTTCTGGA
TTCATCGACTGTGGCCGGCTGGGTGTGGCGGACCGCTATCAGGACATAG
CGTTGGCTACCCGTGATATTGCTGAAGAGCTTGGCGGCGAATGGGCTGA
CCGCTTCCTCGTGCTTTACGGTATCGCCGCTCCCGATTCGCAGCGCATC
GCCTTCTATCGCCTTCTTGACGAGTTCTTCTGAGGGGATCCGTCGACTA
GAGCTCGCTGATCAGCCTCGACTGTGCCTTCTAGTTGCCAGCCATCTGT
TGTTTGCCCCTCCCCCGTGCCTTCCTTGACCCTGGAAGGTGCCACTCCC
ACTGTCCTTTCCTAATAAAATGAGGAAATTGCATCGCATTGTCTGAGTA
GGTGTCATTCTATTCTGGGGGGTGGGTGGGGCAGGACAGCAAGGGGGA
GGATTGGGAAGACAATAGCAGGCATGCTGGGGAGAGATCTAGGAACCCC
TAGTGATGGAGTTGGCCACTCCCTCTCTGCGCGCTCGCTCGCTCACTGA
GGCCGCCCGGGCAAAGCCCGGGCGTCGGGCGACCTTTGGTCGCCCGGCC
TCAGTGAGCGAGCGAGCGCGCAGAGAGGGAGTGGCCAACCCCCCCCCC
CCCCCCTGCAGCCCTGCATTAATGAATCGGCCAACGCGCGGGGAGAGG
CGGTTTGCGTATTGGGCGCTCTTCCGCTTCCTCGCTCACTGACTCGCTG
CGCTCGGTCGTTCGGCTGCGGCGAGCGGTATCAGCTCACTCAAAGGCGG
TAATACGGTTATCCACAGAATCAGGGGATAACGCAGGAAAGAACATGTG
AGCAAAAGGCCAGCAAAAGGCCAGGAACCGTAAAAAGGCCGCGTTGCTG
GCGTTTTTCCATAGGCTCCGCCCCCCTGACGAGCATCACAAAAATCGAC

-continued
GCTCAAGTCAGAGGTGGCGAAACCCGACAGGACTATAAAGATACCAGGC

GTTTCCCCCTGGAAGCTCCCTCGTGCGCTCTCCTGTTCCGACCCTGCCG

CTTACCGGATACCTGTCCGCCTTTCTCCCTTCGGGAAGCGTGGCGCTTT

CTCAATGCTCACGCTGTAGGTATCTCAGTTCGGTGTAGGTCGTTCGCTC

CAAGCTGGGCTGTGTGCACGAACCCCCCGTTCAGCCCGACCGCTGCGCC

TTATCCGGTAACTATCGTCTTGAGTCCAACCCGGTAAGACACGACTTAT

CGCCACTGGCAGCAGCCACTGGTAACAGGATTAGCAGAGCGAGGTATGT

AGGCGGTGCTACAGAGTTCTTGAAGTGGTGGCCTAACTACGGCTACACT

AGAAGGACAGTATTTGGTATCTGCGCTCTGCTGAAGCCAGTTACCTTCG

GAAAAAGAGTTGGTAGCTCTTGATCCGGCAAACAAACCACCGCTGGTAG

CGGTGGTTTTTTGTTTGCAAGCAGCAGATTACGCGCAGAAAAAAGGA

TCTCAAGAAGATCCTTTGATCTTTTCTACGGGGTCTGACGCTCAGTGGA

ACGAAAACTCACGTTAAGGGATTTTGGTCATGAGATTATCAAAAAGGAT

CTTCACCTAGATCCTTTTAAATTAAAAATGAAGTTTTAAATCAATCTAA

AGTATATATGAGTAAACTTGGTCTGACAGTTACCAATGCTTAATCAGTG

AGGCACCTATCTCAGCGATCTGTCTATTTCGTTCATCCATAGTTGCCTG

ACTCCCCGTCGTGTAGATAACTACGATACGGGAGGGCTTACCATCTGGC

CCCAGTGCTGCAATGATACCGCGAGACCCACGCTCACCGGCTCCAGATT

TATCAGCAATAAACCAGCCAGCCGGAAGGGCCGAGCGCAGAAGTGGTCC

TGCAACTTTATCCGCCTCCATCCAGTCTATTAATTGTTGCCGGGAAGCT

AGAGTAAGTAGTTCGCCAGTTAATAGTTTGCGCAACGTTGTTGCCATTG

CTACAGGCATCGTGGTGTCACGCTCGTCGTTTGGTATGGCTTCATTCAG

CTCCGGTTCCCAACGATCAAGGCGAGTTACATGATCCCCCATGTTGTGC

AAAAAAGCGGTTAGCTCCTTCGGTCCTCCGATCGTTGTCAGAAGTAAGT

TGGCCGCAGTGTTATCACTCATGGTTATGGCAGCACTGCATAATTCTCT

TACTGTCATGCCATCCGTAAGATGCTTTTCTGTGACTGGTGAGTACTCA

ACCAAGTCATTCTGAGAATAGTGTATGCGGCGACCGAGTTGCTCTTGCC

CGGCGTCAATACGGGATAATACCGCGCCACATAGCAGAACTTTAAAAGT

GCTCATCATTGGAAAACGTTCTTCGGGGCGAAAACTCTCAAGGATCTTA

CCGCTGTTGAGATCCAGTTCGATGTAACCCACTCGTGCACCCAACTGAT

CTTCAGCATCTTTTACTTTCACCAGCGTTTCTGGGTGAGCAAAAACAGG

AAGGCAAAATGCCGCAAAAAAGGGAATAAGGGCGACACGGAAATGTTGA

ATACTCATACTCTTCCTTTTTCAATATTATTGAAGCATTTATCAGGGTT

ATTGTCTCATGAGCGGATACATATTTGAATGTATTTAGAAAAATAAACA

AATAGGGGTTCCGCGCACATTTCCCCGAAAAGTGCCACCTGACGTCTAA

GAAACCATTATTATCATGACATTAACCTATAAAAATAGGCGTATCACGA

GGCCCTTTCGTCTCGCGCGTTTCGGTGATGACGGTGAAAACCTCTGACA

CATGCAGCTCCCGGAGACGGTCACAGCTTGTCTGTAAGCGGATGCCGGG

AGCAGACAAGCCCGTCAGGGCGCGTCAGCGGGTGTTGGCGGGTGTCGGG

GCTGGCTTAACTATGCGGCATCAGAGCAGATTGTACTGAGAGTGCACCA

TATGCGGTGTGAAATACCGCACAGATGCGTAAGGAGAAAATACCGCATC

-continued
AGGAAATTGTAAACGTTAATATTTTGTTAAAATTCGCGTTAAATTTTTG

TTAAATCAGCTCATTTTTTAACCAATAGGCCGAAATCGGCAAAATCCCT

TATAAATCAAAAGAATAGACCGAGATAGGGTTGAGTGTTGTTCCAGTTT

GGAACAAGAGTCCACTATTAAAGAACGTGGACTCCAACGTCAAAGGGCG

AAAAACCGTCTATCAGGGCGATGGCCCACTACGTGAACCATCACCCTAA

TCAAGTTTTTTGGGGTCGAGGTGCCGTAAAGCACTAAATCGGAACCCTA

AAGGGAGCCCCCGATTTAGAGCTTGACGGGGAAAGCCGGCGAACGTGGC

GAGAAAGGAAGGGAAGAAAGCGAAAGGAGCGGGCGCTAGGGCGCTGGCA

AGTGTAGCGGTCACGCTGCGCGTAACCACCACACCCGCCGCGCTTAATG

CGCCGCTACAGGGCGCGTCGCGCCATTCGCCATTCAGGCTACGCAACTG

TTGGGAAGGGCGATCGGTGCGGGCCTCTTCGCTATTACGCCAGGCTGCA

The red fluorescent protein mCherry was cloned in lieu of GFP in the pTRUF11 construct using standard techniques. mCherry was amplified from pRSETB-mCherry (obtained from Dr. R. Tsien, University of California, San Diego) using primers mcherryNotI-F 3'ATAAGAATGCGGCCGC-CACCATGGTGAG (SEQ ID NO: 3) and mcherryNotI-R 3' ATAAGAATGCGGCCGCCCACGATGGTGTAGTCC (SEQ ID NO: 4) to introduce two Not I sites flanking the amplicon. The amplicon was digested with NotI and ligated into pTRUF11 NotI. A human codon-optimized acid α-glucosidase cDNA (coGAA) (GENEART®, LIFE TECHNOLOGIES™) was cloned into a desmin promoter construct (pTR-DES) previously described (Pacak et al., 2009; Falk et al., 2013). The liver-specific promoter (LSP) (GENEART®, LIFE TECHNOLOGIES™) contains the apolipoprotein E-hepatocyte control region (Miao et al., 2000; Manno et al., 2006; Cao et al., 2007), the human a1-antitrypsin promoter (Cresawn et al., 2005) and 5' UTR and was sub-cloned into pTR-DES-coGAA in lieu of the DES promoter (BglII and SalI). The sequences of the DES promoter and the LSP are provided below.

DES Promoter
(SEQ ID NO: 5)
5'-GATCTTACCCCTGCCCCCCACAGCTCCTCTCCTGTGCCTTG

TTTCCCAGCCATGCGTTCTCCTCTATAAATACCCGCTCTGGTATT

TGGGGTTGGCAGCTGTTGCTGCCAGGGAGATGGTTGGGTTGACAT

GCGGCTCCTGACAAAACACAAACCCCTGGTGTGTGTGGGCGTGGG

TGGTGTGACTAGGGGGATGAATCAGGGAGGGGGCGGGGGACCCAG

GGGGCAGGAGCCACACAAAGTCTGTGCGGGGGTGGGAGCCGCACA

TAGCAATTGGAAACTGAAAGCTTATCAGACCCTTTCTGGAAATCA

GCCCACTGTTTATAAACTTGAGGCCCCACCCTCGAGATAACCAGG

GCTGAAAGAGGCCCGCCTGGGGCTGGAGACATGCTTGCTGCCTG

CCCTGGCGAAGGATTGGCAGGCTTGCCCGTCACAGGACCCCCGCT

GGCTGACTCAGGGGCGCAGGCCTCTTGCGGGGGAGCTGGCCTCCC

CGCCCCCACGGCCACGGGCCGCCCTTTCCTGGCAGGACAGCGGG

ATCTTGCAGCTGTCAGGGGAGGGGAGGCGGGGGCTGATGTCAGGA

GGGATACAAATAGTGCCGACGCCTGCGGGCCCTGTCTCCCCTCGC

```
CGCATCCACTCTCCGGCCGGCCGCCTGTCCGCCGCCTCCTCCGTG

CGCCCGCCAGCCTCGCCCGCGCCGTCACCGTGAGGCACTGGG

ApoE-HCR-haaT-5'UTR
[Liver Specific Promoter (LSP)] Sequence:
                                    (SEQ ID NO: 6)
5'-CCCTAAAATGGGCAAACATTGCAAGCAGCAAACAGCAAACAC

ACAGCCCTCCCTGCCTGCTGACCTTGGAGCTGGGGCAGAGGTCAG

AGACCTCTCTGGGGACTGTCCCAGGTCAGTGGTGGTGCCTGAAGC

TGAGGAGACAGGGCCCTGTCCTCGTCCGTATTTAAGCAGTGGATC

CAGAGGGGCAACGGGGGAGGCTGCTGGTGAATATTAACCAAGGTC

ACCCCAGTTATCGGAGGAGCAAACAGGGGCTAAGTCCACTGGCTG

GGATCTGAGTCGCCCGCCTACGCTGCCCGGACGCTTTGCCTGGGC

AGTGTACAGCTTCCACTGCACTTACCGAAAGGAGTCATTGTAGGG
```

```
CCCTGTCTCCTCAGCTTCAGGCACCACCACTGACCTGGGACAGTG

AATCCGGA
```

AAV9 Production

Recombinant adeno-associated viral (AAV) vectors were produced and purified as previously described (Zolotukhin et al., 2002). HEK293 cells were cultured in 5% FBS and antibiotic supplemented GIBCO® Dulbecco's modified Eagle's medium. Plasmid DNA was propagated in SURE2 cells (AGILENT TECHNOLOGIES®, Inc., Santa Clara, CA) and isolated using QIAGEN® plasmid purification reagents or obtained from ALDEVRON™ (Fargo, ND). Cells were seeded in 150 mm dishes at $5.0 \times 10^6$ cells 24 hours prior to transfection. The calcium phosphate precipitate was formed by combining the total amount of expression plasmids, with the equivalent concentration of the capsid plasmid rep2/cap9 and twice the concentration of the Ad helper plasmid pXX6-80 in 2.5M $CaCl_2$) followed by the addition of 2×HBS, pH 7.05. Sequences of these plasmids are below.

```
rep2/cap9 Sequence:
                                    (SEQ ID NO: 7)
5'-TCGAGGACAACCTTAGTGAAGGAATTCGCGAGTGGTGGGCTTTGAAACCTGG

AGCCCCTCAACCCAAGGCAAATCAACAACATCAAGACAACGCTCGAGGTCTTGTG

CTTCCGGGTTACAAATACCFTGGACCCGGCAACGGACTCGACAAGGGGGAGCCGG

TCAACGCAGCAGACGCGGCGGCCCTCGAGCACGACAAGGCCTACGACCAGCAGC

TCAAGGCCGGAGACAACCCGTACCTCAAGTACAACCACGCCGACGCCGAGTTCC

AGGAGCGGCTCAAAGAAGATACGTCTTTTGGGGGCAACCTCGGGCGAGCAGTCT

TCCAGGCCAAAAAGAGGCTTCTTGAACCTCTTGGTCTGGTTGAGGAAGCGGCTAA

GACGGCTCCTGGAAAGAAGAGGCCTGTAGACCAGTCTCCTCAGGAACCGGACTC

CTCCGCGGGTATTGGCAAATCGGGTGCACAGCCCGCTAAAAAGAGACTCAATTT

CGGTCAGACTGGCGACACAGAGTCAGTCCCAGACCCTCAACCAATCGGAGAACC

TCCCGCAGCCCCCTCAGGTGTGGGATCTCTTACAATGGCTTCAGGTGGTGGCGCA

CCAGTGGCAGACAATAACGAAGGTGCCGATGGAGTGGGTAGTTCCTCGGGAAAT

TGGCATTGCGATTCCCAATGGCTGGGGACAGAGTCATCACCACCAGCACCCGA

ACCTGGGCCCTGCCCACCTACAACAATCACCTCTACAAGCAAATCTCCAACAGCA

CATCTGGAGGATCTTCAAATGACAACGCCTACTTCGGCTACAGCACCCCCTGGGG

GTATTTTGACTTCAACAGATTCCACTGCCACTTCTCACCACGTGACTGGCAGCGA

CTCATCAACAACAACTGGGGATTCCGGCCTAAGCGACTCAACTTCAAGCTCTTCA

ACATTCAGGTCAAAGAGGTTACGGACAACAATGGAGTCAAGACCATCGCCAATA

ACCTTACCAGCACGGTCCAGGTCTTCACGGACTCAGACTATCAGCTCCCGTACGT

GCTCGGGTCGGCTCACGAGGGCTGCCTCCCGCCGTTCCCAGCGGACGTTTTCATG

ATTCCTCAGTACGGGTATCTGACGCTTAATGATGGAAGCCAGGCCGTGGGTCGTT

CGTCCTTTTACTGCCTGGAATATTTCCCGTCGCAAATGCTAAGAACGGGTAACAA

CTTCCAGTTCAGCTACGAGTTTGAGAACGTACCTTTCCATAGCAGCTACGCTCAC

AGCCAAAGCCTGGACCGACTAATGAATCCACTCATCGACCAATACTTGTACTATC

TCTCAAAGACTATTAACGGTTCTGGACAGAATCAACAAACGCTAAAATTCAGTGT

GGCCGGACCCAGCAACATGGCTGTCCAGGGAAGAAACTACATACCTGGACCCAG
```

```
CTACCGACAACAACGTGTCTCAACCACTGTGACTCAAAACAACAACAGCGAATT
TGCTTGGCCTGGAGCTTCTTCTTGGGCTCTCAATGGACGTAATAGCTTGATGAAT
CCTGGACCTGCTATGGCCAGCCACAAAGAAGGAGAGGACCGTTTCTTTCCTTTGT
CTGGATCTTTAATTTTTGGCAAACAAGGAACTGGAAGAGACAACGTGGATGCGG
ACAAAGTCATGATAACCAACGAAGAAGAAATTAAAACTACTAACCCGGTAGCAA
CGGAGTCCTATGGACAAGTGGCCACAAACCACCAGAGTGCCCAAGCACAGGCGC
AGACCGGCTGGGTTCAAAACCAAGGAATACTTCCGGGTATGGTTTGGCAGGACA
GAGATGTGTACCTGCAAGGACCCATTTGGGCAAAATTCCTCACACGGACGGCA
ACTTTCACCCTTCTCCGCTGATGGGAGGGTTTGGAATGAAGCACCCGCCTCCTCA
GATCCTCATCAAAAACACACCTGTACCTGCGGATCCTCCAACGGCCTTCAACAAG
GACAAGCTGAACTCTTTCATCACCCAGTATTCTACTGGCCAAGTCAGCGTGGAGA
TCGAGTGGGAGCTGCAGAAGGAAAACAGCAAGCGCTGGAACCCGGAGATCCAG
TACACTTCCAACTATTACAAGTCTAATAATGTTGAATTTGCTGTTAATACTGAAG
GTGTATATAGTGAACCCCGCCCCATTGGCACCAGATACCTGACTCGTAATCTGTA
ATTGCTTGTTAATCAATAAACCGTTTAATTCGTTTCAGTTGAACTTTGGTCTCTGC
GAAGGGCGAATTCGTTTAAACCTGCAGGACTAGAGTGCTGTATTAGAGGTCACGT
GAGTGTTTTGCGACATTTTGCGACACCATGTGGTCACGCTGGGTATTTAAGCCCG
AGTGAGCACGCAGGGTCTCCATTTTGAAGCGGGAGGTTTGAACGCGCAGCCGCC
AAGCCGAATTCTGCAGATATCCATCACACTGGCGGCCGCTCGACTAGAGCGGCC
GCCACCGCGGTGGAGCTCCAGCTTTTGTTCCCTTTAGTGAGGGTTAATTGCGCGC
TTGGCGTAATCATGGTCATAGCTGTTTCCTGTGTGAAATTGTTATCCGCTCACAAT
TCCACACAACATACGAGCCGGAAGCATAAAGTGTAAAGCCTGGGGTGCCTAATG
AGTGAGCTAACTCACATTAATTGCGTTGCGCTCACTGCCCGCTTTCCAGTCGGGA
AACCTGTCGTGCCAGCTGCATTAATGAATCGGCCAACGCGCGGGGAGAGGCGGT
TTGCGTATTGGGCGCTCTTCCGCTTCCTCGCTCACTGACTCGCTGCGCTCGGTCGT
TCGGCTGCGGCGAGCGGTATCAGCTCACTCAAAGGCGGTAATACGGTTATCCAC
AGAATCAGGGGATAACGCAGGAAAGAACATGTGAGCAAAAGGCCAGCAAAAGG
CCAGGAACCGTAAAAAGGCCGCGTTGCTGGCGTTTTTCCATAGGCTCCGCCCCCC
TGACGAGCATCACAAAAATCGACGCTCAAGTCAGAGGTGGCGAAACCCGACAGG
ACTATAAAGATACCAGGCGTTTCCCCCTGGAAGCTCCCTCGTGCGCTCTCCTGTT
CCGACCCTGCCGCTTACCGGATACCTGTCCGCCTTTCTCCCTTCGGGAAGCGTGG
CGCTTTCTCATAGCTCACGCTGTAGGTATCTCAGTTCGGTGTAGGTCGTTCGCTCC
AAGCTGGGCTGTGTGCACGAACCCCCCGTTCAGCCCGACCGCTGCGCCTTATCCG
GTAACTATCGTCTTGAGTCCAACCCGGTAAGACACGACTTATCGCCACTGGCAGC
AGCCACTGGTAACAGGATTAGCAGAGCGAGGTATGTAGGCGGTGCTACAGAGTT
CTTGAAGTGGTGGCCTAACTACGGCTACACTAGAAGGAGAGTATTTGGTATCTGC
GCTCTGCTGAAGCCAGTTACCTTCGGAAAAAGAGTTGGTAGCTCTTGATCCGGCA
AACAAACCACCC3CTGGTAGCGGTGGTTTTTTGTTTGCAAGCAGCAGATTACGCG
CAGAAAAAAAGGATCTCAAGAAGATCCTTTGATCTTTTCTACGGGGTCTGACGCT
CAGTGGAACGAAAACTCACGTTAAGGGATTTTGGTCATGAGATTATCAAAAAGG
```

-continued

```
ATCTTCACCTAGATCCTTTTAAATTAAAAATGAAGTTTTAAATCAATCTAAAGTA
TATATGAGTAAACTTGGTCTGACAGTTACCAATGCTTAATCAGTGAGGCACCTAT
CTCAGCGATCTGTCTATTTCGTTCATCCATAGTTGCCTGACTCCCCGTCGTGTAGA
TAACTACGATACGGGAGGGCTTACCATCTGGCCCCAGTGCTGCAATGATACCGCG
AGACCCACGCTCACCGGCTCCAGATTTATCAGCAATAAACCAGCCAGCCGGAAG
GGCCGAGCGCAGAAGTGGTCCTGCAACTTTATCCGCCTCCATCCAGTCTATTAAT
TGTTGCCGGGAAGCTAGAGTAAGTAGTTCGCCAGTTAATAGTTTGCGCAACGTTG
TTGCCATTGCTACAGGCATCGTGGTGTCACGCTCGTCGTTTGGTATGGCTTCATTC
AGCTCCGGTTCCCAACGATCAAGGCGAGTTACATGATCCCCCATGTTGTGCAAAA
AAGCGGTTAGCTCCTTCGGTCCTCCGATCGTTGTCAGAAGTAAGTTGGCCGCAGT
GTTATCACTCATGGTTATGGCAGCACTGCATAATTCTCTTACTGTCATGCCATCCG
TAAGATGCTTTCTGTGACTGGTGAGTACTCAACCAAGTCATTCTGAGAATAGTGT
ATGCGGCGACCGAGTTGCTCTTGCCCGGCGTCAATACGGGATAATACCGCGCCAC
ATAGCAGAACTTTAAAAGTGCTCATCATTGGAAAACGTTCTTCGGGGCGAAAACT
CTCAAGGATCTTACCGCTGTTGAGATCCAGTTCGATGTAACCCACTCGTGCACCC
AACTGATCTTCAGCATCTTTTACTTTCACCAGCCTTTCTGGGTGAGCAAAAACAG
GAAGGCAAAATGCCGCAAAAAAGGGAATAAGGGCGACACGGAAATGTTGAATA
CTCATACTCTTCCTTTTTCAATATTATTGAAGCATTTATCAGGGTTATTGTCTCAT
GAGCGGATACATATTTGAATGTATTTAGAAAAATAAACAAATAGGGGTTCCGCG
CACATTTCCCCGAAAAGTGCCACCTAAATTGTAAGCGTTAATATTTTGTTAAAAT
TCGCGTTAAATTTTTTGTTAAATCAGCTCATTTTTTAACCAATAGGCCGAAATCGGC
AAAATCCCTTATAAATCAAAAGAATAGACCGAGATAGGGTTGAGTGTTGTTCCA
GTTTGGAACAAGAGTCCACTATTAAAGAACGTGGACTCCAACGTCAAAGGGCGA
AAAACCGTCTATCAGGGCGATGGCCCACTACGTGAACCATCACCCTAATCAAGTT
TTTTGGGGTCGAGGTGCOGTAAAGCACTAAATCGGAACCCTAAAGGGAGCCCCC
GATTTAGAGCTTGACGGGGAAAGCCGGCGAACGTGGCGAGAAAGGAAGGGAAG
AAAGCGAAAGGAGCGGGCGCTAGGGCGCTGGCAAGTGTAGCGGTCACGCTGCGC
GTAACCACCACACCCGCCCCGCTTAATGCGCCGCTACAGGGCGCGTCCCATTCCC
CATTCAGGCTGCGCAACTGTTGGGAAGGGCGATCGGTGCGGGCCTCTTCGCTATT
ACGCCAGCTGGCGAAAGGGGGATGTGCTGCAAGGCGATTAAGTTGGGTAACGCC
AGGGTTTTCCCAGTCACGACGTTGTAAAACGACGGCCAGTGAGCGCGCGTAATA
CGACTCACTATAGGGCGAATTGGGTACCGGGCCCCCCCTCGATCGAGGTCGACG
GTATCGGGGAGCTCGGATCCACTAGTAACGGCCGCCAGTGTGCTGGATTCGGCT
TTATTTAAGCCCGAGTGAGCACGCAGGGTCTCCATTTTGAAGCGGGAGGTTTGAA
CGCGCAGCCGCCATGCCGGGGTTTTACGAGATTGTGATTAAGGTCCCCAGCGACC
TTGACGGGCATCTGCCCGGCATTTCTGACAGCTTTGTGAACTGGGTGGCCGAGAA
GGAATGGGAGTTGCCGCCAGATTCTGACATGGATCTGAATCTGATTGAGCAGGC
ACCCCTGACCGTGGCCGAGAAGCTGCAGCGCGACTTTCTGACGGAATGGCGCCG
TGTGAGTAAGGCCCCGGAGGCCCTTTTCTTTGTGCAATTTGAGAAGGGAGAGAGC
TACTTCCACATGCACGTGCTCGTGGAAACCACCGGGGTGAAATCCATGGTTTTGG
GACGTTTCCTGAGTCAGATTCGCGAAAAACTGATTCAGAGAATTTACCGCGGGAT
```

-continued

CGAGCCGACTTTGCCAAACTGGTTCGCGGTCACAAAGACCAGAAATGGCGCCGG

AGGCGGGAACAAGGTGGTGGATGAGTGCTACATCCCCAATTACTTGCTCCCCAA

AACCCAGCCTGAGCTCCAGTGGGCGTGGACTAATATGGAACAGTATTTAAGCGC

CTGTTTGAATCTCACGGAGCGTAAACGGTTGGTGGCGCAGCATCTGACGCACGTG

TCGCAGACGCAGGAGCAGAACAAAGAGAATCAGAATCCCAATTCTGATGCGCCG

GTGATCAGATCAAAAACTTCAGCCAGGTACATGGAGCTGGTCGGTGGCTCGTG

GACAAGGGGATTACCTCGGAGAAGCAGTGGATCCAGGAGGACCAGGCCTCATAC

ATCTCCTTCAATGCGGCCTCCAACTCGCGGTCCCAAATCAAGGCTGCCTTGGACA

ATGCGGGAAAGATTATGAGCCTGACTAAAACCGCCCCCGACTACCTGGTGGGCC

AGCAGCCCGTGGAGGACATTTCCAGCAATCGGATTTATAAAATTTTGGAACTAAA

CGGGTACGATCCCCAATATGCGGCTTCCGTCTTTCTGGGATGGGCCACGAAAAAG

TTCGGCAAGAGGAACACCATCTGGCTGTTTGGGCCTGCAACFACCGGGAAGACC

AACATCGCGGAGGCCATAGCCCACACTGTGCCCTTCTACGGGTGCGTAAACTGG

ACCAATGAGAACTTTCCCTTCAACGACTGTGTCGACAAGATGGTGATCTGGTGGG

AGGAGGGGAAGATGACCGCCAAGGTCGTGGAGTCGGCCAAAGCCATTCTCGGAG

GAAGCAAGGTGCGCGTGGACCAGAAATGCAAGTCCTCGGCCCAGATAGACCCGA

CTCCCGTGATCGTCACCTCCAACACCAACATGTGCGCCGTGATTGACGGGAACTC

AACGACCTTCGAACACCAGCAGCCGTTGCAAGACCGGATGTTCAAATTTGAACTC

ACCCGCCGTCTGGATCATGACTTTGGGAAGGTCACCAAGCAGGAAGTCAAAGAC

TTTTTCCGGTGGGCAAAGGATCACGTGGTTGAGGTGGAGCATGAATTCTACGTCA

AAAAGGGTGGAGCCAAGAAAAGACCCGCCCCCAGTGACGCAGATATAAGTGAG

CCCAAACGGGTGCGCGAGTCAGTTGCGCAGCCATCGACGTCAGACGCGGAAGCT

TCGATCAACTACGCGGACAGGTACCAAAACAAATGTTCTCGTCACGTGGGCATG

AATCTGATGCTGTTTCCCTGCAGACAATGCGAGAGACTGAATCAGAATTCAAATA

TCTGCTTCACTCACGGTGTCAAAGACTGTTTAGAGTGCTTTCCCGTGTCAGAATCT

CAACCCGTTTCTGTCGTCAAAAAGGCGTATCAGAAACTGTGCTACATTCATCACA

TCATGGGAAAGGTGCCAGACGCTTGCACTGCTTGCGACCTGGTCAATGTGGACTT

GGATGACTGTGTTTCTGAACAATAAATGACTTAAACCAGGTATGGCTGCCGATGG

TTATCTTCCAGATTGGC pXX6-80 Sequence:

(SEQ ID NO: 8)

5'-TCTTCCGCTTCCTCGCTCACTGACTCGCTGCGCTCGGTCGTTCGGCTGCGGC

GAGCGGTATCAGCTCACTCAAAGGCGGTAATACGGTTATCCACAGAATCAGGGGA

TAACGCAGGAAAGAACATGTGAGCAAAAGGCCAGCAAAAGGCCAGGAACCGTAAA

AAGGCCGCGTTGCTGGCGTTTTTCCATAGGCTCCGCCCCCCTGACGAGCATCACA

AAAATCGACGCTCAAGTCAGAGGTGGCGAAACCCGACAGGACTATAAAGATACCA

GGCGTTTCCCCCTGGAAGCTCCCTCGTGCGCTCTCCTGTTCCGACCCTGCCGCTT

ACCGATACCTGTCCGCCTTTCTCCCTTCGGGAAGCGTGGCGCTTTCTCATAGCTC

ACGCTGTAGGTATCTCAGTTCGGTGTAGGTCGTTCGCTCCAAGCTGGGCTGTGTG

CACGAACCCCCCGTTCAGCCCGACCGCTGCGCCTTATCCGGTAACTATCGTCTTG

AGTCCAACCCGGTAAGACACGACTTATCGCCACTGGCAGCAGCCACTGGTAACAG

-continued
```
GATTAGCAGAGCGAGGTATGTAGGCGGTGCTACAGAGTTCTTGAAGTGGTGGCC

TAACTACGGCTACACTAGAAGAACAGTATTTGGTATCTGCGCTCTGCTGAAGCCA

GTTACCTTCGGAAAAAGAGTTGGTAGCTCTTGATCCGGCAAACAAACCACCGCTG

GTAGCGGTGGTTTTTTTGTTTGCAAGCAGCAGATTACGCGCAGAAAAAAAGGATC

TCAAGAAGATCCTTTGATCTTTTCTACGGGGTCTGACGCTCAGTGGAACGAAAAC

TCACGTTAAGGGATTTTGGTCATGAGATTATCAAAAAGGATCTTCACCTAGATCC

TTTTAAATTAAAAATGAAGTTTTAAATCAATCTAAAGTATATATGAGTAAACTTG

GTCTGACAGTTACCAATGCTTAATCAGTGAGGCACCTATCTCAGCGATCTGTCTA

TTTCGTTCATCCATAGTTGCCTGACTCCCCGTCGTGTAGATAACTACGATACGGG

AGGGCTTACCATCTGGCCCCAGTGCTGCAATGATACCGCGAGACCCACGCTCACC

GGCTCCAGATTTATCAGCAATAAACCAGCCAGCCGGAAGGGCCGAGCGCAGAAG

TGGTCCTGCAACTTTATCCGCCTCCATCCAGTCTATTAATTGTTGCCGGGAAGCTA

GAGTAAGTAGTTCGCCAGTTAATAGTTTGCGCAACGTTGTTGCCATTGCTACAGG

CATCGTGGTGTCACGCTCGTCGTTTGGTATGGCTTCATTCAGCTCCGGTTCCCAAC

GATCAAGGCGAGTTACATGATCCCCCATGTTGTGCAAAAAAGCGGTTAGCTCCTT

CGGTCCTCCGATCGTTGTCAGAAGTAAGTTGGCCGCAGTGTTATCACTCATGGTT

ATGGCAGCACTGCATAATTCTCTTACTGTCATGCCATCCGTAAGATGCTTTTCTGT

GACTGGTGAGTACTCAACCAAGTCATTCTGAGAATAGTGTATGCGGCGACCGAG

TTGCTCTTGCCCGGCGTCAATACGGGATAATACCGCGCCACATAGCAGAACTTTA

AAAGTGCTCATCATTGGAAAACGTTCTTCGGGGCGAAAACTCTCAAGGATCTTAC

CGCTGTTGAGATCCAGTTCGATGTAACCCACTCGTGCACCCAACTGATCTTCAGC

ATCTTTTACTTTCACCAGCGTTTCTGGGTGAGCAAAAACAGGAAGGCAAAATGCC

GCAAAAAAGGGAATAAGGGCGACACGGAAATGTTGAATACTCATACTCTTCCTT

TTTCAATATTATTGAAGCATTTATCAGGGTTATTGTCTCATGAGCGGATACATATT

TGAATGTATTTAGAAAAATAAACAAATAGGGGTTCCGCGCACATTTCCCCGAAA

AGTGCCACCTGACGTCTAAGAAACCATTATTATCATGACATTAACCTATAAAAAT

AGGCGTATCACGAGGCCCTTTCGTCTCGCGCGTTTCGGTGATGACGGTGAAAACC

TCTGACACATGCAGCTCCCGGAGACGGTCACAGCTTGTCTGTAAGCGGATGCCGG

GAGCAGACAAGCCCGTCAGGGCGCGTCAGCGGGTGTTGGCGGGTGTCGGGGCTG

GCTTAACTATGCGGCATCAGAGCAGATTGTACTGAGAGTGCACCATAAAATTGTA

AACGTTAATATTTTGTTAAAATTCGCGTTAAATTTTGTTAAATCAGCTCATTTTT

TAACCAATAGGCCGAAATCGGCAAAATCCCTTATAAATCAAAAGAATAGCCCGA

GATAGGGTTGAGTGTTGTTCCAGTTTGGAACAAGAGTCCACTATTAAAGAACGTG

GACTCCAACGTCAAAGGGCGAAAAACCGTCTATCAGGGCGATGGCCCACTACGT

GAACCATCACCCAAATCAAGTTTTTTGGGGTCGAGGTGCCGTAAAGCACTAAATC

GGAACCCTAAAGGGAGCCCCCGATTTAGAGCTTGACGGGAAAGCCGGCGAACG

TGGCGAGAAAGGAAGGGAAGAAAGCGAAAGGAGCGGGCGCTAGGGCGCTGGCA

AGTGTAGCGGTCACGCTGCGCGTAACCACCACACCCGCCGCGCTTAATGCGCCGC

TACAGGGCGCGTACTATGGTTGCTTTGACGTATGCGGTGTGAAATACCGCACAGA

TGCGTAAGGAGAAAATACCGCATCAGGCGCCATTCGCCATTCAGGCTGCGCAAC

TGTTGGGAAGGGCGATCGGTGCGGGCCTCTTCGCTATTACGCCAGCTGGCGAAA
```

```
GGGGGATGTGCTGCAAGGCGATTAAGTTGGGTAACGCCAGGGTTTTCCCAGTCA

CGACGTTGTAAAACGACGGCCAGTGCCAAGCTTAAGGTGCACGGCCCACGTGGC

CACTAGTACTTCTCGACAGAAGCACCATGTCCTTGGGTCCGGCCTGCTGAATGCG

CAGGCGGTCGGCCATGCCCCAGGCTTCGTTTTGACATCGGCGCAGGTCTTTGTAG

TAGTCTTGCATCAGCCTTTCTACCGGCACTTCTTCTTCTCCTTCCTCTTGTCCTGC

ATCTCTTGCATCTATCGCTGCGGCGGCGGCGGAGTTTGGCCGTAGGTGGCGCCCTC

TTCCTCCCATGCGTGTGACCCCGAAGCCCCTCATCGGCTGAAGCAGGGCTAGGTC

GGCGACAACGCGCTCGGCTAATATGGCCTGCTGCACCTGCGTGAGGGTAGACTG

GAAGTCATCCATGTCCACAAAGCGGTGGTATGCGCCCGTGTTGATGGTGTAAGTG

CAGTTGGCCATAACGGACCAGTTAACGGTCTGGTGACCCGGCTGCGAGAGCTCG

GTGTACCTGAGACGCGAGTAAGCCCTCGAGTCAAATACGTAGTCGTTGCAAGTCC

GCACCAGGTACTGGTATCCCACCAAAAAGTGCGGCGGCGGCTGGCGGTAGAGGG

GCCAGCGTAGGGTGGCCGGGGCTCCGGGGGCGAGATCTTCCAACATAAGGCGAT

GATATCCGTAGATGTACCTGGACATCCAGGTGATGCCGGCGGCGGTGGTGGAGG

CGCGCGGAAAGTCGCGGACGCGGTTCCAGATGTTGCGCAGCGGCAAAAAGTGCT

CCATGGTCGGGACGCTCTGGCCGGTCAGGCGCGCGCAATCGTTGACGCTCTACCG

TGCAAAAGGAGAGCCTGTAAGCGGGCACTCTTCCGTGGTCTGGTGGATAAATTC

GCAAGGGTATCATGGCGGACGACCGGGGTTCGAGCCCCGTATCCGGCCGTCCGC

CGTGATCCATGCGGTTACCGCCCGCGTGTCGAACCCAGGTGTGCGACGTCAGACA

ACGGGGGAGTGCTCCTTTTGGCTTCCTTCCAGGCGCGGCGGCTGCTGCGCTAGCT

TTTTTGGCCACTGGCCGCGCGCAGCGTAAGCGGTTAGGCTGGAAAGCGAAAGCA

TTAAGTGGCTGGCTCCCTGTAGCCGGAGGGTTATTTTCCAAGGGTTGAGTCGCGG

GACCCCCGGTTCGAGTCTCGGACCGGCCGGACTGCGGCGAACGGGGGTTTGCCT

CCCCGTCATGCAAGACCCCGCTTGCAAATTCCTCCGGAAACAGGGACGAGCCCCT

TTTTTGCTTTTCCCAGATGCATCCGGTGCTGCGGCAGATGCGCCCCCCTCCTCAG

CAGCGGCAAGAGCAAGAGGACCGGCAGACATGCAGGGCACCCTCCCCTCCTCCTA

CCGGGTCAGGAGGGGCGACATCCGCGGTTGACGCGGCAGCAGATGGTGATTACG

AACCCCCGCGGCGCCGGGCCCGGCACTACCTGGACTTGGAGGAGGGCGAGGGCC

TGGCGCGGCTAGGAGCGCCCTCTCCTGAGCGGTACCCAAGGGTGCAGCTGAAGC

GTGATACGCGTGAGGCGTACGTGCCGCGGCAGAACCTGTTTCGCGACCGCGAGG

GAGAGGAGCCCGAGGAGATGCGGGATCGAAAGTTCCACGCAGGGCGCGAGCTG

CGGCATGGCCTGAATCGCGAGCGGTTGCTGCGCGAGGAGGACTTTGAGCCCGAC

GCGCGAACCGGGATTAGTCCCGCGCGCGCACACGTGGCGGCCGCCGACCTGGTA

ACCGCATACGAGCAGACGGTGAACCAGGAGATTAACTTTCAAAAAAGCTTTAAC

AACCACGTGCGTACGCTTGTGGCGCGCGAGGAGGTGGCTATAGGACTGATGCAT

CTGTGGGACTTTGTAAGCGCGCTGGAGCAAAACCCAAATAGCAAGCCGCTCATG

GCGCAGCTGTTCCTTATAGTGCAGCACAGCAGGGACAACGAGGCATTCAGGGAT

GCGCTGCTAAACATAGTAGAGCCCGAGGGCCGCTGGCTGCTCGATTTGATAAAC

ATCCTGCAGAGCATAGTGGTGCAGGAGCGCAGCTTGAGCCTGGCTGACAAGGTG

GCCGCCATCAACTATTCCATGCTTAGCCTGGGCAAGTTTTACGCCCGCAAGATAT
```

-continued

```
ACCATACCCCTTACGTTCCCATAGACAAGGAGGTAAAGATCGAGGGGTTCTACAT
GCGCATGGCGCTGAAGGTGCTTACCTTGAGCGACGACCTGGGCGTTTATCGCAAC
GAGCGCATCCACAAGGCCGTGAGCGTGAGCCGGCGGCGCGAGCTCAGCGACCGC
GAGCTGATGCACAGCCTGCAAAGGGCCCTGGCTGGCACGGGCAGCGGCGATAGA
GAGGCCGAGTCCTACTTTGACGCGGGCGCTGACCTGCGCTGGGCCCCAAGCCGA
CGCGCCCTGGAGGCAGCTGGGGCCGGACCTGGGCTGGCGGTGGCACCCGCGCGC
GCTGGCAACGTCGGCGGCGTGGAGGAATATGACGAGGACGATGAGTACGAGCCA
GAGGACGGCGAGTACTAAGCGGTGATGTTTCTGATCAGATGATGCAAGACGCAA
CGGACCCGGCGGTGCGGGCGGCGCTGCAGAGCCAGCCGTCCGGCCTTAACTCCA
CGGACGACTGGCGCCAGGTCATGGACCGCATCATGTCGCTGACTGCGCGCAATC
CTGACGCGTTCCGGCAGCAGCCGCAGGCCAACGGGCTGTCCGCAATTCTGGAAG
CGGTGGTCCCGGCGCGCGCAAACCCCACGCACGAGAAGGTGCTGGCGATCGTAA
ACGCGCTGGCCGAAAACAGGGCCATCCGGCCCGACGAGGCCGGCCTGGTCTACG
ACGCGCTGCTTCAGCGCGTGGCTCGTTACAACAGCGGCAACGTGCAGACCAACC
TGGACCGGCTGGTGGGGGATGTGCGCGAGGCCGTGGCGCAGCGTGAGCGCGCGC
AGCAGCAGGGCAACCTGGGCTCCATGGTTGCACTAAACGCCTTCCTGAGTACAC
AGCCCGCCAACGTGCCGCGGGGACAGGAGGACTACACCAACTTTGTGAGCGCAC
TGCGGCTAATGGTGACTGAGACACCGCAAACTGAGGTGTACCAGTCTGGGCCAG
ACTATTTTTCCAGACCAGTAGACAAGGCCTGCAGACCGTAAACCTGAGCCAGGC
TTTCAAAAACTTGCAGGGGCTGTGGGGGGTGCGGGCTCCCACAGGCGACCGCGC
GACCGTGTCTAGCTTGCTGACGCCCAACTCGCGCCTGTTGCTGCTGCTAATAGCG
CCCTTCACGGACAGTGGCAGCGTGTCCCGGGACACATACCTAGGTCACTTGCTGA
CACTGTACCGCGAGGCCATAGGTCAGGCGCATGTGGACGAGCATACTTTCCAGG
AGATTACAAGTGTCAGCCGCGCGCTGGGGCAGGAGGACACGGGCAGCCTGGAGG
CAACCCTAAACTACCTGCTGACCAACCGGCGGCAGAAGATCCCCTCGTTGCACA
GTTTCGCACCCTTTGGCGCATCCCATTCTCCAGTAACTTTATGTCCATGGGCGCAC
TCACAGACCTGGGCCAAAACCTTCTCTACGCCAACTCCGCCCACGCGCTAGACAT
GACTTTTGAGGTGGATCCCATGGACGAGCCCACCCTTCTTTATGTTTTGTTTGAAG
TCTTTGACGTGGTCCGTGTGCACCGGCCGCACCGCGGCGTCATCGAAACCGTGTA
CCTGCGCACGCCCTTCTCGGCCGGCAACGCCACAACATAAAGAAGCAAGCAACA
TCAACAACAGCTGCCGCCATGGGCTCCAGTGAGCAGGAACTGAAAGCCATTGTC
AAAGATCTTGGTTGTGGGCCATATTTTTTGGGCACCTATGACAAGCGCTTTCCAG
GCTTTGTTTCTCCACACAAGCTCGCCTGCGCCATAGTCAATACGGCCGGTCGCGA
GACTGGGGGCGTACACTGGATGGCCTTTGCCTGGAACCCGCACTCAAAAACATG
CTACCTCTTTGAGCCCTTTGGCTTTTCTGACCAGCGACTCAAGCAGGTTTACCAGT
TTGAGTACGAGTCACTCCTGCGCCGTAGCGCCATTGCTTCTTCCCCCGACCGCTGT
ATAACGCTGGAAAAGTCCACCCAAAGCGTACAGGGGCCCAACTCGGCCGCCTGT
GGACTATTCTGCTGCATGTTTCTCCACGCCTTTGCCAACTGGCCCCAAACTCCCAT
GGATCACAACCCCACCATGAACCTTATTACCGGGGTACCCAACTCCATGCTCAAC
AGTCCCCAGGTACAGCCCACCCTGCGTCGCAACCAGGAACAGCTCTACAGCTTCC
TGGAGCGCCACTCGCCCTACTTCCGCAGCCACAGTGCGCAGATTAGGAGCGCCA
```

-continued

```
CTTCTTTTTGTCACTTGAAAAACATGTAAAAATAATGTACTAGAGACACTTTCAA

TAAAGGCAAATGCTTTTATTTGTACACTCTCGGGTGATTATTTACCCCCACCCTTG

CCGTCTGCGCCGTTTAAAAATCAAAGGGGTTCTGCCGCGCATCGCTATGCGCCAC

TGGCAGGGACACGTTGCGATACTGGTGTTTAGTGCTCCACTTAAACTCAGGCACA

ACCATCCGCGGCAGCTCGGTGAAGTTTTCACTCCACAGGCTGCGCACCATCACCA

ACGCGTTTAGCAGGTCGGGCGCCGATATCTTGAAGTCGCAGTTGGGGCCTCCGCC

CTGCGCGCGCGAGTTGCGATACACAGGGTTGCAGCACTGGAACACTATCAGCGC

CGGGTGGTGCACGCTGGCCAGCACGCTCTTGTCGGAGATCAGATCCGCGTCCAG

GTCCTCCGCGTTGCTCAGGGCGAACGGAGTCAACTTTGGTAGCTGCCTTCCCAAA

AAGGGCGCGTGCCCACiGCTTTGAGTTGCACTCGCACCGTAGTGGCATCAAAAGG

TGACCGTGCCCGGTCTGGGCGTTAGGATACAGCGCCTGCATAAAAGCCTTGATCT

GCTTAAAAGCCACCTGAGCCTTTGCGCCTTCAGAGAAGAACATGCCGCAAGACTT

GCCGGAAAACTGATTGGCCGGACAGGCCGCGTCGTGCACGCAGCACCTTGCGTC

GGTGTTGGAGATCTGCACCACATTTCGGCCCCACCGGTTCTTCACGATCTTGGCC

TTGCTAGACTGCTCCTTCAGCGCGCGCTGCCCGTTTTCGCTCGTCACATCCATTTC

AATCACGTGCTCCTTATTTATCATAATGCTTCCGTGTAGACACTTAAGCTCGCCTT

CGATCTCAGCGCAGCGGTGCAGCCACAACGCGCAGCCCGTGGGCTCGTGATGCT

TGTAGGTCACCTCTGCAAACGACTGCAGGTACGCCTGCAGGAATCGCCCCATCAT

CGTGACAAAGGTCTTGTTGCTTGGTGAAGGTCAGCTGCAACCCGCGGTGCTCCTCG

TTCAGCCAGGTCTTGCATACGGCCGCCAGAGCTTCCACTTGGTCAGGCAGTAGTT

TGAAGTTCGCCTTTAGATCGTTATCCACGTGGTACTTGTCCATCAGCGCGCGCGC

AGCCTCCATGCCCTTCTCCCACGCAGACACGATCGGCACACTCAGCGGGTTCATC

ACCGTAATTTCACTTTCCGCTTCGCTGGGCTCTTCCTCTTCCTCTTGCGTCCGCAT

ACCACGCGCCACTGGGTCGTCTTCATTCAGCCGCCGCACTGTGCGCTTACCTCCTT

TGCCATGCTTGATTAGCACCGGTGGGTTGCTGAAACCCACCATTTGTAGCGCCAC

ATCTTCTCTTTCTTCCTCGCTGTCCACGATTACCTCTGGTGATGGCGGGCGCTCGG

GCTTGGGAGAAGGGCGCTTCTTTTTCTTCTTGGGCGCAATGGCCAAATCCGCCGC

CGAGGTCGATGGCCGCGGGCTGGGTGTGCGCGGCACCAGCGCGTCTTGTGATGA

GTCTTCCTCGTCCTCGCACTCGATACGCCGCCTCATCCGCTTTTTTGGGGCGCCC

GGGGAGGCGGCGGCGACGGGGACGGGGACGACACGTCCTCCATGGTTGGGGGA

CGTCGCGCCGCACCGCGTCCGCGCTCGGGGGTGGTTTCGCGCTGCTCCTCTTCCC

GACTGGCCATTTCCTTCTCCTATAGGCAGAAAAAGATCATGGAGTCAGTCGAGAA

GAAGGACAGCCTAACCGCCCCCTCTGAGTTCGCCACCACCGCCTCCACCGATGCC

GCCAACGCGCCTACCACCTTCCCCGTCGAGGCACCCCCGCTTGAGGAGGAGGAA

GTGATTATCGAGCAGGACCCAGGTTTTGTAAGCGAAGACGACGAGGACCGCTCA

GTACCAACAGAGGATAAAAAGCAAGACCAGGACAACGCAGAGGCAAACGAGGA

ACAAGTCGGGCGGGGGGACGAAAGGCATGGCGACTACCTAGATGTGGGAGACG

ACGTGCTGTTGAAGCATCTGCAGCGCCAGTGCGCCATTATCTGCGACGCGTTGCA

AGAGCGCAGCGATGTGCCCCTCGCCATAGCGGATGTCAGCCTTGCCTACGAACG

CCACCTATTCTCACCGCGCGTACCCCCAAACGCCAAGAAAACGGCACATGCGA
```

-continued

```
GCCCAACCCGCGCCTCAACTTCTACCCCGTATTTGCCGTGCCAGAGGTGCTTGCC
ACCTATCACATCTTTTTCCAAAACTGCAAGATACCCCTATCCTGCCGTGCCAACC
GCAGCCGAGCGGACAAGCAGCTGGCCTTGCGGCAGGGCGCTGTCATACCTGATA
TCGCCTCGCTCAACGAAGTGCCAAAAATCTTTGAGGGTCTTGGACGCGACGAGA
AGCGCGCGGCAAACGCTCTGCAACAGGAAAACAGCGAAAATGAAAGTCACTCTG
GAGTGTTGGTGGAACTCGAGGGTGACAACGCGCGCCTAGCCGTACTAAAACGCA
GCATCGAGGTCACCCACTTTGCCTACCCGGCACTTAACCTACCCCCCAAGGTCAT
GAGCACAGTCATGAGGACCTGATCGTGCGCCGTGCCCAGCCCCTGGAGAGGGA
TGCAAATTTGCAAGAACAAACAGAGGAGGGCCTACCCGCAGTTGGCGAGGAGCA
GCTAGCGCGCTGGCTTCAAACGCGCGAGCCTGCCGACTTGGAGGAGCGACGCAA
ACTAATGATGGCCGCAGTGCTCTTACCGTGGAGCTTGAGTGCATGCAGCGGTTC
TTTGCTGACCCGGAGATGCAGCGCAAGCTAGAGGAAACATTGCACTACACCTTTC
GACAGGGCTACGTACGCCAGGCCTGCAAGATCTCCAACGTGGAGCTCTGCAACC
TGGTCTCCTACCTTGGAATTTTGCACGAAAACCGCCTTGGGCAAAACGTGCTTCA
TTCCACGCTCAAGGGCGAGGCGCGCCGCGACTACGTCCGCGACTGCGTTTACTTA
TTTCTATGCTACACCTGGCAGACGGCCATGGGCGTTTGGCAGCAGTGCTTGGAGG
AGTGCAACCTCAAGGAGCTGCAGAAACTGCTAAAGCAAAACTTGAAGGACCTAT
GGACGGCCTTCAACGAGCGCTCCGTGGCCGCGCACCTGGCGGACATCATTTTCCC
CGAACGCCTGCTTAAAACCCTGCAACAGGGTCTGCCAGACTTCACCAGTCAAAG
CATGTTGCAGAACTTTAGGAACTTTATCCTAGAGCGCTCAGGAATCTTGCCCGCC
ACCTGCTGTGCACTTCCTAGCGACTTTGTGCCCATTAAGTACCGCGAATGCCCTC
CGCCGCTTTGGGGCCACTGCTACCTTCTGCAGCTAGCCAACTACCTTGCCTACCA
CTCTGACATAATGGAAGACGTGAGCGGTGACGGTCTACTGGAGTGTCACTGTCGC
TGCAACCTATGCACCCCGCACCGCTCCCTGGTTTGCAATTCGCAGCTGCTTAACG
AAAGTCAAATTATCGGTACCTTTGAGCTGCAGGGTCCCTCGCCTGACGAAAAGTC
CGCGGCTCCGGGGTTGAAACTCACTCCGGGGCTGTGGACGTCGGCTTACCTTCGC
AAATTTGTACCTGAGGACTACCACGCCCACGAGATTAGGTTCTACGAAGACCAAT
CCCGCCCGCCAAATGCGGAGCTTACCGCCTGCGTCATTACCCAGGGCCACATTCT
TGGCCAATTGCAAGCCATCAACAAAGCCCGCCAAGACTTTCTGCTACGAAAGGG
ACGGGGGGTTTACTTGGACCCCCAGTCCGGCGAGGAGCTCAACCCAATCCCCCC
GCCGCCGCAGCCCTATCAGCAGCAGCCGCGGGCCCTTGCTTCCCAGGATGGCACC
CAAAAAGAAGCTGCAGCTGCCGCCGCCACCCACGGACGAGGAGGAATACTGGG
ACAGTCAGGCAGAGGAGGTTTTGGACGAGGAGGAGGAGGACATGATGGAAGAC
TGGGAGAGCCTAGACGAGGAAGCTTCCGAGGTCGAAGAGGTGTCAGACGAAAC
ACCGTCACCCTCGGTCGCATTCCCCTCGCCGGCGCCCCAGAAATCGGCAACCGGT
TCCAGCATGGCTACAACCTCCGCTCCTCAGGCGCCGCCGGCACTGCCCGTTCGCC
GACCCAACCGTAGATGGGACACCACTGGAACCAGGGCCGGTAAGTCCAAGCAGC
CGCCGCCGTTAGCCCAAGAGCAACAACAGCGCCAAGGCTACCGCTCATGGCGCG
GGCACAAGAACGCCATAGTTGCTTGCTTGCAAGACTGTGGGGGCAACATCTCCTT
CGCCCGCCGCTTTCTTCTCTACCATCACGGCGTGGCCTTCCCCCGTAACATCCTGC
ATTACTACCGTCATCTCTACAGCCCATACTGCACCGGCGGCAGCGGCAGCGGCAG
```

-continued

```
CAACAGCAGCGGCCACACAGAAGCAAAGGCGACCGGATAGCAAGACTCTGACA

AAGCCCAAGAAATCCACAGCGGCGGCAGCAGCAGGAGGAGGAGCGCTGCGTCT

GGCGCCCAACGAACCCGTATCGACCCGCGAGCTTAGAAACAGGATTTTTCCCACT

CTGTATGCTATATTTCAACAGAGCAGGGGCCAAGAACAAGAGCTGAAAATAAAA

AACAGGTCTCTGCGATCCCTCACCCGCAGCTGCCTGTATCACAAAAGCGAAGATC

AGCTTCGGCGCACGCTGGAAGACGCGGAGGCTCTCTTCAGTAAATACTGCGCGCT

GACTCTTAAGGACTAGTTTCGCGCCCTTTCTCAAATTTAAGCGCGAAAACTACGT

CATCTCCAGCGGCCACACCCGGCGCCAGCACCTGTCGTCAGCGCCATTATGAGCA

AGGAAATTCCCACGCCCTACATGTGGAGTTACCAGCCACAAATGGGACTTGCGG

CTGGAGCTGCCCAAGACTACTCAACCCGAATAAACTACATGAGCGCGGGACCCC

ACATGATATCCCGGGTCAACGGAATCCGCGCCCACCGAAACCGAATTCTCTTGGA

ACAGGCGGCTATTACCACCACACCTCGTAATAACCTTAATCCCCGTAGTTGGCCC

GCTGCCCTGGTGTACCAGGAAAGTCCCGCTCCCACCACTGTGGTACTTCCCAGAG

ACGCCCAGGCCGAAGTTCAGATGACTAACTCAGGGGCGCAGCTTGCGGGCGGCT

TTCGTCACAGGGTGCGGTCGCCCGGGCAGGGTATAACTCACCTGACAATCAGAG

GGCGAGGTATTCAGCTCAACGACGAGTCGGTGAGCTCCTCGCTTGGTCTCCGTCC

GGACGGGACATTTCAGATCGGCGGCGCCGGCCGTCCTTCATTCACGCCTCGTCAG

GCAATCCTAACTCTGCAGACCTCGTCCTCTGAGCCGCGCTCTGGAGGCATTGGAA

CTCTGCAATTTATTGAGGAGTTTGTGCCATCGGTCTACTTTAACCCCTTCTCGGGA

CCTCCCGGCCACTATCCGGATCAATTTATTCCTAACTTTGACGCGGTAAAGGACT

CGGCGGACGGCTACGACTGAATGTTAAGTGGAGAGGCAGAGCAACTGCGCCTGA

AACACCTGGTCCACTGTCGCCGCCACAAGTGCTTTGCCCGCGACTCCGGTGAGTT

TTGCTACTTTGAATTGCCCGAGGATCATATCGAGGGCCCGGCGCACGGCGTCCGG

CTTACCGCCCAGGGAGAGCTTGCCCGTAGCCTGATTCGGGAGTTTACCCAGCGCC

CCCTGCTAGTTGAGCGGGACAGGGGACCCTGTGTTCTCACTGTGATTTGCAACTG

TCCTAACCTTGGATTACATCAAGATCCTCTAGTTAATTAACTAGAGTACCCGGGG

ATCTTATTCCCTTTAACTAATAAAAAAAAATAATAAAGCATCACTTACTTAAAAT

CAGTTAGCAAATTTCTGTCCAGTTTATTCAGCAGCACCTCCTTGCCCTCCTCCCAG

CTCTGGTATTGCAGCTTCCTCCTGGCTGCAAACTTTCTCCACAATCTAAATGGAAT

GTCAGTTTCCTCCTGTTCCTGTCCATCCGCACCCACTATCTTCATGTTGTTGCAGA

TGAAGCGCGCAAGACCGTCTGAAGATACCTTCAACCCCGTGTATCCATATGACAC

GGAAACCGGTCCTCCAACTGTGCCTTTTCTTACTCCTCCCTTTGTATCCCCCAATG

GGTTTCAAGAGAGTCCCCCTGGGGTACTCTCTTTGCGCCTATCCGAACGTCTAGTT

ACCTCCAATGGCATGCTTGCGCTCAAAATGGGCAACGGCCTCTCTCTGGACGAGG

CCGGCAACCTTACCTCCCAAAATGTAACCACTGTGAGCCCACCTCTCAAAAAAAC

CAAGTCAAACATAAACCTGGAAATATCTGCACCCCTCACAGTTACCTCAGAAGCC

CTAACTGTGGCTGCCGCCGCACCTCTAATGGTCGCGGGCAACACACTCACCATGC

AATCACAGGCCCCGCTAACCGTGCACGACTCCAAACTTAGCATTGCCACCCAAG

GACCCCTCACAGTGTCAGAAGGAAAGCTAGCCCTGCAAACATCAGGCCCCCTCA

CCACCACCGATAGCAGTACCCTTACTATCACTGCCTCACCCCCTCTAACTACTGC
```

-continued

```
CACTGGTAGCTTGGGCATTGACTTGAAAGAGCCCATTTATACACAAAATGGAAA

ACTAGGACTAAAGTACGGGGCTCCTTTGCATGTAACAGACGACCTAAACACTTTG

ACCGTAGCAACTGGTCCAGGTGTGACTATTAATAATACTTCCTTGCAAACTAAAG

TTACTGCAGCCTTGGGTTTTGATTCACAAGGCAATATGCAACTTAATGTAGCAGG

AGGACTAAGGATTGATTCTCAAAACAGACGCCTTATACTTGATGTTAGTTATCCG

TTTGATGCTCAAAACCAACTAAATCTAAGACTAGGACAGGGCCCTCTTTTTATAA

ACTCAGCCCACAACTTGGATATTAACTACAACAAAGGCCTTTACTTGTTTACAGC

TTCAAACAATTCCAAAAAGCTTGAGGTTAACCTAAGCACTGCCAAGGGGTTGAT

GTTTGACGCTACAGCCATAGCCATTAATGCAGGAGATGGGCTTGAATTTGGTTCA

CCTAATGCACCAAACACAAATCCCCTCAAAACAAAAATTGGCCATGGCCTAGAA

TTTGATTCAAACAAGGCTATGGTTCCTAAACTAGGAACTGGCCTTAGTTTTGACA

GCACAGGTGCCATTACAGTAGGAAACAAAAATAATGATAAGCTAACTTTGTGGA

CCACACCAGCTCCATCTCCTAACTGTAGACTAAATGCAGAGAAAGATGCTAAACT

CACTTTGGTCTTAACAAAATGTGGCAGTCAAATACTTGCTACAGTTTCAGTTTTG

GCTGTTAAAGGCAGTTTGGCTCCAATATCTGGAACAGTTCAAAGTGCTCATCTTA

TTATAAGATTTGACGAAAATGGAGTGCTACTAAACAATTCCTTCCTGGACCCAGA

ATATTGGAACTTTAGAAATGGAGATCTTACTGAAGGCACAGCCTATACAAACGCT

GTTGGATTTATGCCTAACCTATCAGCTTATCCAAAATCTCACGGTAAAACTGCCA

AAAGTAACATTGTCAGTCAAGTTTACTTAAACGGAGACAAAACTAAACCTGTAA

CACTAACCATTACACTAAACGGTACACAGGAAACAGGAGACACAACTCCAAGTG

CATACTCTATGTCATTTTCATGGGACTGGTCTGGCCACAACTACATTAATGAAAT

ATTTGCCACATCCTCTTACACTTTTTCATACATTGCCCAAGAATAAAGAATCGTTT

GTGTTATGTTTCAACGTGTTTATTTTTCAATTGCAGAAAATTTCAAGTCATTTTTC

ATTCAGTAGTATAGCCCCACCACCACATAGCTTATACAGATCACCGTACCTTAAT

CAAACTCACAGAACCCTAGTATTCAACCTGCCACCTCCCTCCCAACACACAGAGT

ACACAGTCCTTTCTCCCCGGCTGGCCTTAAAAAGCATCATATCATGGGTAACAGA

CATATTCTTAGGTGTTATATTCCACACGGTTTCCTGTCGAGCCAAACGCTCATCAG

TGATATTAATAAACTCCCCGGGCAGCTCACTTAAGTTCATGTCGCTGTCCAGCTG

CTGAGCCACAGGCTGCTGTCCAACTTGCGGTTGCTTAACGGGCGGCGAAGGAGA

AGTCCACGCCTACATGGGGGTAGAGTCATAATCGTGCATCAGGATAGGGCGGTG

GTGCTGCAGCAGCGCGCGAATAAACTGCTGCCGCCGCCGCTCCGTCCTGCAGGA

ATACAACATGGCAGTGGTCTCCTCAGCGATGATTCGCACCGCCCGCAGCATAAG

GCGCCTTGTCCTCCGGGCACAGCAGCGCACCCTGATCTCACTTAAATCAGCACAG

TAACTGCAGCACAGCACCACAATATTGTTCAAAATCCCACAGTGCAAGGCGCTGT

ATCCAAAGCTCATGGCGGGACCACAGAACCCACGTGGCCATCATACCACAAGC

GCAGGTAGATTAAGTGGCGACCCCTCATAAACACGCTGGACATAAACATTACCT

CTTTTGGCATGTTGTAATTCACCACCTCCCGGTACCATATAAACCTCTGATTAAAC

ATGGCGCCATCCACCACCATCCTAAACCAGCTGGCCAAAACCTGCCCGCCGGCTA

TACACTGCAGGGAACCGGGACTGGAACAATGACAGTGGAGAGCCCAGGACTCGT

AACCATGGATCATCATGCTCGTCATGATATCAATGTTGGCACAACACAGGCACAC

GTGCATACACTTCCTCAGGATTACAAGCTCCTCCCGCGTTAGAACCATATCCCAG
```

-continued

```
GGAACAACCCATTCCTGAATCAGCGTAAATCCCACACTGCAGGGAAGACCTCGC

ACGTAACTCACGTTGTGCATTGTCAAAGTGTTACATTCGGGCAGCAGCGGATGAT

CCTCCAGTATGGTAGCGCGGGTTTCTGTCTCAAAAGGAGGTAGACGATCCCTACT

GTACGGAGTGCGCCGAGACAACCGAGATCGTGTTGGTCGTAGTGTCATGCCAAA

TGGAACGCCGGACGTAGTCATATTTCCTGAAGCAAAACCAGGTGCGGGCGTGAC

AAACAGATCTGCGTCTCCGGTCTCGCCGCTTAGATCGCTCTGTGTAGTAGTTGTA

GTATATCCACTCTCTCAAAGCATCCAGGCGCCCCCTGGCTTCGGGTTCTATGTAA

ACTCCTTCATGCGCCGCTGCCCTGATAACATCCACCACCGCAGAATAAGCCACAC

CCAGCCAACCTACACATTCGTTCTGCGAGTCACACACGGGAGGAGCGGGAAGAG

CTGGAAGAACCATGTTTTTTTTTTATTCCAAAAGATTATCCAAAACCTCAAAAT

GAAGATCTATTAAGTGAACGCGCTCCCCTCCGGTGGCGTGGTCAAACTCTACAGC

CAAAGAACAGATAATGGCATTTGTAAGATGTTGCACAATGGCTTCCAAAAGGCA

AACGGCCCTCACGTCCAAGTGGACGTAAAGGCTAAACCCTTCAGGGTGAATCTC

CTCTATAAACATTCCAGCACCTTCAACCATGCCCAAATAATTCTCATCTCGCCAC

CTTCTCAATATATCTCTAAGCAAATCCCGAATATTAAGTCCGGCCATTGTAAAAA

TCTGCTCCAGAGCGCCCTCCACCTTCAGCCTCAAGCAGCGAATCATGATTGCAAA

AATTCAGGTTCCTCACAGACCTGTATAAGATTCAAAAGCGGAACATTAACAAAA

ATACCGCGATCCCGTAGGTCCCTTCGCAGGGCCAGCTGAACATAATCGTGCAGGT

CTGCACGGACCAGCGCGGCCACTTCCCCGCCAGGAACCTTGACAAAAGAACCCA

CACTGATTATGACACGCATACTCGGAGCTATGCTAACCAGCGTAGCCCCGATGTA

AGCTTTGTTGCATGGGCGGCGATATAAAATGCAAGGTGCTGCTCAAAAAATCAG

GCAAAGCCTCGCGCAAAAAAGAAAGCACATCGTAGTCATGCTCATGCAGATAAA

GGCAGGTAAGCTCCGGAACCACCACAGAAAAAGACACCATTTTTCTCTCAAACA

TGTCTGCGGGTTTCTGCATAAACACAAAATAAAATAACAAAAAAACATTTAAAC

ATTAGAAGCCTGTCTTACAACAGGAAAAACAACCCTTATAAGCATAAGACGGAC

TACGGCCATGCCGGCGTGACCGTAAAAAAACTGGTCACCGTGATTAAAAAGCAC

CACCGACAGCTCCTCGGTCATGTCCGGAGTCATAATGTAAGACTCGGTAAACACA

TCAGGTTGATTCATCGGTCAGTGCTAAAAAGCGACCGAAATAGCCCGGGGGAAT

ACATACCCGCAGGCGTAGAGACAACATTACAGCCCCCATAGGAGGTATAACAAA

ATTAATAGGAGAGAAAAACACATAAACACCTGAAAAACCCTCCTGCCTAGGCAA

AATAGCACCCTCCCGCTCCAGAACAACATACAGCGCTTCACAGCGGCAGCCTAA

CAGTCAGCCTTACCAGTAAAAAAGAAAACCTATTAAAAAAACACCACTCGACAC

GGCACCAGCTCAATCAGTCACAGTGTAAAAAAGGGCCAAGTGCAGAGCGAGTAT

ATATAGGACTAAAAAATGACGTAACGGTTAAAGTCCACAAAAAACACCCAGAAA

ACCGCACGCGAACCTACGCCCAGAAACGAAAGCCAAAAAACCCACAACTTCCTC

AAATCGTCACTTCCGTTTTCCCACGTTACGTAACTTCCCATTTTAAGAAAACTACA

ATTCCCAACACATACAAGTTACTCCGCCCTAAAACCTACGTCACCCGCCCCGTTC

CCACGCCCCGCGCCACGTCACAAACTCCACCCCCTCATTATCATATTGGCTTCAA

TCCAAAATAAGGTATATTATTGATGATTTATTTTGGATTGAAGCCAATATGATAA

TGAGGGGGTGGAGTTTGTGACGTGGCGCGGGGCGTGGGAACGGGGCGGGTGACG
```

-continued
```
TAGTAGTGTGGCGGAAGTGTGATGTTGCAAGTGTGGCGGAACACATGTAAGCGA

CGGATGTGGCAAAAGTGACGTTTTTGGTGTGCGCCGGATCCACAGGACGGGTGT

GGTCGCCATGATCGCGTAGTCGATAGTGGCTCCAAGTAGCGAAGCGAGCAGGAC

TGGGCGGCGGCCAAAGCGGTCGGACAGTGCTCCGAGAACGGGTGCGCATAGAAA

TTGCATCAACGCATATAGCGCTAGCAGCACGCCATAGTGACTGGCGATGCTGTCG

GAATGGACGATATCCCGCAAGAGGCCCGGCAGTACCGGCATAACCAAGCCTATG

CCTACAGCATCCAGGGTGACGGTGCCGAGGATGACGATGAGCGCATTGTTAGAT

TTCATACACGGTGCCTGACTGCGTTAGCAATTTAACTGTGATAAACTACCGCATT

AAAGCTTATCGAATTCGTAATCATGGTCATAGCTGTTTCCTGTGTGAAATTGTTAT

CCGCTCACAATTCCACACAACATACGAGCCGGAAGCATAAAGTGTAAAGCCTGG

GGTGCCTAATGAGTGAGCTAACTCACATTAATTGCGTTGCGCTCACTGCCCGCTT

TCCAGTCGGGAAACCTGTCGTGCCAGCTGCATTAATGAATCGGCCAACGCGCGG

GGAGAGGCGGTTTGCGTATTGGGCGC
```

For co-packaging experiments, ratios of the two expression constructs were varied between 1:9, 1:1 and 9:1 ratios and determined off of the total amount of expression plasmid DNA necessary and the total base pair size of the individual constructs to retain equimolar ratio with the helpers; at the surface area of 148 cm², the final amounts of plasmids were 16 µg of expression plasmids, 16 µg of rep2/cap9, and 38 µg of pXX6-80. Cells were incubated at 37° C. at 5% CO2 for 60 hours, washed in PBS, harvested in PBS-5 mM EDTA and centrifuged at 1000 g for 10 minutes at 4° C. Cells were resuspended in lysis buffer (150 mM NaCl, 50 mM Tris, pH 8.4) and subjected to three freeze/thaw cycles between a −80° C. freezer and 37° C. water bath. Benzonase (50 U/mL) and $MgCl_2$ were added to the cell lysate and incubated for 30 minutes at 37° C. The crude lysate was clarified by centrifugation at 3400 g for 20 minutes at 4° C. The vector-containing supernatant was used for quantitative PCR (qPCR) or further purified by iodixanol step gradients (Zolotukhin et al., 2002). Final formulations of iodixanol purified vectors were concentrated in PBS (Apollo® Concentrators, ORBITAL BIOSCIENCES®, Topsfield, MA). Each ratio of co-packaged vectors was performed independently in triplicate.

Titration of AAV Vectors

DNA from all AAV vectors, both from crude lysate or iodixanol purified preparations, was extracted using QIAGEN® reagents. 100 µL of vector from clarified lysate or 10 µL of iodixanol purified vector were treated with proteinase K (QIAGEN®; 0.2 mg/ml, 55° C., 30 min) followed by DNA extraction following manufacturer's instructions.

For AAV9-GFP and AAV9-mCherry, primers designed for the cytomegalovirus enhancer were used to determine total titer (primer set 1; see Table 2 for primer sequences). Additional forward and reverse primers designed uniquely to the GFP and mCherry transgenes (primer sets 2 and 3, respectively) were also used to determine the individual contribution of each construct to the total vector preparation. Endpoint PCR was optimized by amplifying 0.5 ng of extracted DNA on a 3-step cycling protocol across a temperature gradient (30 cycles: 94° C. for 15 sec, 46-50° C. for 15 sec, 72° C. for 30 sec) preceded by a 2 minute 94° C. incubation and followed by a 1 minute 72° C. elongation. QPCR titration was optimized by amplifying 1 ng of extracted DNA on a 2-step cycling protocol across a temperature gradient (50 cycles: 95° C. for 10 sec, 57-63° C. for 1 min) preceded by a 10 min 95° C. incubation and followed with a melt curve protocol (95° C. for 1 min, 63° C. for 1 min, 65-95° C. for 5 sec in 0.5° C. increments). An annealing temperature of 50° C. was used for all primer sets and combinations for endpoint PCR experiments. For qPCR, CMV targeted primers were annealed at 63° C., GFP and mCherry primers were annealed at 50° C. The primers below are SEQ ID NOs: 9-17 from top to bottom.

TABLE 2

Primer Sequences for PCR
Primer Sequences for PCR

| Set | Primer | Sequence | SEQ ID NO |
|---|---|---|---|
| 1 | CB2-F | 5'-TCCCATAGTAACGCCAATAGG-3' | 9 |
|   | CB2-R | 5'-CTTGGCATATGATACACTTGATG-3' | 10 |
| 2 | GFP-F | 5'-ATGGAAACATTCTCGGCCACAAGC-3' | 11 |
|   | GFP R | 5'-TCGCCGATTGGAGTGTTCTGTTG-3' | 12 |
| 3 | mCherry-F | 5'-TGGACGGCGAGTTCATCTACA-3' | 13 |
|   | mCherry-R | 5'-TTGACCTCAGCGTCGTAGTG-3' | 14 |
| 4 | DES-F | 5'-GGCTGATGTCAGGAGGGATA-3' | 15 |
|   | LSP-F | 5'-GGGACAGTGAATCCGGAAAG-3' | 16 |
|   | coGAA-R | 5'-AAGTCGTGCAGCAGGATATG-3' | 17 |

CB, CMV enhancer/chicken β-actin promoter
DES, desmin promoter,
LSP, liver specific promoter
coGAA, human codon optimized acid alpha-glucosidase To titrate co-packaged AAV9-LSP-coGAA and AAV9-DES-coGAA, forward primers unique to the promoter sequences were used in conjunction with a reverse primer anchored within the transgene shared by both constructs (primer set 4). Endpoint and qPCR performed on co-packaged AAV9-LSP-coGAA and AAV9-DES-coGAA was optimized and performed identically as with co-packaged AAV9-GFP and AAV9-mCherry. For qPCR, LSP, DES and coGAA primers were annealed at 60° C.

Standard curves were generated by using 10⁹-10⁵ total copies, as well as the inclusion of a non-template control, of the relevant expression plasmids either singly or in combination with the additional co-packaged construct. For each endpoint or qPCR reaction of single or combined expression plasmids, the corresponding primers were also used individually or in combination. For example, 4 standard curves of pTRUF11 were amplified individually with primers targeting the CMV enhancer (primer set 1), GFP (primer set 2), mCherry (primer set 3), or a combination of GFP and mCherry (primer sets 2 and 3). Likewise, 4 standard curves of combined pTRUF11 and pTRUF11-mCherry were amplified individually with primers targeting the CMV enhancer (primer set 1), GFP (primer set 2), mCherry (primer set 3), or a combination of GFP and mCherry (primer sets 2 and 3). Each combination of primer sets and plasmids was investigated to ensure the specificity of amplification.

Endpoint PCR was conducted using ILLUSTRA™ PURETAQ™ READY-TO-GO™ PCR beads (GE HEALTHCARE™, Buckinghamshire, UK). 0.5 ng of DNA was amplified from each preparation and ran on a 2% agarose gel at 100 V for 90 minutes for GFP and mCherry vectors or on a 1.5% agarose gel at 110 V for 50 minutes for LSP and DES vectors. QPCR was performed with ITAQ™ Universal SYBR® Green Supermix using 1 ng of DNA on a BIO-RAD CFX96™ Real-Time PCR Detection System and analyzed using BIO-RAD CFX MANAGER™ v. 3.1 software (BIO-RAD Laboratories, Inc., Hercules, CA). A multiplication factor of two was included when determining vector genomes per milliliter (vg/mL) to account for the packaging of positive- and negative-sense viral genomes.

Single Cell Fluorescence Assay

The infectious titer of AAV9-GFP and AAV9-mCherry was determined essentially as described previously (Zolotukhin et al., 2002). C12 cells were seeded at $2 \times 10^4$ cells in a 96-well plate and infected 18 hours later with the co-packaged vectors in a serial 10-fold dilution series. Due to the low in vitro transduction efficiency of AAV9, co-infection with Ad5 (MOI of 20) was implemented. 40 hours later, red and green cells were counted using a fluorescent microscope and the infectious titer was calculated based on dilution. Each ratio, packaged in triplicate, was assayed in duplicate. The particle-to-infectivity ratio was then determined by the qPCR titer divided by the infectious titer.

Statistical Analysis

Figures and statistical analysis was performed using GRAPHPAD PRISM® v. 5.0 (GRAPHPAD® Software, La Jolla, CA).

Results

AAV Packages Expression Plasmids in a Defined Stoichiometry

To facilitate the use and production of multiple vectors, a novel co-packaging method was investigated that would allow for the generation of a heterogeneous population of AAV vectors in a single manufacturing step. It was hypothesized that combining plasmids to be packaged at a known input ratio would result in an output vector preparation containing the equivalent ratio. To demonstrate this hypothesis, two vectors that only differed by the reporter gene, GFP or mCherry, were co-packaged into AAV serotype 9 (AAV9). The vectors were co-packaged at 1:9, 1:1 and 9:1 molar ratios, respectively. Vector DNA extracted either from crude lysates or from purified vectors were first analyzed by endpoint PCR (FIG. 1). Semi-quantitative end-point PCR revealed that each vector preparation differentially packaged each transgene, recapitulating the ratios that were transfected into the cells.

Figure 2:
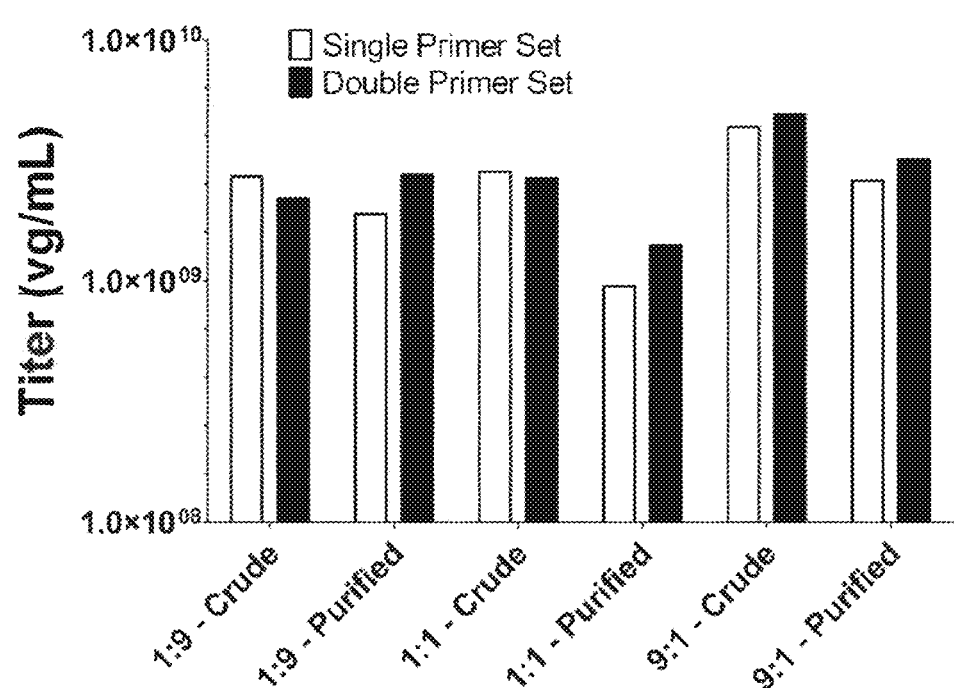
FIG. 2 is a graph showing total vector genomes resulting from co-packaging. DNA was extracted from post-benzonase treated crude lysates (Crude) or after iodixanol purification (Purified) of GFP and mCherry vectors co-packaged at 1:9, 1:1 or 9:1 ratios, respectively. Total vector genome titer was determined either directly, using a common CMV enhancer (Single Primer Set), or from the summation of each vector titer using transgene specific primers (Double Primer Set). Data represent the average total titer from crude (final volume of 3 mL) or purified samples (final volume of 0.2 mL) at each ratio assayed in triplicate.
Figure 3:
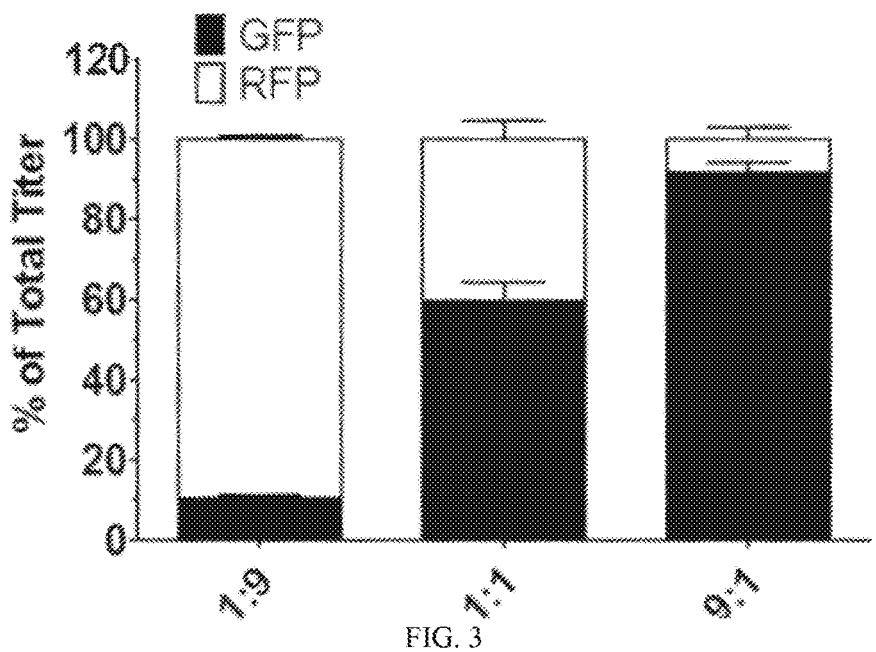
FIG. 3 is a graph showing that two expression cassettes can be packaged at predicted ratios combined prior to transfection. Quantitative PCR using transgene specific primers on iodixanol purified GFP or mCherry vectors was performed to determine the respective contribution of each individual vector in the total preparation when co-packaged at 1:9, 1:1 and 9:1 ratios, respectively. Each vector yield is expressed as a percentage of total vector genome, with 100% obtained from the summation of the titers determined using transgene specific primers for either GFP or mCherry. Data represent the average of three separate experiments for each ratio.

Each dual vector preparation was then subject to quantitative PCR (qPCR) analysis for a more robust quantification assessment. To determine the overall vector titer primers targeted towards the CMV enhancer region of the shared promoter to both AAV9-GFP and AAV9-mCherry were used (see "Methods-Titration of AAV Vectors"). At a scale of production using 150 mm tissue culture dishes, it was determined that an overall titer ranging from $\sim 1 \times 10^9$ to $5 \times 10^9$ vg/mL in the crude lysate (volume 3 mL) and after iodixanol purification (volume 0.2 mL) (FIG. 2). The use of a single primer set or a combination of transgene specific primers simultaneously did not significantly affect the titration outcome (FIG. 2). In addition it was verified that the results obtained from purified vector preparations confirmed those obtained from crude lysates, which excluded potential risks of plasmid carry over or contamination from the transfection precipitate in benzonase-digested crude lysates. Titers determined from the transgene specific primers revealed that the predicted ratios of 1:9, 1:1 and 9:1 AAV9-GFP to AAV9-mCherry were recapitulated (FIG. 3). Corroborating what was observed using endpoint PCR, at the 1:9, 1:1 and 9:1 GFP to mCherry ratios, the mean percentage of their respective contribution to the total titer was: 11.03% to 88.97%, 64.12% to 35.88%, and 94.19% to 5.81% over the three independent packaging experiments. These data strongly support the hypothesis that AAV can package more than one expression plasmid combined at a predetermined ratio in a reproducible and predictable manner.

Ratios of Co-Packaged Vectors are Maintained in In Vitro Cell Transduction

Figure 4:
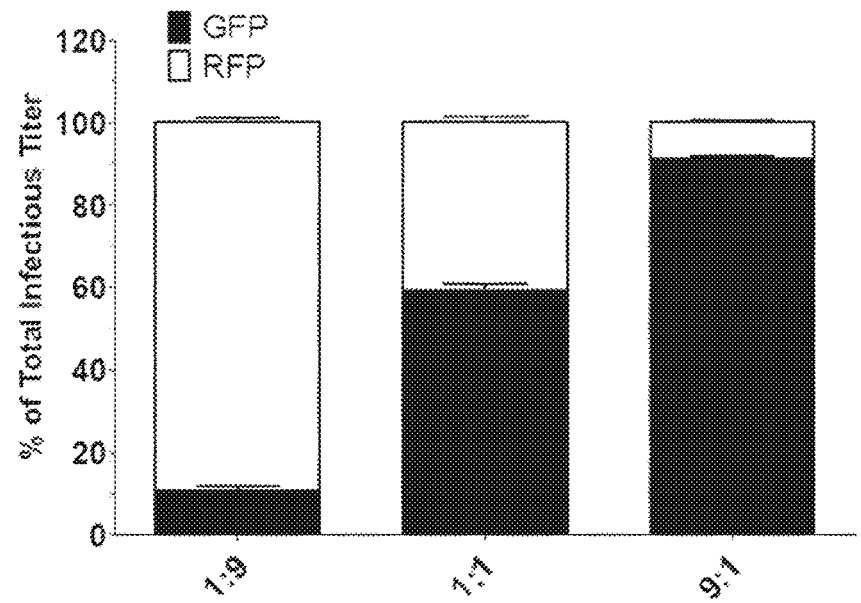
FIG. 4 is a graph showing in vitro characterization of co-packaged reporter vectors. The percent contribution of either AAV9-GFP or AAV9-mCherry to the total infectious titer (GFP+mCherry) was determined via single cell fluorescence assay in C12 cells. Data represent the average of two separate experiments for each ratio.

An established method of vector quality control is the infectivity or transduction assay. For marker gene carrying vectors, the assay is based on single cell fluorescence (Zolotukhin et al., 2002). To determine the infectious titer, C12 cells were transduced in the presence of Ad5 (MOI of 20), with purified AAV9-GFP and AAV9-mCherry co-packaged at the above ratios. Two days post-infection, green and red cells were visually counted independently. The infectious titer ranged from $8.5 \times 10^3$ to $1.25 \times 10^4$ IU/mL closely mirroring the vector genome titers. Furthermore the average particle-to-infectivity ratios ranged from $2.1 \times 10^5$ to $4.9 \times 10^5$, which were consistent with ratios observed for AAV9 preparations, and more importantly, the particle-to-infectivity ratios were not significantly different between the two marker constructs or at the different packaging ratios (data not shown). The mean respective contribution of green and red cells to the total infectious titer was: 10.85% to 89.15%, 59.34% to 40.66%, and 91.22% to 8.78% (FIG. 4). These results indicate that co-packaged vectors also display transduction profiles in the ratios at which they were co-packaged.

Therapeutic Constructs can be Differentially Packaged

Figure 5A:
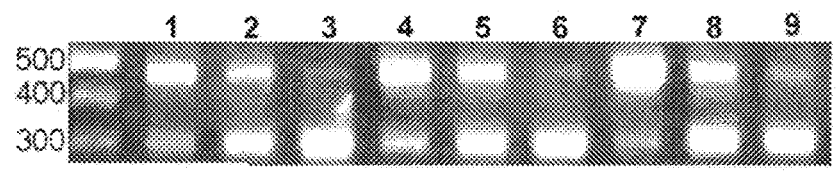
FIGS. 5A and B are a photograph and a graph showing co-packaging of therapeutic constructs.
Figure 5B:
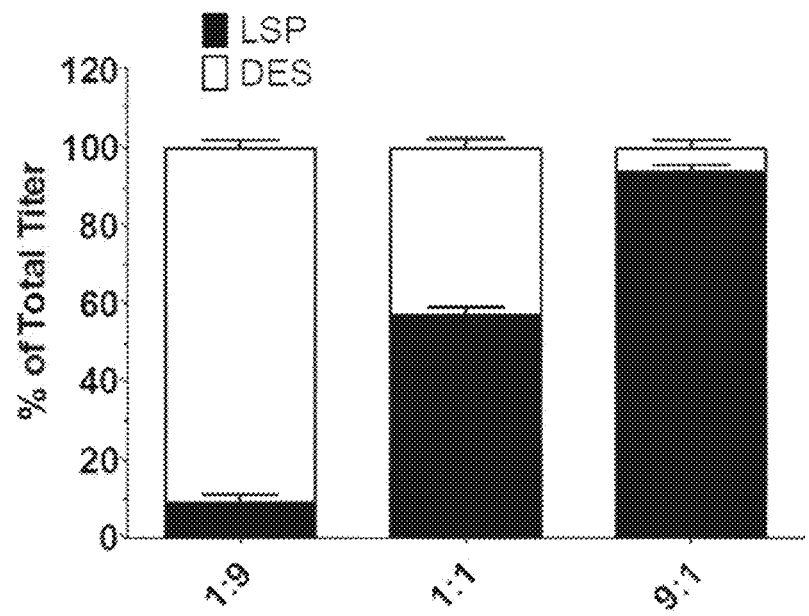
FIG. 5B) DNA extracted from co-packaged AAV9-LSP-coGAA and AAV9-DES-coGAA was subjected to quantitative PCR to determine the respective contribution of each individual vector in the total preparation when co-packaged at 1:9, 1:1 and 9:1 ratios, respectively. Each vector yield is expressed as a percentage of total vector genome, with 100% obtained from the summation of the titers determined using promoter specific primers for either LSP or DES. Data represent the average of three separate experiments for each ratio. LSP, liver specific promoter; DES, desmin promoter; coGAA, human codon-optimized acid α-glucosidase.

It may prove efficacious in some instances to use multiple vectors that target transgene expression to specific tissues. Therefore this method was applied to the production of therapeutically relevant constructs differing in transcription elements. Vectors containing human codon-optimized acid α-glucosidase (coGAA) with different promoter elements that target expression to the liver [ApoE-HCR-hAAT promoter (LSP)] or cardiac, skeletal, and neuronal tissue [desmin promoter (DES)] were co-packaged and purified at the above ratios in AAV9 in 150 mm tissue culture dishes. Dual vector preparations were analyzed in a similar manner as the marker containing vectors. Titers were assessed using forward primers within the individual promoters (LSP or DES) and a shared, reverse primer anchored in the transgene (GAA; Table 2). Endpoint PCR confirmed the differential contribution of the two constructs to the total vector production (FIG. 5A). Resulting overall titers ranged from $1 \times 10^9$ to $3 \times 10^9$ vg/mL. Similarly, qPCR revealed the output ratio recapitulated the predicted ratios as was observed when AAV9-GFP and AAV9-mCherry were co-packaged (FIG. 5B). The mean percentage of the total titer consisting of AAV9-LSP-coGAA or AAV9-DES-coGAA was: 9.09% to 90.91%, 57.10% to 42.90%, and 93.83% to 6.17%. The data presented support the hypothesis that packaging pre-determined ratios of input plasmid containing different transcriptional elements results in a heterogeneous population containing multiple vectors with the potential of expressing in discrete tissues. These results also indicate that production of multiple vectors in a single transfection step can produce dual, or potentially more, vectors at a predetermined ratio reproducibly and at the proportion of the investigator's choice.

DISCUSSION

The widespread use of AAV for gene therapy applications emphasizes its utility and diverse capabilities but the limitations of manufacturing and packaging size have dampened the rapid successes observed in preclinical models to translation in the clinic. Many groups have investigated manners in which greater quantities of vector can be made quickly and efficiently with varying degrees of success. The most standard protocol to produce recombinant AAV, both at research and clinical grade, is a transfection method using two or sometimes three plasmids to provide all the cis and trans functions necessary to package AAV (Zolotukhin et al., 2002). However, transfection-based methods are inherently difficult to adapt to large scale platforms and methods using baculovirus (Kotin 2011; Mietzsch et al., 2014) or herpes simplex virus 1 (HSV) systems (Clément et al., 2009), together with producer cells grown in suspension, are rapidly improving and paving the way to future manufacturing campaigns. Despite these quick and impressive advancements toward infection-based methods, transfection remains the most versatile and cost effective method at small and medium scale preparations enabling researchers to develop proof-of-principle concepts.

Current methods of AAV production are directed towards the manufacturing of a single vector at a purity and titer conducive for preclinical studies or early phase clinical trials. In some instances, the use of more than one AAV may be beneficial or even required as a therapeutic approach. For some diseases, the production of multiple vectors containing fragmented genomes is required when the constructs exceed the carrying capacity of the vector. Duchenne's muscular dystrophy, hemophilia A, Tay-Sachs disease and Usher 1 are only a few of the diseases that would rely on multiple gene products or trans-splicing vectors to provide for therapeutic benefit (Mah et al., 2003; Cachón-González et al., 2012; Lopes et al., 2013; Koo et al., 2014; Lostal et al., 2014; Dyka et al., 2014). Similarly, it may prove necessary to coordinate and differentially control transgene expression to different target regions with tissue restricted promoters, such as the central nervous system, eye or systemically, while avoiding expression in antigen presenting cells and provoking a deleterious immune response (Zhang et al., 2012; Palfi et al., 2012; Fagoe et al., 2013). The benefit of altering the construct and not the capsid lies in that the coordination of expression may be contingent upon the tropism of a particular serotype and it has already been shown that much of the population is already seropositive for many of the serotypes in clinical trial (Boutin et al., 2010). It would behoove an investigator then to ensure that all cell and tissue types are transduced at a minimal degree of exposure of the animal or individual to multiple serotypes. This immunization against the various serotypes would preclude any subsequent attempts using different capsid variants without substantial immunomodulation as well as potentially prime innate and adaptive responses against viral components; all of which have been shown to be detrimental to long-term efficacy (Cresawn et al., 2005; Jayandharan et al., 2011; Wang et al., 2011; Sudres et al., 2012; Mingozzi and High 2013). Based on these considerations, the method described herein is being used to develop a single gene therapy product that will allow for the simultaneous induction of immune tolerance and physiologic correction of Pompe disease that may prove beneficial for other metabolic myopathies characterized by systemic pathology and are prone to immune responses to the therapeutic protein.

When more than one vector is necessary to the therapeutic approach, investigators have the sole choice of producing and testing each vector preparation independently, followed by co-administration of the two vectors at time of dosing. As an obvious consequence, processing times are often increased and cost doubled; aspects all the more relevant for clinical manufacturing. Clinical manufacturing and release testing of AAV in compliance with FDA-regulated Good-Manufacturing Practices (GMP) is extremely costly and time consuming, a non-trivial aspect of designing an AAV gene therapy trial. Furthermore, pre-clinical toxicology studies would need to integrate additional animals and controls to evaluate safety of each single vector separately, as well as in combination, and again, resulting in dramatic increases in cost and time toward protocol validation.

The necessity of novel production methods to provide for multiple constructs in an efficient and reliable manner currently stands as an unmet need in the field. This study focused on the development of such a method. Here it was revealed that vectors containing either different transgenes or transcriptional elements could be combined in predetermined ratios and produce an output of vector that recapitulated that prediction. Although a method for developing mosaic capsids by co-transfection has been previously attempted (Gigout et al., 2005), this study is the first instance of constructing a heterogeneous population of vectors containing different payloads in a single manufacturing step.

Here it was demonstrated that disparate ratios (1:9 or 9:1) provided for the greatest reliability in titration and infectivity, at least in vitro. In all cases the favored construct was the smaller of the two, emphasizing the care with which the plasmids should be combined when packaging taking into account the total size of the plasmid and maintaining precise molar ratios. Co-packaging may therefore provide as an alternative method of vector production where more than one gene product is necessary, and providing as a novel platform for treating diverse congenital disorders for which AAV mediated gene therapy is applicable. Moreover, this technique could theoretically expand to infection-based systems as the expression cassettes to be packaged could be provided at varying multiplicities of infection to produce a heterogeneous population of vectors similar to results here using transfection.

With respect to regulatory aspects of AAV clinical manufacturing, the main advantage of this strategy is related to being extremely cost and time effective, as developed earlier. The dual vector preparation should be considered as one single new investigational drug (IND) for each given ratio. This advantage may also be a challenge, as precise methods to characterize each vector contribution must be developed and well controlled, and reproducibility of the production method established. To facilitate FDA review and approval, the chosen dual vector at the therapeutic ratio, similar to a single AAV drug, will undergo extensive toxicology and dose assessment studies. The ratio must remain unchanged throughout the protocol validation, at least within the margin of errors of the methods used to produce and characterize the vector preparation. Identity testing, including whole genome sequencing, will be a challenge. However new next generation sequencers allow for Massive Parallel Sequencing (MSP) to provide full sequencing of multiple species in one given sample, which would also confirm the ratio of each vector construct. From this study, and for the constructs tested here, it is believed that with appropriate characterization tools, both vectors can be accurately titrated and that predicted ratios are consistent across several production attempts.

Example 2. Exemplary rAAV Co-Production Protocol

To date adeno-associated virus (AAV) has been used in 109 gene therapy clinical trials. The widespread tropism, sustained gene expression and excellent safety data that exist for AAV are only a few of the reasons it has reached such popularity. Among its drawbacks though are size limitation, with an optimal packaging size of ~4.7 kb, and the challenges to produce high titer vectors in a cost and time effective manner. Furthermore, some indications may require the use of two or more vector constructs. For instance, different promoters may be used to support specific tissue targeting. For long cDNA, the packaging capacity may be expanded by splitting the cDNA and using cis- or trans-splicing elements. Clinical applications using two or more AAV constructs would be time and cost prohibitive if each construct was produced separately. To facilitate the use and production of multiple vectors, a novel production method was explored that exploited the stoichiometric properties of the virus in that only one expression plasmid is packaged per encapsidated virus. The tested hypothesis was that combining plasmids prior to packaging at a known input ratio would result in an output vector preparation containing the equivalent ratio.

Methods
AAV9 Vector Production and Purification

AAV vectors were produced in 150 mm tissue culture dishes via CaPO4 transfection GFP+mCherry and LSP+DES vectors were co-packaged at 1:9, 1:1, and 9:1 ratios. The amount of expression plasmid for co-packaging was determined by the total amount of DNA necessary and the total base pair size of the individual constructs to retain equimolar ratios. Post-benzonase treated, vector-containing supernatant was used for quantitative PCR (qPCR) or further purified using discontinuous iodixanol step gradients for qPCR and infectivity assays.

Titration of Vectors

Primers were designed for the shared CMV enhancer of the GFP and mCherry vectors as well as unique fragments within the transgenes. The LSP and DES vectors were titrated using unique forward primers within the promoter and a shared reverse primer anchored within the transgene. Standard curves were generated by using $10^{10}$-$10^5$ total copies of the relevant expression plasmids either singly or in combination with a non-template control.

QPCR was performed with ITAQ™ Universal SYBR® Green Supermix on a BIO-RAD CFX96™ Real-Time PCR Detection System and analyzed using BIO-RAD CFX MANAGER™ v. 3.1.

Single Cell Fluorescence Assay

C12 cells were seeded at $2\times10^4$ cells in a 96-well plate and infected 18 hours later with the co-packaged vectors in a 10-fold dilution series in the presence of Ad5 (MOI 20). 40 hours later, red and green cells were counted using a fluorescent microscope and the infectious titer was calculated based on dilution.

Results

Figure 6:
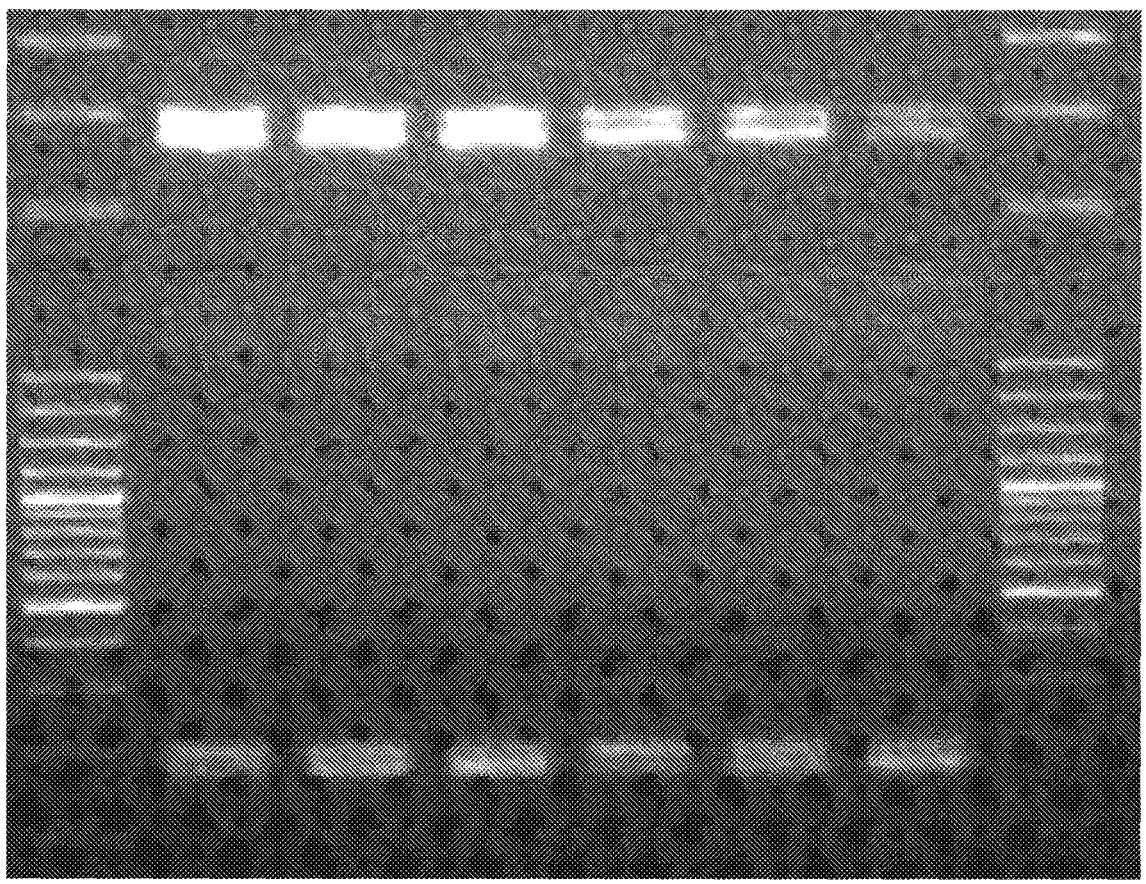
FIG. 6 is a photograph of a DNA gel showing vectors co-packaged at ratios 1:9 GFP to mCherry, 1:1, and 9:1. Top: Standard of $10^{10}$ to $10^5$ total copies of the combined constructs. GFP band is 171 bp and mCherry is 191 bp. Bottom: Lanes 1-3 contain DNA amplified from vectors in crude lysate (post-benzonase treatment); lanes 4-6 contain DNA amplified from vectors purified via iodixanol gradient.

As shown in FIG. 6, vectors were co-packaged at ratios 1:9 GFP to mCherry, 1:1, and 9:1. The differential packaging of the vectors was evident. The use of multiple primer sets and different sources of vector DNA had no effect on PCR efficiency.

As shown in FIG. 2 and FIG. 3, the titer of co-packaged GFP and mCherry (RFP) vectors using a single primer set targeting a shared CMV enhancer compared to the sum of titers determined from transgene specific primers used simultaneously showed no significant difference. Additionally, titers determined from crude lysate or iodixanol purified vector did not impact total quantification. QPCR titration determined from the transgene specific primers revealed that the respective contribution of each vector to the total titer corroborated the predicted ratios of GFP to mCherry prior to transfection.

As shown in FIG. 4, as a measure of infectivity, a single cell fluorescence assay was performed on C12 cells. The individual contribution of each vector to the total infectious titer also repeated the predicted ratios.

As shown in FIG. 5, therapeutic constructs differing in promoter elements (liver specific promoter—LSP; desmin promoter—DES) driving human codon-optimized acid α-glucosidase were co-packaged at 1:9, 1:1, and 9:1 ratios. The observed percent contribution of each vector to the total titer validated the predicted ratios.

CONCLUSION

During transfection, AAV will co-package reporter constructs combined at a predetermined ratio predictably and reproducibly to generate a heterogeneous population of vectors. Co-packaged vectors transduce C12 cells in the predicted ratios. Therapeutic constructs differing in promoter elements were also co-packaged in a reliable method. At least two constructs, differing in either transgene or transcription elements, can be efficiently co-packaged and return vector in equivalent ratios.

REFERENCES

Aschauer, D. F., Kreuz, S., Rumpel, S. (2013). Analysis of transduction efficiency, tropism and axonal transport of AAV serotypes 1, 2, 5, 6, 8 and 9 in the mouse brain. PLOS One 8, e76310.

Asokan, A., Samulski, R. J. (2013). An emerging adeno-associated viral vector pipeline for cardiac gene therapy. Hum. Gene Ther. 24, 906-913.

Asokan, A., Schaffer, D. V., Samulski, R. J. (2012). The AAV vector toolkit: poised at the clinical crossroads. Mol. Ther. 20, 699-708.

Boutin, S., Monteilhet, V., Veron, P, et al. (2010). Prevalence of serum IgG and neutralizing factors against adeno-associated virus (AAV) types 1, 2, 5, 6, 8, and 9 in the healthy population: implications for gene therapy using AAV vectors. Hum. Gene Ther. 21, 704-712.

Cachón-González, M. B., Wang, S. Z., McNair, R., et al. (2012). Gene transfer corrects acute GM2 gangliosidosis-potential therapeutic contribution of perivascular enzyme flow. Mol. Ther. 20, 1489-500.

Cao, O., Dobrzynski, E., Wang, L, et al. (2007). Induction and role of regulatory CD4+CD25+ T cells in tolerance to the transgene product following hepatic in vivo gene transfer. Blood 110, 1132-1140.

Clément, N., Knop, D. R., Byrne, B. J. (2009). Large-scale adeno-associated viral vector production using a herpesvirus-based system enables manufacturing for clinical studies. Hum. Gene Ther. 20, 796-806.

Cresawn, K. O., Fraites, T. J., Wasserfall, C., et al. (2005). Impact of humoral immune response on distribution and efficacy of recombinant adeno-associated virus-derived acid alpha-glucosidase in a model of glycogen storage disease type II. Hum. Gene Ther. 16, 68-80.

Dong, J. Y., Fan, P. D., Frizzell, R. A. (1996). Quantitative analysis of the packaging capacity of recombinant adeno-associated virus. Hum. Gene Ther. 7, 2101-2112.

Doria, M., Ferrara, A., Auricchio, A. (2013). AAV2/8 vectors purified from culture medium with a simple and rapid protocol transduce murine liver, muscle, and retina efficiently. Hum. Gene Ther. Methods 24, 392-398.

Dyka, F. M., Boye, S. L., Chiodo, V. A., et al. (2014). Dual adeno-associated virus vectors result in efficient in vitro and in vivo expression of an oversized gene, MYO7A. Hum. Gene Ther. Methods 25, 166-177.

Fagoe, N. D., Eggers, R., Verhaagen, J., Mason, M. R. (2013). A compact dual promoter adeno-associated viral vector for efficient delivery of two genes to dorsal root ganglion neurons. Gene Ther. 21, 242-252.

Falk, D. J., Mah, C. S., Soustek, M. S., et al. (2013). Intrapleural administration of AAV9 improves neural and cardiorespiratory function in Pompe disease. Mol. Ther. 21, 1661-1667.

Faust, S. M., Bell, P., Cutler, B. J., et al. (2013). CpG-depleted adeno-associated virus vectors evade immune detection. J. Clin. Invest. 123, 2994-3001.

Ghosh, A., Yue, Y., Duan, D. (2011). Efficient transgene reconstitution with hybrid dual AAV vectors carrying the minimized bridging sequences. Hum. Gene Ther. 22, 77-83.

Gigout, L., Rebollo, P., Clement, N. et al. (2005). Altering AAV tropism with mosaic viral capsids. Mol. Ther. 11, 856-865.

Gurda, B. L., Raupp, C., Popa-Wagner, R., et al. (2012). Mapping a neutralizing epitope onto the capsid of adeno-associated virus serotype 8. J. Virol. 86, 7739-7751.

Hirsch, M. L., Li, C., Bellon, I., et al. (2013). Oversized AAV transduction is mediated via a DNA-PKcs-independent, Rad51C-dependent repair pathway. Mol. Ther. 21, 2205-2216.

Jayandharan, G. R., Aslanidi, G., Martino, A. T., et al. (2011.) Activation of the NF-kappaB pathway by adeno-associated virus (AAV) vectors and its implications in immune response and gene therapy. Proc. Natl. Acad. Sci. USA 108, 3743-3748.

Koo, T., Popplewell, L., Athanasopoulos, T., Dickson, G. (2014). Triple trans-splicing adeno-associated virus vectors capable of transferring the coding sequence for full-length dystrophin protein into dystrophic mice. Hum. Gene Ther. 25, 98-108.

Kotin, R. M. (2011). Large-scale recombinant adeno-associated virus production. Hum. Mol. Genet. 20, R2-6.

Lai, Y., Yue, Y., Liu, M., et al. (2005). Efficient in vivo gene expression by trans-splicing adeno-associated viral vectors. Nat. Biotechnol. 23, 1435-1439.

Lopes, V. S., Boye, S. E., Louie, C. M., et al. (2013). Retinal gene therapy with a large MYO7A cDNA using adeno-associated virus. Gene Ther. 20, 824-833.

Lostal, W., Kodippili, K., Yue, Y., Duan, D. (2014). Full-length dystrophin reconstitution with adeno-associated viral vectors. Hum. Gene Ther. 25, 1-11.

Mah, C., Sarkar, R., Zolotukhin, I., et al. (2003). Dual vectors expressing murine factor VIII result in sustained correction of hemophilia A mice. Hum. Gene Ther. 14, 143-152.

Mah, C. S., Soustek, M. S., Todd, A. G., et al. (2013). Adeno-associated virus-mediated gene therapy for metabolic myopathy. Hum. Gene Ther. 24, 928-936.

Manno, C. S., Pierce, G. F., Arruda, V. R., et al. (2006). Successful transduction of liver in hemophilia by AAV-Factor IX and limitations imposed by the host immune response. Nat. Med. 12, 342-347.

Markusic, D. M., Herzog, R. W. (2012). Liver-directed adeno-associated viral gene therapy for hemophilia. J. Genet. Syndr. Gene Ther. 1, 1-9.

Miao, C. H., Ohashi, K., Patijn, G. A., et al. (2000). Inclusion of the hepatic locus control region, an intron, and untranslated region increases and stabilizes hepatic factor IX gene expression in vivo but not in vitro. Mol. Ther. 1, 522-532.

Mietzsch, M., Grasse, S., Zurawski, C., et al. (2014). OneBac: Platform for scalable and high-titer production of adeno-associated virus serotype 1-12 vectors for gene therapy. Hum. Gene Ther. 25, 212-222.

Mingozzi, F., High, K. A. (2013). Immune responses to AAV vectors: overcoming barriers to successful gene therapy. Blood 122, 23-36.

Pacak, C. A., Sakai, Y., Thattaliyath, B. D., et al. (2009). Tissue specific promoters improve specificity of AAV9 mediated transgene expression following intra-vascular gene delivery in neonatal mice. Genet. Vaccines Ther. 6, 13.

Palfi, A., Chadderton, N., McKee, A. G., et al. (2012). Efficacy of codelivery of dual AAV2/5 vectors in the murine retina and hippocampus. Hum. Gene Ther. 23, 847-858.

Pulicherla, N., Shen, S., Yadav, S., et al. (2011). Engineering liver-detargeted AAV9 vectors for cardiac and musculoskeletal gene transfer. Mol. Ther. 19, 1070-1078.

Rabinowitz, J. E., Rolling, F., Li, C., et al. (2002). Cross-packaging of a single adeno-associated virus (AAV) type 2 vector genome into multiple AAV serotypes enables transduction with broad specificity. J. Virol. 76, 791-801.

Rayaprolu, V., Kruse, S., Kant, R., et al. (2013). Comparative analysis of adeno-associated virus capsid stability and dynamics. J. Virol. 87, 13150-13160.

Rogers, G. L., Martino, A. T., Aslanidi, G. V., et al. (2011). Innate immune responses to AAV vectors. Front. Microbiol. 2, 194.

Sudres, M., Ciré, S., Vasseur, V., et al. (2012). MyD88 signaling in B cells regulates the production of Th1-dependent antibodies to AAV. Mol. Ther. 20, 1571-1581.

Wang, L., Calcedo, R., Bell, P., et al. (2011). Impact of pre-existing immunity on gene transfer to nonhuman primate liver with adeno-associated virus 8 vectors. Hum. Gene Ther. 22, 1389-1401.

Zhang, P., Sun, B., Osada, T., et al. (2012). Immunodominant liver-specific expression suppresses transgene-directed immune responses in murine pompe disease. Hum. Gene Ther. 23, 460-472.

Zhang, Y., Duan, D. (2012). Novel mini-dystrophin gene dual adeno-associated virus vectors restore neuronal nitric oxide synthase expression at the sarcolemma. Hum. Gene Ther. 23, 98-103.

Zhang, Y., Yue, Y., Li, L., et al. (2013). Dual AAV therapy ameliorates exercise-induced muscle injury and functional ischemia in murine models of Duchenne muscular dystrophy. Hum. Mol. Genet. 22, 3720-3729.

Zincarelli, C., Soltys, S., Rengo, G., Rabinowitz, J. E. (2008). Analysis of AAV serotypes 1-9 mediated gene expression and tropism in mice after systemic injection. Mol. Ther. 16, 1073-1080.

Zolotukhin, S., Potter, M., Hauswirth, W. W., et al. (1996). A "humanized" green fluorescent protein cDNA adapted for high-level expression in mammalian cells. J. Virol. 70, 4646-4654.

Zolotukhin, S., Potter, M., Zolotukhin, I., et al. (2002). Production and purification of serotype 1, 2, and 5 recombinant adeno-associated viral vectors. Methods 28, 158-167.

Other Embodiments

All of the features disclosed in this specification may be combined in any combination. Each feature disclosed in this specification may be replaced by an alternative feature serving the same, equivalent, or similar purpose. Thus, unless expressly stated otherwise, each feature disclosed is only an example of a generic series of equivalent or similar features.

From the above description, one skilled in the art can easily ascertain the essential characteristics of the present disclosure, and without departing from the spirit and scope thereof, can make various changes and modifications of the disclosure to adapt it to various usages and conditions. Thus, other embodiments are also within the claims.

EQUIVALENTS

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

All references, patents and patent applications disclosed herein are incorporated by reference with respect to the subject matter for which each is cited, which in some cases may encompass the entirety of the document.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A producer cell preparation for producing one or more recombinant adeno-associated virus particles, the producer cell preparation comprising:
a first nucleic acid vector containing a first construct, the first construct comprising a heterologous nucleic acid region encoding a first protein or polypeptide, and
a second nucleic acid vector containing a second construct, the second construct comprising a heterologous nucleic acid region encoding a second protein or polypeptide, wherein the first nucleic acid vector and the second nucleic acid vector are present at an initial ratio,
wherein the producer cell preparation is configured to produce a particle preparation comprising:
a first rAAV particle comprising the first construct, and
a second rAAV particle comprising the second construct, wherein the particle preparation comprises a target ratio of the first rAAV particle to the second rAAV particle within 15% of the initial ratio of the first nucleic acid vector to the second nucleic acid vector.

2. The producer cell preparation of claim 1, wherein the first and the second nucleic acid vectors each comprise nucleic acid regions comprising an inverted terminal repeat (ITR) flanking each side of the respective heterologous nucleic acid region.

3. The producer cell preparation of claim 1, wherein the particle preparation comprises a target ratio of the first rAAV particle to the second rAAV particle within 10% of the initial ratio of the first nucleic acid vector to the second nucleic acid vector.

4. The producer cell preparation of claim 1, wherein the first rAAV particle and the second rAAV particle are each rAAV9 particles.

5. The producer cell preparation of claim 1, further comprising one or more helper plasmids.

6. The producer cell preparation of claim 1, further comprising a first helper plasmid comprising a rep gene and a cap gene and a second helper plasmid comprising an E1a gene, an E1b gene, an E4 gene, an E2a gene, and a VA gene.

7. The producer cell preparation of claim 1, wherein the initial ratio is 1:1, 1:9, or 9:1 of the first nucleic acid vector to the second nucleic acid vector.

8. The producer cell preparation of claim 1, wherein the first nucleic acid vector and/or the second nucleic acid vector are a first plasmid and/or a second plasmid.

9. The producer cell preparation of claim 1, wherein the first nucleic acid vector and the second nucleic acid vector are DNA vectors.

10. A cellular composition, the cellular composition comprising:
a producer cell preparation,
a first nucleic acid vector containing a first construct comprising a heterologous nucleic acid region encoding a first protein or polypeptide and nucleic acid regions comprising an inverted terminal repeat (ITR) flanking each side of the heterologous nucleic acid region;
a second nucleic acid vector containing a second construct comprising a heterologous nucleic acid region encoding a second protein or polypeptide and nucleic acid regions comprising an inverted terminal repeat (ITR) flanking each side of the heterologous nucleic acid region; and one or more helper nucleic acids, wherein
the first nucleic acid vector and the second nucleic acid vector are present at a initial ratio,
a first rAAV particle comprising the first construct, and
a second rAAV particle comprising the second construct, wherein
a ratio of the first rAAV particle to the second rAAV particle is within 15% of the initial ratio of the first nucleic acid vector to the second nucleic acid vector.

11. The cellular composition of claim 10, wherein the first and the second nucleic acid vectors each comprise nucleic acid regions comprising an inverted terminal repeat (ITR) flanking each side of the respective heterologous nucleic acid region.

12. The cellular composition of claim 10, wherein the ratio of the first rAAV particle to the second rAAV particle is within 10% of the initial ratio of the first nucleic acid vector to the second nucleic acid vector.

13. The cellular composition of claim 10, wherein the first rAAV particle and the second rAAV particle are each rAAV9 particles.

14. The cellular composition of claim 10, further comprising one or more helper plasmids.

15. The cellular composition of claim 10, further comprising a first helper plasmid comprising a rep gene and a cap gene and a second helper plasmid comprising an E1a gene, an E1b gene, an E4 gene, an E2a gene, and a VA gene.

16. The cellular composition of claim 10, wherein the initial ratio is 1:1, 1:9, or 9:1 of the first nucleic acid vector to the second nucleic acid vector.

17. The cellular composition of claim 10, wherein the first nucleic acid vector and/or the second nucleic acid vector are a first plasmid and/or a second plasmid.

18. The cellular composition of claim 10, wherein the first nucleic acid vector and the second nucleic acid vector are DNA vectors.

19. A composition, the composition comprising:
(a) the supernatant or lysate of a producer cell preparation comprising
- (i) a first nucleic acid vector containing a first construct comprising a heterologous nucleic acid region encoding a first protein or polypeptide and nucleic acid regions comprising an inverted terminal repeat (ITR) flanking each side of the heterologous nucleic acid region;
- (ii) a second nucleic acid vector containing a second construct comprising a heterologous nucleic acid region encoding a second protein or polypeptide and nucleic acid regions comprising an inverted terminal repeat (ITR) flanking each side of the heterologous nucleic acid region; and one or more helper nucleic acids,
(b) a first rAAV particle comprising the first construct, and
(c) a second rAAV particle comprising the second construct, wherein
a ratio of the first rAAV particle to the second rAAV particle within 15% of the initial ratio of the first nucleic acid vector to the second nucleic acid vector.

* * * * *